(12) United States Patent
Abedijaberi et al.

(10) Patent No.: US 11,181,685 B2
(45) Date of Patent: Nov. 23, 2021

(54) REDUCED RADIUS OPTICAL FIBER WITH HIGH MECHANICAL RELIABILITY

(71) Applicant: CORNING INCORPORATED, Corning, NY (US)

(72) Inventors: Arash Abedijaberi, Painted Post, NY (US); Scott Robertson Bickham, Corning, NY (US); Darren Andrew Stainer, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/141,324

(22) Filed: Jan. 5, 2021

(65) Prior Publication Data

US 2021/0208335 A1 Jul. 8, 2021

Related U.S. Application Data

(60) Provisional application No. 62/957,879, filed on Jan. 7, 2020.

(30) Foreign Application Priority Data

Jan. 23, 2020 (NL) .................................. 2024737

(51) Int. Cl.
*G02B 6/02* (2006.01)
*G02B 6/036* (2006.01)
(Continued)

(52) U.S. Cl.
CPC ..... *G02B 6/02395* (2013.01); *G02B 6/03627* (2013.01); *G02B 6/443* (2013.01);
(Continued)

(58) Field of Classification Search
None
See application file for complete search history.

(56) References Cited

U.S. PATENT DOCUMENTS

| 4,474,830 A | 10/1984 | Taylor |
| 4,585,165 A | 4/1986 | Iversen |
| (Continued) | | |

FOREIGN PATENT DOCUMENTS

| CN | 107272111 A | 10/2017 |
| WO | 2020/069053 A1 | 4/2020 |

OTHER PUBLICATIONS

Baldauf et al., "Relationship of Mechanical Characteristics of Dual-Coated Single-Mode Optical Fibers and Microbending Loss," IEICE Transactions on Communications, vol. E76-B, No. 4, Apr. 1993, pp. 352-357.

(Continued)

*Primary Examiner* — Michelle R Connelly
(74) *Attorney, Agent, or Firm* — Kevin L. Bray

(57) ABSTRACT

The present disclosure provides optical fibers with an impact-resistant coating system. The fibers feature low microbending and high mechanical reliability. The coating system includes a primary coating and a secondary coating. The primary coating and secondary coating have reduced thickness to provide reduced radius fibers without sacrificing protection. The primary coating has a low spring constant and sufficient thickness to resist transmission of force to the glass fiber. The secondary coating has high puncture resistance. The outer diameter of the optical fiber is less than or equal to 200 μm.

27 Claims, 11 Drawing Sheets

(51) Int. Cl.
  *G02B 6/44* (2006.01)
  *C03C 25/1065* (2018.01)
(52) U.S. Cl.
  CPC ........ *G02B 6/4486* (2013.01); *C03C 25/1065* (2013.01); *G02B 6/02009* (2013.01)

(56) References Cited

U.S. PATENT DOCUMENTS

| | | | |
|---|---|---|---|
| 4,609,718 | A | 9/1986 | Bishop et al. |
| 4,629,287 | A | 12/1986 | Bishop |
| 4,798,852 | A | 1/1989 | Zimmerman et al. |
| 4,962,992 | A | 10/1990 | Chapin et al. |
| 5,104,433 | A | 4/1992 | Chapin et al. |
| 5,410,567 | A | 4/1995 | Brundage et al. |
| 6,027,062 | A | 2/2000 | Bacon et al. |
| 6,288,835 | B1 | 9/2001 | Nilsson et al. |
| 6,316,516 | B1 | 11/2001 | Chien et al. |
| 6,326,416 | B1 | 12/2001 | Chien et al. |
| 6,539,152 | B1 | 3/2003 | Fewkes et al. |
| 6,563,996 | B1 | 5/2003 | Winningham |
| 7,536,076 | B2 | 5/2009 | Khrapko et al. |
| 7,565,820 | B2 | 7/2009 | Foster et al. |
| 7,805,039 | B2 | 9/2010 | Sanders et al. |
| 7,832,675 | B2 | 11/2010 | Bumgarner et al. |
| 8,428,411 | B2 | 4/2013 | De Montmorillon et al. |
| 9,057,817 | B2 * | 6/2015 | Bookbinder ...... C08F 222/1025 |
| 9,097,834 | B2 | 8/2015 | Hirano et al. |
| 9,139,466 | B2 | 9/2015 | Hirano et al. |
| 9,389,382 | B2 | 7/2016 | Blazer et al. |
| 9,512,033 | B2 | 12/2016 | Hirano et al. |
| 11,036,000 | B2 * | 6/2021 | Bickham ............ G02B 6/03627 |
| 2002/0159731 | A1 | 10/2002 | Gruner-Nielsen et al. |
| 2003/0077059 | A1 | 4/2003 | Chien et al. |
| 2003/0118307 | A1 | 6/2003 | Gruner-Nielsen et al. |
| 2003/0123839 | A1 | 7/2003 | Chou et al. |
| 2004/0005127 | A1 | 1/2004 | Kliner et al. |
| 2007/0077016 | A1 | 4/2007 | Bickham et al. |
| 2010/0082138 | A1 | 4/2010 | Hayes et al. |
| 2011/0188822 | A1 | 8/2011 | Konstadinidis et al. |
| 2014/0294355 | A1 * | 10/2014 | Bickham ............ G02B 6/02395 385/128 |
| 2014/0370287 | A1 | 12/2014 | Tamura et al. |
| 2015/0277031 | A1 | 10/2015 | Bookbinder et al. |
| 2015/0315061 | A1 | 11/2015 | Hoover et al. |
| 2016/0231503 | A1 | 8/2016 | Sillard et al. |
| 2018/0127593 | A1 | 5/2018 | Chen et al. |
| 2019/0033515 | A1 | 1/2019 | Sillard et al. |
| 2019/0170934 | A1 | 6/2019 | Pastouret et al. |
| 2019/0331849 | A1 | 10/2019 | Bennett et al. |
| 2019/0331850 | A1 | 10/2019 | Bennett et al. |
| 2020/0224037 | A1 | 7/2020 | Chen et al. |

OTHER PUBLICATIONS

Bennett et al; "Small Diameter Low Attenuation Optical Fiber"; Filed as U.S. Appl. No. 16/391,859, filed Apr. 23, 2019; 66 Pages—Listed in ID as D28911.

Bickham et al; "Small Diameter Fiber Optic Cables Having Low-Friction Cable Jackets and Optical Fibers With Reduced Cladding and Coating Diameters" Filed as U.S. Appl. No. 62/738,174, filed Sep. 28, 2018; 69 Pages.

G. Scott Glaesemann and Donald A. Clark, "Quantifying the Puncture Resistance of Optical Fiber Coatings", published in the Proceedings of the 52nd International Wire & Cable Symposium, 2003, pp. 237-245.

Olshansky; "Distortion Losses in Cabled Optical Fibers," Applied Optics vol. 14, p. 20 Jan. 1975.

* cited by examiner

REDUCED RADIUS OPTICAL FIBER WITH HIGH MECHANICAL RELIABILITY

This application claims the benefit of priority to Dutch Patent Application No. 2024737 filed on Jan. 23, 2020, which claims priority from U.S. Provisional Patent Application Ser. No. 62/957,879 filed on Jan. 7, 2020, the content of which is relied upon and incorporated herein by reference in its entirety.

FIELD OF THE DISCLOSURE

This disclosure pertains to optical fibers and assemblies of optical fibers. More particularly, this disclosure pertains to optical fibers and optical fiber cables configured for submarine environments. Most particularly, this disclosure pertains to optical fibers having reduced diameters and optical fiber cables having a high number of optical fibers.

BACKGROUND OF THE DISCLOSURE

Optical fibers with reduced diameters are attractive for reducing the size of ribbons and cables needed to accommodate a given optical fiber count, increasing the optical fiber count of ribbons of a given length or cables of a given diameter, decreasing ribbon or cable cost, efficiently using existing infrastructure for upgrading ribbon or cable installations, and reducing the footprint of new ribbon or cable installations.

In particular, there is an increasing demand for submarine optical fiber transmission capacity driven by the rapid growth of internet traffic among different continents. To increase the transmission capacity, wavelength division multiplexing has been used to increase the number of transmission channels and advanced modulation formats have been developed to increase the data rate per channel. However, the number of channels and channel data rate are nearly at the practical limits and increasing the number of fibers is unavoidable.

A submarine cable is designed to protect the fibers inside from water damage and other mechanical damages. The size of deep-sea cable is typically around 17-20 mm in diameter for easy installation and less vulnerability. Therefore, the space for optical fibers is limited and it is desirable to increase the fiber count without increasing the cable size.

There is accordingly a need for optical fibers having reduced diameter to increase the fiber count in cables of fixed size. In particular, there is a need for optical fibers having reduced glass diameter and/or reduced coating thickness that provide the performance needed for long haul transmission in submarine environments.

SUMMARY

The present disclosure provides low diameter optical fibers with an impact-resistant coating system and low microbend loss. The optical fiber includes a glass fiber with a radius less than the standard radius (62.5 µm) used in the industry. The coating system includes a primary coating and a secondary coating. The modulus and thickness of the secondary coating are configured to provide puncture resistance. The primary coating functions in conjunction with the secondary coating to minimize microbend losses. The primary coating also has high tear strength and is resistant to damage caused by thermal and mechanical stresses that arise during the fiber manufacturing process. The radius of the glass fiber and combined thicknesses of the primary and secondary coatings are configured to provide an optical fiber with an outer radius of less than or equal to 100 µm.

The present description extends to:
An optical fiber comprising:
a core region, the core region comprising silica glass doped with an alkali metal oxide, the core region having a radius $r_1$ in the range from 3.0 µm to 10.0 µm and a relative refractive index profile $\Delta_1$ having a maximum relative refractive index $\Delta_{1max}$ in the range from −0.15% to 0.30%;
a cladding region surrounding and directly adjacent to the core region, the cladding region having a radius $r_4$ in the range from 37.5 µm to 52.5 µm;
a primary coating surrounding and directly adjacent to the cladding region, the primary coating having a radius $r_5$, a spring constant $\chi_p$, an in situ modulus in the range from 0.05 MPa to 0.30 MPa and a thickness $r_5-r_4$ in the range from 20.0 µm to 40.0 µm; and
a secondary coating surrounding and directly adjacent to the primary coating, the secondary coating having a radius $r_6$ less than or equal to 100.0 µm, a Young's modulus greater than 1600 MPa and a thickness $r_6-r_5$ in the range from 15.0 µm to 30.0 µm.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
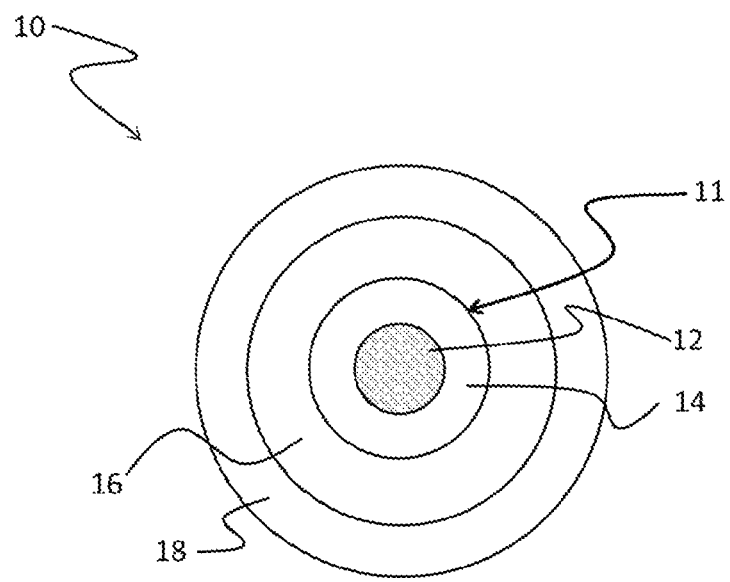
FIG. 1 is a schematic view of a coated optical fiber according to one embodiment.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

In this specification and in the claims that follow, reference will be made to a number of terms which shall be defined to have the following meanings:

"Include," "includes," or like terms means encompassing but not limited to, that is, inclusive and not exclusive.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When a value is said to be about or about equal to a certain number, the value is within ±10% of the number. For example, a value that is about 10 refers to a value between 9 and 11, inclusive. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "about" further references all terms in the range unless otherwise stated. For example, about 1, 2, or 3 is equivalent to about 1, about 2, or about 3, and further comprises from about 1 to 3, from about 1 to 2, and from about 2 to 3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

The indefinite article "a" or "an" and its corresponding definite article "the" as used herein means at least one, or one or more, unless specified otherwise.

As used herein, contact refers to direct contact or indirect contact. Direct contact refers to contact in the absence of an intervening material and indirect contact refers to contact through one or more intervening materials. Elements in direct contact touch each other. Elements in indirect contact do not touch each other, but do touch an intervening material or series of intervening materials, where the intervening material or at least one of the series of intervening materials touches the other. Elements in contact may be rigidly or non-rigidly joined. Contacting refers to placing two elements in direct or indirect contact. Elements in direct (indirect) contact may be said to directly (indirectly) contact each other.

As used herein, "directly adjacent" means directly contacting and "indirectly adjacent" mean indirectly contacting. The term "adjacent" encompasses elements that are directly or indirectly adjacent to each other.

"Optical fiber" refers to a waveguide having a glass portion surrounded by a coating. The glass portion includes a core and a cladding. The cladding surrounds and is directly adjacent to the core and includes two or more concentric regions that differ in relative refractive index. The relative refractive index of the core is greater than the relative refractive index of the cladding. The glass portion of the optical fiber is referred to herein as a "glass fiber".

"Radial position", "radius", or the radial coordinate "r" refers to radial position relative to the centerline (r=0) of the glass fiber.

The terms "inner" and "outer" are used to refer to relative values of radial coordinate or relative positions of regions of the optical fiber, where "inner" means closer to the centerline of the fiber than "outer". An inner radial coordinate is closer to the centerline of the glass fiber than an outer radial coordinate. An inner radial coordinate is between the centerline of the glass fiber and an outer radial coordinate. An inner region of an optical fiber is closer to the centerline of the glass fiber than an outer region. An inner region of an optical fiber is between the centerline of the glass fiber and the outer region of the glass fiber.

The term "mode" refers to guided mode. A single-mode fiber is an optical fiber designed to support only the fundamental LP01 modes over a substantial length of the optical fiber (e.g., at least several meters), but that under certain circumstances can support multiple modes over short distances (e.g., tens of centimeters). We assume that the birefringence of the fiber is sufficiently low to assume that the two orthogonally polarized components of the LP01 mode are degenerate and propagate with the same phase velocity. A multimode optical fiber is an optical fiber designed to support the fundamental LP01 modes and at least one higher-order $LP_{nm}$ mode over a substantial length of the optical fiber, where either n≠0 or n≠1. The optical fibers disclosed herein are preferably single-mode optical fibers at a wavelength of 1550 nm.

The "operating wavelength" of an optical fiber is the wavelength at which the optical fiber is operated. The operating wavelength corresponds to the wavelength of a guided mode. Representative operating wavelengths include 850 nm, 980 nm, 1060 nm, 1310 nm and 1550 nm, which are commonly used in telecommunications systems, optical data links, and data centers. Although a particular operating wavelength may be specified for an optical fiber, it is understood that a particular optical fiber can operate at multiple operating wavelengths and/or over a continuous range of operating wavelengths. Characteristics such as modal bandwidth and mode field diameter may vary with the operating wavelength and the relative refractive index profile of a particular optical fiber may be designed to provide optimal performance at a particular operating wavelength, a particular combination of operating wavelengths, or particular continuous range of operating wavelengths.

"Refractive index" refers to the refractive index at a wavelength of 1550 nm.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (e.g. core region and/or any of the cladding regions), it is expressed in terms of its actual or approximate functional dependence, or its value at a particular position within the region, or in terms of an average value applicable to the region as a whole. Unless otherwise specified, if the relative refractive index of a region (e.g. core region and/or any of the cladding regions) is expressed as a single value or as a parameter (e.g. Δ or Δ %) applicable to the region as a whole, it is understood that the relative refractive index in the region is constant, or approximately constant, and corresponds to the single value, or that the single value or parameter represents an average value of a non-constant relative refractive index dependence with radial position in the region. For example, if "i" is a region of the glass fiber, the parameter $\Delta_i$ refers to the average value of relative refractive index in the region as defined by Eq. (2) below, unless otherwise specified. Whether by design or a consequence of normal manufacturing variability, the dependence of relative refractive index on radial position may be sloped, curved, or otherwise non-constant.

"Relative refractive index," as used herein, is defined in Eq. (1) as:

$$\Delta_i(r_i)\% = 100\frac{(n_i^2 - n_{ref}^2)}{2n_i^2} \tag{1}$$

where $n_i$ is the refractive index at radial position $r_i$ in the glass fiber, unless otherwise specified, and $n_{ref}$ is the refractive index of pure silica glass, unless otherwise specified. Accordingly, as used herein, the relative refractive index percent is relative to pure silica glass, which has a refractive index of 1.444 at a wavelength of 1550 nm. As used herein, the relative refractive index is represented by Δ (or "delta") or Δ % (or "delta %) and its values are given in units of "%", unless otherwise specified. Relative refractive index may also be expressed as Δ(r) or Δ(r) %.

The average relative refractive index ($\Delta_{ave}$) of a region of the fiber is determined from Eq. (2):

$$\Delta_{ave} = \int_{r_{inner}}^{r_{outer}} \frac{\Delta(r)dr}{(r_{outer} - r_{inner})} \tag{2}$$

where $r_{inner}$ is the inner radius of the region, $r_{outer}$ is the outer radius of the region, and Δ(r) is the relative refractive index of the region.

The term "α-profile" refers to a relative refractive index profile Δ(r) that has the functional form defined in Eq. (3):

$$\Delta(r) = \Delta(r_0)\left[1 - \left[\frac{|r - r_0|}{(r_z - z_0)}\right]^\alpha\right] \tag{3}$$

where $r_o$ is the radial position at which Δ(r) is maximum, $r_z > r_0$ is the radial position at which Δ(r) decreases to its minimum value, and r is in the range $r_i \leq r \leq r_f$, where $r_i$ is the initial radial position of the α-profile, $r_f$ is the final radial position of the α-profile, and α is a real number. $\Delta(r_0)$ for an α-profile may be referred to herein as $\Delta_{max}$ or, when referring to a specific region i of the fiber, as $\Delta_{i,max}$. When the relative refractive index profile of the fiber core region is described by an α-profile with $r_0$ occurring at the centerline (r=0) and $r_z$ corresponding to the outer radius $r_1$ of the core region, and $\Delta_1(r_1)=0$, Eq. (3) simplifies to Eq. (4):

$$\Delta_1(r) = \Delta_{1max}\left[1 - \left[\frac{r}{r_1}\right]^\alpha\right] \tag{4}$$

The term "super-Gaussian profile" refers to a relative refractive index profile Δ(r) that has the functional form defined in Eq. (5):

$$\Delta_1(r) = \Delta_{1max}\exp\left(-\left(\frac{r}{a}\right)^\gamma\right) \tag{5}$$

where r is the radial distance from the centerline, γ is a positive number, and a is a radial scaling parameter such that when r=a, $\Delta_1 = \Delta_{1max}/e$.

The "mode field diameter" or "MFD" of an optical fiber is defined in Eq. (6) as:

$$MFD = 2w \tag{6}$$

$$w^2 = 2\frac{\int_0^\infty (f(r))^2 r dr}{\int_0^\infty \left(\frac{df(r)}{dr}\right)^2 r dr}$$

where f(r) is the transverse component of the electric field distribution of the guided optical signal and r is radial position in the fiber. "Mode field diameter" or "MFD" depends on the wavelength of the optical signal and is reported herein for a wavelength of 1550 nm. Specific indication of the wavelength will be made when referring to mode field diameter herein. Unless otherwise specified, mode field diameter refers to the $LP_{01}$ mode at the specified wavelength.

"Effective area" of an optical fiber is defined in Eq. (7) as:

$$A_{\mathit{eff}} = \frac{2\pi \left[ \int_0^\infty (f(r))^2 r dr \right]^2}{\int_0^\infty (f(r))^4 r dr} \qquad (7)$$

where f(r) is the transverse component of the electric field of the guided optical signal and r is radial position in the fiber. "Effective area" or "$A_{\mathit{eff}}$" depends on the wavelength of the optical signal and is understood herein to refer to a wavelength of 1550 nm.

"Trench region" refers to a region of the cladding of a glass fiber that is surrounded by and directly adjacent to an outer cladding region. The trench region extends from an inner radial coordinate $r_{\mathit{Trench, inner}}$ to an outer radial coordinate $r_{\mathit{Trench,outer}}$. The relative refractive index at all radial positions in the trench region is less than the relative refractive index of the outer cladding region.

"Trench volume" of a trench region is defined as:

$$V_{\mathit{Trench}} = \left| 2 \int_{r_{\mathit{Trench,inner}}}^{r_{\mathit{Trench,outer}}} (\Delta_{\mathit{Trench}}(r) - \Delta_4) r dr \right| \qquad (8)$$

where $r_{\mathit{Trench,inner}}$ is the inner radius of the trench region, $r_{\mathit{Trench,outer}}$ is the outer radius of the trench region, $\Delta_4$ is the relative refractive index of the outer cladding region that surrounds and is directly adjacent to the trench region, and $\Delta_{\mathit{Trench}}(r)$ is the relative refractive index of the trench, where $\Delta_{\mathit{Trench}}(r) < \Delta_4$ at all radial positions between $r_{\mathit{Trench,inner}}$ and $r_{\mathit{Trench,outer}}$. The trench region is also referred to herein as an intermediate cladding region. In the present disclosure, $r_{\mathit{Trench,inner}}$ is referred to as $r_1$ (in embodiments without an inner cladding region) or $r_2$ (in embodiments with an inner cladding region), $r_{\mathit{Trench,outer}}$ is referred to as $r_3$, and $\Delta_{\mathit{Trench}}$ is referred to as $\Delta_3$. $V_{\mathit{Trench}}$ may also be referred to as $V_3$. Trench volume is defined as an absolute value and has a positive value. Trench volume is expressed herein in units of % $\Delta$micron$^2$, % $\Delta$-micron$^2$, % $\Delta$-µm$^2$, or % $\Delta$µm$^2$, whereby these units can be used interchangeably herein.

The "cutoff wavelength" of an optical fiber is the minimum wavelength at which the optical fiber will support only one propagating mode. For wavelengths below the cutoff wavelength, multimode transmission may occur and multipath interference between the $LP_{01}$ and one or more higher order modes may arise to limit the information carrying capacity of the optical fiber. Cutoff wavelength will be reported herein as a fiber cutoff wavelength or a cable cutoff wavelength. The fiber cutoff wavelength is based on a 2-meter fiber length and the cable cutoff wavelength is based on a 22-meter cabled fiber length. The 22-meter cable cutoff wavelength is typically less than the 2-meter cutoff wavelength due to higher levels of bending and mechanical pressure in the cable environment. The fiber cutoff wavelength $\lambda_{\mathit{CF}}$ is based on a 2-meter fiber length while the cable cutoff wavelength $\lambda_{\mathit{CC}}$ is based on a 22-meter cabled fiber length as specified in TIA-455-80: FOTP-80 IEC-60793-1-44 Optical Fibres—Part 1-44: Measurement Methods and Test Procedures—Cut-off Wavelength (21 May 2003), by Telecommunications Industry Association (TIA).

"Chromatic dispersion", herein referred to as "dispersion" unless otherwise noted, of an optical fiber is the sum of the material dispersion, the waveguide dispersion, and the intermodal dispersion. In the case of single mode waveguide fibers, the intermodal dispersion is zero. Dispersion values in a two-mode regime assume intermodal dispersion is zero. The zero-dispersion wavelength ($\lambda_0$) is the wavelength at which the dispersion has a value of zero.

The "spring constant" $\chi_p$ of a primary coating is computed from Eq. (9):

$$\chi_p = \frac{E_p d_g}{t_p} \qquad (9)$$

where $E_p$ is the in situ modulus of the primary coating, $t_p$ is the thickness of the primary coating, and $d_g$ is the diameter $2r_4$ of the glass fiber. The spring constant is a phenomenological parameter that describes the extent to which the primary coating mitigates coupling of the secondary coating to the glass fiber. (See "Relationship of Mechanical Characteristics of Dual Coated Single Mode Optical Fibers and Microbending Loss", by J. Baldauf et al., IEICE Transactions on Communications, Vol. E76-B, No. 4, pp. 352-357 (1993)) In the phenomenological model, the buffering effect of the primary coating is modeled as a spring with the spring constant given in Eq. (9). A low spring constant leads to greater resistance to microbending. The tradeoff of in situ modulus and thickness in establishing the resistance of the primary coating to microbending is reflected in the spring constant.

The optical fibers disclosed herein include a core region, a cladding region surrounding the core region, and a coating surrounding the cladding region. The core region and cladding region are glass and define a glass fiber. The cladding region includes multiple regions, at least two of which differ in relative refractive index. In one embodiment, the multiple cladding regions are concentric regions that include an intermediate cladding region surrounding and directly adjacent to the core region and an outer cladding region surrounding and directly adjacent to the intermediate cladding region. In another embodiment, the multiple cladding regions are concentric regions that include an inner cladding region surrounding and directly adjacent to the core region, an intermediate cladding region surrounding and directly adjacent to the inner cladding region, and an outer cladding region surrounding and directly adjacent to the intermediate cladding region. The intermediate cladding region has a lower relative refractive index than the outer cladding region. The intermediate cladding region may also be referred to herein as a trench or trench region and has a trench volume given by Eq. (8). The intermediate cladding region may contribute to a reduction in bending losses. The core region, cladding region, inner cladding region, intermediate cladding region, and outer cladding region are also referred to as core, cladding, inner cladding, intermediate cladding, and outer cladding, respectively. All embodiments of the optical fiber include a glass fiber with a core, an intermediate cladding, and an outer cladding. In some embodiments, the glass fiber also includes an inner cladding between the intermediate cladding and core; that is, the inner cladding is optional.

Whenever used herein, radial position $r_1$ and relative refractive index $\Delta_1$ or $\Delta_1(r)$ refer to the core region, radial position $r_2$ and relative refractive index $\Delta_2$ or $\Delta_2(r)$ refer to the inner cladding region, radial position $r_3$ and relative refractive index $\Delta_3$ or $\Delta_3(r)$ refer to the intermediate cladding region, radial position $r_4$ and relative refractive index $\Delta_4$ or $\Delta_4(r)$ refer to the outer cladding region, radial position $r_5$ refers to the primary coating, radial position $r_6$ refers to the secondary coating, and radial position $r_7$ refers to the tertiary coating.

The relative refractive index $\Delta_1(r)$ has a maximum value $\Delta_{1max}$ and a minimum value $\Delta_{1min}$. The relative refractive index $\Delta_2(r)$ has a maximum value $\Delta_{2max}$ and a minimum value $\Delta_{2min}$. The relative refractive index $\Delta_3(r)$ has a maximum value $\Delta_{3max}$ and a minimum value $\Delta_{3min}$. The relative refractive index $\Delta_4(r)$ has a maximum value $\Delta_{4max}$ and a minimum value $\Delta_{4min}$. In embodiments in which the relative refractive index is constant or approximately constant over a region, the maximum and minimum values of the relative refractive index are equal or approximately equal. Unless otherwise specified, if a single value is reported for the relative refractive index of a region, the single value corresponds to an average value for the region.

It is understood that the central core region is substantially cylindrical in shape and that a surrounding inner cladding region, a surrounding intermediate cladding region, a surrounding outer cladding region, a surrounding primary coating, a surrounding secondary coating, and a surrounding tertiary coating are substantially annular in shape. Annular regions may be characterized in terms of an inner radius and an outer radius. Radial positions $r_1$, $r_2$, $r_3$, $r_4$, $r_5$, $r_6$, and $r_7$ refer herein to the outer radii of the core, inner cladding, intermediate cladding, outer cladding, primary coating, secondary coating, and tertiary coating, respectively. The radius $r_4$ defines the outer boundary of the glass fiber. The radius $r_6$ also corresponds to the outer radius of the optical fiber in embodiments without a tertiary coating. When a tertiary coating is present, the radius $r_7$ corresponds to the outer radius of the optical fiber.

When two regions are directly adjacent to each other, the outer radius of the inner of the two regions coincides with the inner radius of the outer of the two regions. For example, the glass fibers disclosed herein include an intermediate cladding region surrounded by and directly adjacent to an outer cladding region. In such an embodiment, the radius $r_3$ corresponds to the outer radius of the intermediate cladding region and the inner radius of the outer cladding region.

As noted above, the inner cladding region is optional. In embodiments with an inner cladding region, the radius $r_2$ corresponds to the outer radius of the inner cladding region and the inner radius of the intermediate cladding region. In embodiments without an inner cladding region, the radius $r_1$ corresponds to the outer radius of the core region and the inner radius of the intermediate cladding region. That is, in embodiments without an inner cladding region, the intermediate cladding region is directly adjacent to the core region.

The following terminology applies to embodiments in which the relative refractive index profile includes an inner cladding region surrounding and directly adjacent to the core, an intermediate cladding region surrounding and directly adjacent to the inner cladding region, an outer cladding region surrounding and directly adjacent to the intermediate cladding region, a primary coating surrounding and directly adjacent to the outer cladding region, and a secondary coating surrounding and directly adjacent to the primary coating. The difference between radial position $r_2$ and radial position $r_1$ is referred to herein as the thickness of the inner cladding region. The difference between radial position $r_3$ and radial position $r_2$ is referred to herein as the thickness of the intermediate cladding region. The difference between radial position $r_4$ and radial position $r_3$ is referred to herein as the thickness of the outer cladding region. The difference between radial position $r_5$ and radial position $r_4$ is referred to herein as the thickness of the primary coating. The difference between radial position $r_6$ and radial position $r_5$ is referred to herein as the thickness of the secondary coating. The difference between radial position $r_7$ and radial position $r_6$ is referred to herein as the thickness of the tertiary coating.

The following terminology applies to embodiments in which an intermediate cladding region is directly adjacent to a core region and an outer cladding region is directly adjacent the intermediate cladding region. The difference between radial position $r_3$ and radial position $r_1$ is referred to herein as the thickness of the intermediate cladding region. The difference between radial position $r_4$ and radial position $r_3$ is referred to herein as the thickness of the outer cladding region. The difference between radial position $r_5$ and radial position $r_4$ is referred to herein as the thickness of the primary coating. The difference between radial position $r_6$ and radial position $r_5$ is referred to herein as the thickness of the secondary coating. The difference between radial position $r_7$ and radial position $r_6$ is referred to herein as the thickness of the tertiary coating.

As will be described further hereinbelow, the relative refractive indices of the core region, intermediate cladding region, and outer cladding region differ. The relative refractive index $\Delta_2$ of the inner cladding region is less than the relative refractive index $\Delta_1$ of the core region and greater than the relative refractive index $\Delta_3$ of the intermediate cladding region. The relative refractive index $\Delta_2$ of the inner cladding region may be less than, equal to, or greater than the relative refractive index $\Delta_4$ of the outer cladding region. Each of the regions is formed from doped or undoped silica glass. Variations in refractive index relative to undoped silica glass are accomplished by incorporating updopants or downdopants at levels designed to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is pure silica glass. When the undoped glass is pure silica glass, updopants include Cl, Br, Ge, Al, P, Ti, Zr, Nb, and Ta, and downdopants include F and B. Regions of constant refractive index may be formed by not doping or by doping at a uniform concentration. Regions of variable refractive index are formed through non-uniform spatial distributions of dopants and/or through incorporation of different dopants in different regions. Refractive index varies approximately linearly with the concentration of the updopant or downdopant. For example, each 1 wt % Cl as a dopant in silica glass increases the relative refractive index by about 0.083 $\Delta$ % and each 1 wt % F as a dopant in silica glass decreases the relative refractive index by about 0.32 $\Delta$ %.

The coatings described herein are formed from curable coating compositions. Curable coating compositions include one or more curable components. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition. The cured product is preferably a polymer. The curing process is induced by energy. Forms of energy include radiation or thermal energy. In a preferred embodiment, curing occurs with radiation, where radiation refers to electromagnetic radiation. Curing induced by radiation is referred to herein as radiation curing or photocuring. A radiation-curable component is a component that can be induced to undergo a curing reaction when exposed to radiation of a suitable wavelength at a suitable intensity for a sufficient period of time. Suitable wavelengths include wavelengths in the infrared, visible, or ultraviolet portion of the electromagnetic spectrum. The radiation curing reaction occurs in the presence of a photoinitiator. A radiation-curable component may also be thermally curable. Similarly, a thermally curable component is a component that can be induced to undergo a curing reaction when exposed to thermal energy of sufficient intensity for a sufficient period of time. A thermally curable component may also be radiation curable.

A curable component includes one or more curable functional groups. A curable component with only one curable functional group is referred to herein as a monofunctional curable component. A curable component having two or more curable functional groups is referred to herein as a multifunctional curable component. Multifunctional curable components include two or more functional groups capable of forming covalent bonds during the curing process and can introduce crosslinks into the polymeric network formed during the curing process. Multifunctional curable components may also be referred to herein as "crosslinkers" or "curable crosslinkers". Curable components include curable monomers and curable oligomers. Examples of functional groups that participate in covalent bond formation during the curing process are identified hereinafter.

The term "molecular weight" when applied to polyols means number average molecular weight ($M_n$).

The term "(meth)acrylate" means methacrylate, acrylate, or a combination of methacrylate and acrylate.

Values of in situ modulus, Young's modulus, % elongation, and tear strength refer to values as determined under the measurement conditions by the procedures described herein.

Reference will now be made in detail to illustrative embodiments of the present description.

The optical fibers disclosed herein include a glass fiber surrounded by a coating. An example of an optical fiber is shown in schematic cross-sectional view in FIG. 1. Optical fiber 10 includes a glass fiber 11 surrounded by primary coating 16 and secondary coating 18. Further description of glass fiber 11, primary coating 16, and secondary coating 18 is provided below.

Figure 2:
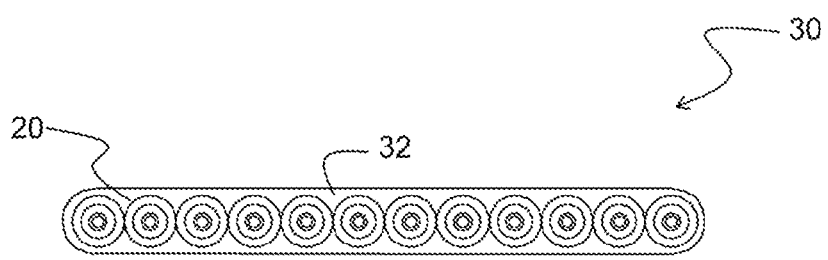
FIG. 2 is a schematic view of a representative optical fiber ribbon.

FIG. 2 illustrates an optical fiber ribbon 30. The ribbon 30 includes a plurality of optical fibers 20 and a matrix 32 encapsulating the plurality of optical fibers. Optical fibers 20 include a core region, a cladding region, a primary coating, and a secondary coating as described above. Optical fibers 20 may also include a tertiary coating as noted above. The secondary coating may include a pigment. The optical fibers 20 are aligned relative to one another in a substantially planar and parallel relationship. The optical fibers in fiber optic ribbons are encapsulated by the ribbon matrix 32 in any known configuration (e.g., edge-bonded ribbon, thin-encapsulated ribbon, thick-encapsulated ribbon, or multi-layer ribbon) by conventional methods of making fiber optic ribbons. In FIG. 2, the fiber optic ribbon 30 contains twelve (12) optical fibers 20; however, it should be apparent to those skilled in the art that any number of optical fibers 20 (e.g., two or more) may be employed to form fiber optic ribbon 30 disposed for a particular use. The ribbon matrix 32 can be formed from the same composition used to prepare a secondary coating, or the ribbon matrix 32 can be formed from a different composition that is otherwise compatible for use.

Figure 3:
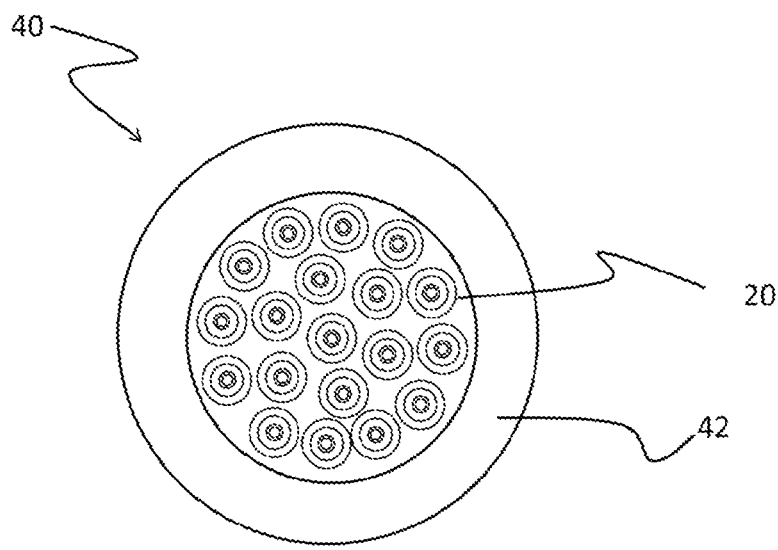
FIG. 3 is a schematic view of a representative optical fiber cable.

FIG. 3 illustrates an optical fiber cable 40. Cable 40 includes a plurality of optical fibers 20 surrounded by jacket 42. Optical fibers 20 may be densely or loosely packed into a conduit enclosed by inner surface 44 of jacket 42. The number of fibers placed in jacket 42 is referred to as the "fiber count" of optical fiber cable 40. The jacket 42 is formed from an extruded polymer material and may include multiple concentric layers of polymers or other materials. Optical fiber cable 40 may include one or more strengthening members (not shown) embedded within jacket 42 or placed within the conduit defined by inner surface 44. Strengthening members include fibers or rods that are more rigid than jacket 42. The strengthening member is made from metal, braided steel, glass-reinforced plastic, fiberglass, or other suitable material. Optical fiber cable 40 may include other layers surrounded by jacket 42 (e.g. armor layers, moisture barrier layers, rip cords, etc.). Optical fiber cable 40 may have a stranded, loose tube core or other fiber optic cable construction.

Glass Fiber. The optical fibers disclosed herein include a glass fiber with a core region, a cladding region surrounding the core region, and a coating surrounding the cladding region. The core region and cladding region are glass. Glass fiber 11 includes a core region 12 and a cladding region 14, as is familiar to the skilled artisan. Core region 12 has a higher refractive index than cladding region 14 and glass fiber 11 functions as a waveguide.

In many applications, the core region and cladding region have a discernible core-cladding boundary. Alternatively, the core region and cladding region can lack a distinct boundary. One type of fiber is a step-index fiber. Another type of fiber is a graded-index fiber, which has a core region with a refractive index that varies with distance from the fiber center. Examples of graded-index fibers are fibers with a core region having a relative refractive index profile with an α-profile defined by Eq. (4) above or the super-Gaussian profile defined by Eq. (5) above.

Figure 4A:
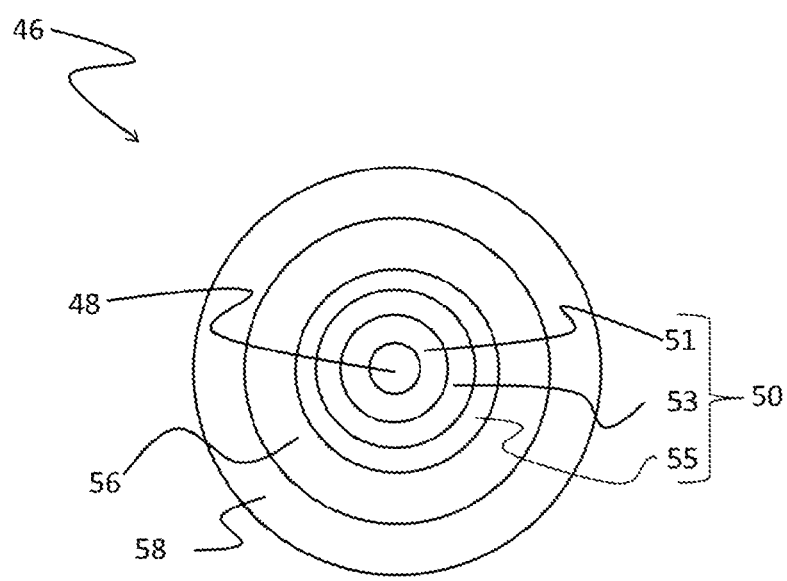
FIG. 4A depicts a cross-sectional view of an optical fiber having a core region, an inner cladding region, an intermediate cladding region, an outer cladding region, a primary coating, and a secondary coating.
Figure 4B:
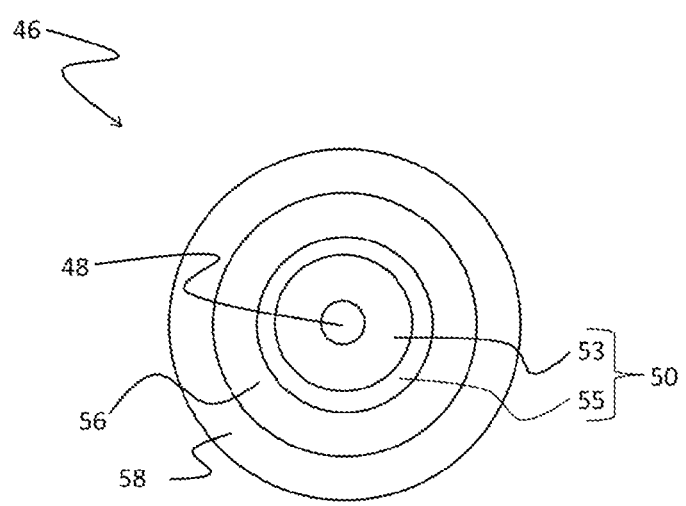
FIG. 4B depicts a cross-sectional view of an optical fiber having a core region, an intermediate cladding region, an outer cladding region, a primary coating, and a secondary coating.

A schematic cross-sectional depiction of an optical fiber is shown in FIGS. 4A and 4B. In FIG. 4A, optical fiber 46 includes core region 48, cladding region 50, primary coating 56, and secondary coating 58. Cladding region 50 includes inner cladding region 51, intermediate cladding region 53 and outer cladding region 55. In FIG. 4B, optical fiber 46 includes core region 48, cladding region 50, primary coating 56, and secondary coating 58. Cladding region 50 includes intermediate cladding region 53 and outer cladding region 55.

Figure 5A:
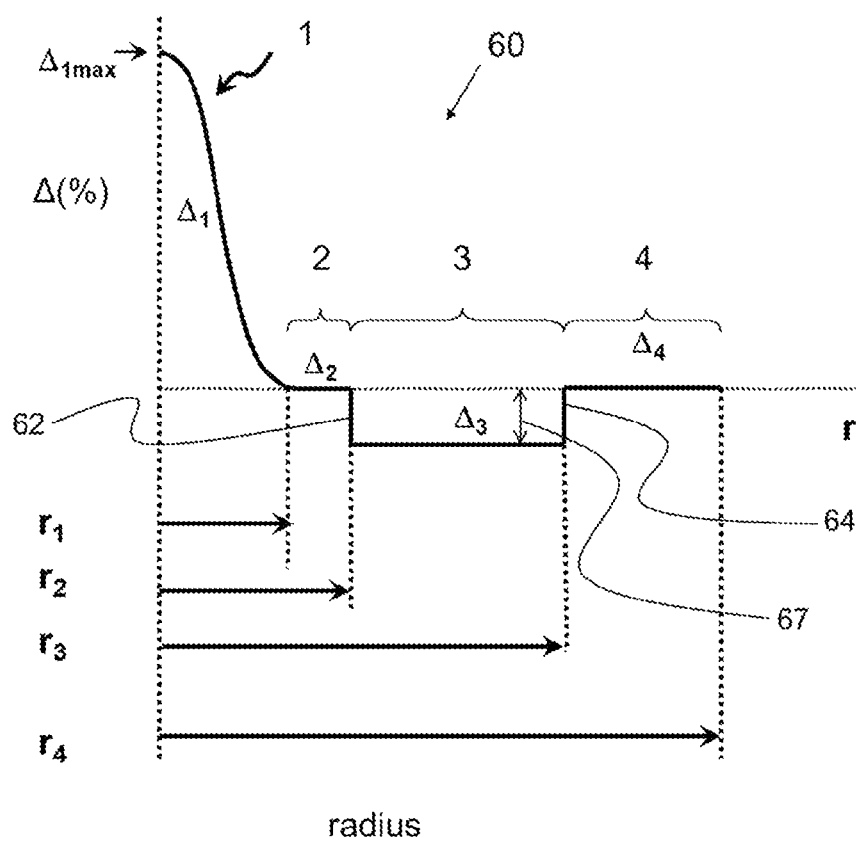
FIG. 5A depicts a relative refractive index profile of a glass fiber having a core region, an inner cladding region, an intermediate cladding region, and an outer cladding region.
Figure 5B:
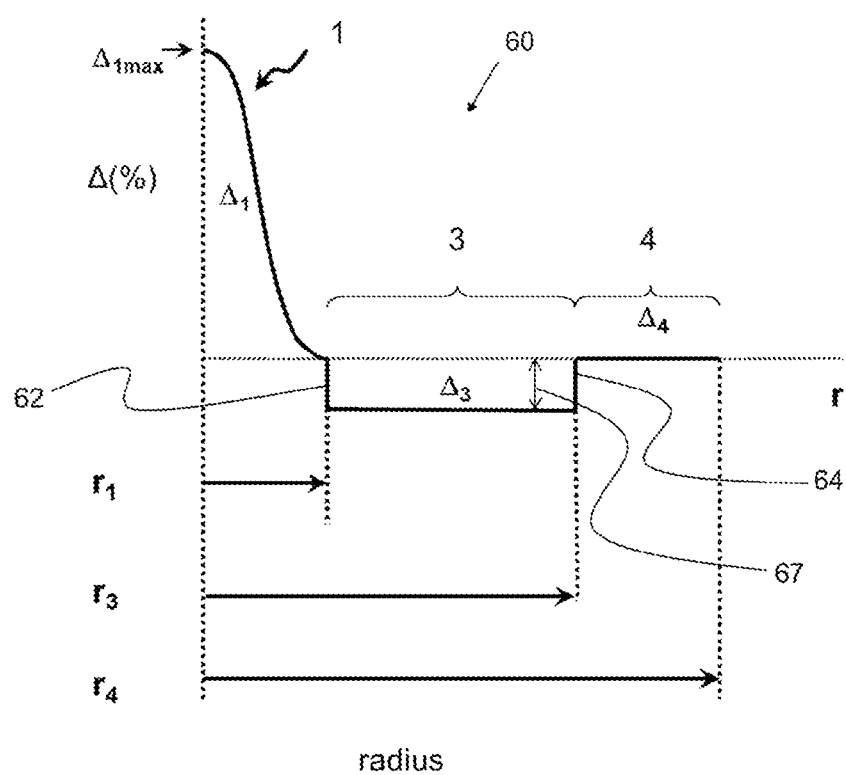
FIG. 5B depicts a relative refractive index profile of a glass fiber having a core region, an intermediate cladding region, and an outer cladding region.

A representative relative refractive index profile for a glass fiber is presented in FIGS. 5A and 5B. FIG. 5A shows a rectangular trench profile for a glass fiber 60 having a core region (1) with outer radius $r_1$ and relative refractive index $\Delta_1$ with maximum relative refractive index $\Delta_{1max}$, an inner cladding region (2) extending from radial position $r_1$ to radial position $r_2$ and having relative refractive index $\Delta_2$, an intermediate cladding region (3) extending from radial position $r_2$ to radial position $r_3$ and having relative refractive index $\Delta_3$, and an outer cladding region (4) extending from radial position $r_3$ to radial position $r_4$ and having relative refractive index $\Delta_4$.

FIG. 5B shows a rectangular trench profile for a glass fiber 60 having a core region (1) with outer radius $r_1$ and relative refractive index $\Delta_1$ with maximum relative refractive index $\Delta_{1max}$, an intermediate cladding region (3) extending from radial position $r_1$ to radial position $r_3$ and having relative refractive index $\Delta_3$, and an outer cladding region (4) extending from radial position $r_3$ to radial position $r_4$ and having relative refractive index $\Delta_4$.

In the profiles of FIGS. 5A and 5B, the intermediate cladding region (3) is a trench with a constant or average relative refractive index $\Delta_3$ that is less than the constant or average relative refractive index $\Delta_4$ of the outer cladding region (4). The intermediate cladding region (3) has a trench volume as defined in Eq. (8) above. Core region (1) has the highest average and maximum relative refractive index in the profile. Core region (1) may include a lower index region at or near the centerline (known in the art as a "centerline dip") (not shown).

In the profiles shown in FIGS. 5A and 5B, the core region (1) of the glass fiber has a graded index with a relative refractive index described by a super-Gaussian profile. The radial position $r_0$ (corresponding to $\Delta_{1max}$) of the super-Gaussian profile corresponds to the centerline (r=0) of the fiber and the radial position $r_z$ of the super-Gaussian profile corresponds to the core radius $r_1$. In embodiments with a centerline dip, the radial position $r_0$ is slightly offset from the centerline of the fiber. In other embodiments (not shown), core region (1) is a step index relative refractive index profile or an α-profile relative refractive index profile instead of a super-Gaussian profile. In still other embodiments, core region (1) has a relative refractive index profile not defined by any of an α-profile, a super-Gaussian profile, or a step-index profile. In some embodiments, the relative refractive index $\Delta_1$ continuously decreases in the radial direction away from the centerline. In other embodiments, relative refractive index $\Delta_1$ varies over some radial positions between the centerline and $r_1$, and also includes a constant or approximately constant value over other radial positions between the centerline and $r_1$.

In the profile shown in FIG. 5A, transition region 62 from inner cladding region (2) to intermediate cladding region (3) and transition region 64 from intermediate cladding region (3) to outer cladding region (4) are shown as step changes. It is to be understood that a step change is an idealization and that transition region 62 and transition region 64 may not be strictly vertical in practice. Instead, transition region 62 and/or transition region 64 may have a slope or curvature. When transition region 62 and/or transition region 64 are non-vertical, the inner radius $r_2$ and outer radius $r_3$ of intermediate cladding region (3) correspond to the mid-points of transition regions 62 and 64, respectively. The mid-points correspond to half of the depth 67 of the intermediate cladding region (3) relative to the outer cladding region (4).

The relative ordering of relative refractive indices $\Delta_1$, $\Delta_2$, $\Delta_3$, and $\Delta_4$ in the relative refractive index profile shown in FIG. 5A satisfy the conditions $\Delta_{1max}>\Delta_4>\Delta_3$ and $\Delta_{1max}>\Delta_2>\Delta_3$.

In the profile shown in FIG. 5B, transition region 62 from core region (1) to intermediate cladding region (3) and transition region 64 from intermediate cladding region (3) to outer cladding region (4) are shown as step changes. It is to be understood that a step change is an idealization and that transition region 62 and transition region 64 may not be strictly vertical in practice. Instead, transition region 62 and/or transition region 64 may have a slope or curvature. When transition region 62 and/or transition region 64 are non-vertical, the inner radius $r_1$ and outer radius $r_3$ of intermediate cladding region (3) correspond to the mid-points of transition regions 62 and 64, respectively. The mid-points correspond to half of the depth 67 of the intermediate cladding region (3) relative to the outer cladding region (4).

The relative ordering of relative refractive indices $\Delta_1$, $\Delta_3$, and $\Delta_4$ in the relative refractive index profile shown in FIG. 5B satisfy the condition $\Delta_{1max}>\Delta_4>\Delta_3$.

The core region comprises silica glass. Preferably, the silica glass of the core region is Ge-free; that is the core region comprises silica glass that lacks Ge. The silica glass of the core region is undoped silica glass, updoped silica glass, and/or downdoped silica glass. Updoped silica glass includes silica glass doped with an alkali metal oxide (e.g. $Na_2O$, $K_2O$, $Li_2O$, $Cs_2O$, or $Rb_2O$). Downdoped silica glass includes silica glass doped with F. In some embodiments, the core region is co-doped with alkali metal oxide and fluorine. The concentration of alkali metal oxide (e.g. $K_2O$) in the core, expressed in terms of the amount of alkali metal (e.g. K), is in the range from 20 ppm to 500 ppm, or 35 ppm to 400 ppm, or 50 ppm to 300 ppm, where ppm refers to parts per million by weight.

In some embodiments, the core region includes an updopant and a downdopant, where the concentration of updopant is highest at the centerline (r=0) and lowest at the radius $r_1$ and the concentration of downdopant is lowest at the centerline (r=0) and highest at the radius $r_1$. In such embodiments, the relative refractive index $\Delta_1$ may have a positive value near the centerline (r=0) and decrease to a negative value at the radius $r_1$.

In one embodiment, the core region is a segmented core region that includes an inner core region surrounded by an outer core region, where the inner core region comprises updoped silica glass and has a positive maximum relative refractive index $\Delta_{1max}$, and the outer core region comprises downdoped silica glass and has a negative minimum relative refractive index $\Delta_{1min}$. The updoped silica glass of the inner core region includes an updopant or a combination of an updopant and downdopant. In embodiments in which the inner core region includes a combination of an updopant and downdopant, the relative concentrations of updopant and downdopant are adjusted to provide a net positive value of the maximum relative refractive index. In embodiments in which the outer core region includes a combination an updopant and downdopant, the relative concentrations of updopant and downdopant are adjusted to provide a net negative value of the relative refractive index. In embodiments with a segmented core, $\Delta_1$ (and $\Delta_{1max}$ and $\Delta_{1min}$) refer to the entirety of the core region, including the inner core region and the outer core region, $r_1$ corresponds to the outer radius of the outer core region, and $r_a$ corresponds to the outer radius of the inner core region. The boundary between the inner core region and outer core region occurs at radial position $r_a$, where $r_a<r_1$.

In some embodiments, the relative refractive index of the core region of the glass fiber is described by an α-profile with an α value in the range from 1.5 to 10, or in the range from 1.7 to 8.0, or in the range from 1.8 to 6.0, or in the range from 1.9 to 5.0, or in the range from 1.95 to 4.5, or in the range from 2.0 to 4.0, or in the range from 4.0 to 9.5, or in the range from 5.0 to 9.0, or in the range from 10 to 100, or in the range from 11 to 40, or in the range from 12 to 30. As the value of a increases, the relative refractive profile more closely approaches a step index profile. In some embodiments with a segmented core region, either or both of the inner core region and outer core region has a relative refractive index described by an α-profile with an α value as described herein.

The outer radius $r_1$ of the core region is in the range from 3.0 μm to 10.0 μm, or in the range from 3.5 μm to 9.0 μm, or in the range from 4.0 μm to 8.0 μm. In some embodiments, the core region includes a portion with a constant or approximately constant relative refractive index that has a width in the radial direction of at least 1.0 μm, or at least 2.0 μm, or at least 3.0 μm, or at least 4.0 μm, or at least 5.0 μm, or in the range from 1.0 μm to 6.0 μm, or in the range from 2.0 μm to 5.0 μm. In an embodiment, the portion of the core region having a constant or approximately constant relative refractive index has a relative refractive index of $\Delta_{1min}$. In embodiments with a segmented core region, the radius $r_a$ is in the range from 0.25 μm to 3.0 μm, or in the range from 0.5 μm to 2.5 μm, or in the range from 0.75 μm to 2.0 μm.

The relative refractive index $\Delta_1$ or $\Delta_{1max}$ of the core region is in the range from −0.15% to 0.30%, or in the range from −0.10% to 0.20%, or in the range from −0.05% to 0.15%, or in the range from 0.00% to 0.10%. The minimum relative refractive index $\Delta_{1min}$ of the core is in the range from −0.20% to 0.10%, or in the range from −0.15% to 0.05%, or in the range from −0.15% to 0.00%.

In some embodiments, the relative refractive index of the core region is described by a step-index profile having a constant or approximately constant value corresponding to $\Delta_{1max}$.

The inner cladding region comprises undoped silica glass, updoped silica glass, or downdoped silica glass. The relative refractive index $\Delta_2$ of the inner cladding region is in the range from −0.60% to 0.00%, or in the range from −0.55% to −0.05%, or in the range from −0.50% to −0.10%, or in the range from −0.45% to −0.15%. The relative refractive index $\Delta_2$ is preferably constant or approximately constant. The difference $\Delta_2$ to $\Delta_3$ (or the difference $\Delta_2$ to $\Delta_{3min}$, or the difference $\Delta_{2max}$ to $\Delta_3$, or the difference $\Delta_{2max}$ to $\Delta_{3min}$) is greater than 0.10%, or greater than 0.15%, or greater than 0.20%, or greater than 0.25%, or greater than 0.30%, or in the range from 0.10% to 0.40%, or in the range from 0.15% to 0.35%. The relative refractive index $\Delta_2$ of the inner cladding region is less than, equal to, or greater than the relative refractive index $\Delta_4$ of the outer cladding region.

The inner radius of the inner cladding region is $r_1$ and has the values given above. The outer radius $r_2$ of the inner cladding region is in the range from 6.0 μm to 18.0 μm, or in the range from 7.0 μm to 16.0 μm, or in the range from 8.0 μm to 14.0 μm. The thickness $r_2-r_1$ of the inner cladding region is in the range from 2.0 μm to 10.0 μm, or in the range from 3.0 μm to 9.0 μm, or in the range from 4.0 μm to 8.0 μm.

The intermediate cladding region comprises downdoped silica glass. The preferred downdopant is F (fluorine). The concentration of F (fluorine) is in the range from 0.1 wt % to 2.5 wt %, or in the range from 0.25 wt % to 2.25 wt %, or in the range from 0.3 wt % to 2.0 wt %.

In embodiments in which the relative refractive index profile includes an intermediate cladding region, the relative refractive index $\Delta_3$ or $\Delta_{3min}$ is in the range from −0.30% to −0.90%, or in the range from −0.30% to −0.70%, or in the range from −0.30% to −0.60%, or in the range from −0.30% to −0.50%, or in the range from −0.35% to −0.75%, or in the range from −0.35% to −0.60%, or in the range from −0.40% to −0.70%, or in the range from −0.45% to −0.70%. The relative refractive index $\Delta_3$ is preferably constant or approximately constant. The difference $\Delta_{1max}$ to $r_3$ (or the difference $\Delta_{1max}$ to $\Delta_{3min}$, or the difference $\Delta_1$ to $\Delta_3$, or the difference $\Delta_1$ to $\Delta_{3min}$) is greater than 0.20%, or greater than 0.30%, or greater than 0.40%, or greater than 0.50%, or greater than 0.60%, or in the range from 0.25% to 0.70%, or in the range from 0.35% to 0.60%. The difference $\Delta_{1min}$ to $\Delta_3$ (or the difference $\Delta_{1min}$ to $\Delta_{3min}$) is greater than 0.20%, or greater than 0.30%, or greater than 0.40%, or greater than 0.50%, or in the range from 0.20% to 0.60%, or in the range from 0.25% to 0.50%.

The inner radius of the intermediate cladding region is $r_1$ (in embodiments without an inner cladding region) or $r_2$ (in embodiments with an inner cladding region) and has the values specified above. The outer radius $r_3$ of the intermediate cladding region is in the range from 10.0 μm to 30.0 μm, or in the range from 12.5 μm to 27.5 μm, or in the range from 15.0 μm to 25.0 μm. The thickness $r_3-r_1$ (in embodiments without an inner cladding region) or the thickness $r_3-r_2$ (in embodiments with an inner cladding region) of the intermediate cladding region is in the range from 2.0 μm to 22.0 μm, or in the range from 5.0 μm to 20.0 μm, or in the range from or in the range from 7.5 μm to 17.5 μm, or in the range from 10.0 μm to 15.0 μm.

In embodiments having an inner cladding region, the trench volume $V_{Trench}$ of the intermediate cladding region is greater than 20% Δμm$^2$, or greater than 30% Δμm$^2$, or greater than 40% Δμm$^2$, or greater than 50% Δμm$^2$, or greater than 60% Δμm$^2$, or in the range from 20% Δμm$^2$ to 70% Δμm$^2$, or in the range from 25% Δμm$^2$ to 65% Δμm$^2$, or in the range from 30% Δμm$^2$ to 60% Δμm$^2$. Trench volume can be controlled by varying the thickness of the intermediate cladding region, the relative refractive index of the intermediate cladding region and/or the difference between the relative refractive index of the outer cladding region and the relative refractive index of the intermediate cladding region.

In embodiments without an inner cladding region, the trench volume $V_{Trench}$ of the intermediate cladding region is greater than 10.0% Δμm$^2$, or greater than 15.0% Δμm$^2$, or greater than 20.0% Δμm$^2$, or greater than 25.0% Δμm$^2$, or greater than 30.0% Δμm$^2$, or in the range from 10.0% Δμm$^2$ to 40.0% Δμm$^2$, or in the range from 15.0% Δμm$^2$ to 35.0% Δμm$^2$, or in the range from 20.0% Δμm$^2$ to 30.0% Δμm$^2$. Trench volume can be controlled by varying the thickness of the intermediate cladding region, the relative refractive index of the intermediate cladding region and/or the difference between the relative refractive index of the outer cladding region and the relative refractive index of the intermediate cladding region.

The relative refractive index $\Delta_4$ or $\Delta_{4max}$ of the outer cladding region is in the range from −0.60% to 0.00%, or in the range from −0.55% to −0.05%, or in the range from −0.50% to −0.10%, or in the range from −0.45% to −0.15%, or in the range from −0.40% to −0.20%, or in the range from −0.35% to −0.25%. The relative refractive index $\Delta_4$ is preferably constant or approximately constant. The difference $\Delta_4$ to $\Delta_3$ (or the difference $\Delta_4$ to $\Delta_{3min}$, or the difference $\Delta_{4max}$ to $\Delta_3$, or the difference $\Delta_{4max}$ to $\Delta_{3min}$) is greater than 0.10%, or greater than 0.20%, or greater than 0.25%, or greater than 0.30%, or greater than 0.35%, or in the range from 0.10% to 0.45%, or in the range from 0.15% to 0.40%.

The inner radius of the outer cladding region is $r_3$ and has the values specified above. The outer radius $r_4$ is preferably low to minimize the diameter of the glass fiber to facilitate high fiber count in a cable. The outer radius $r_4$ of the outer cladding region is less than or equal to 52.5 μm, or less than or equal to 50.0 μm, or less than or equal to 47.5 μm, or less than or equal to 45.0 μm, or less than or equal to 42.5 μm, or less than or equal to 40.0 µm, or in the range from 37.5 µm to 52.5 µm, or in the range from 37.5 µm to 50.0 µm, or in the range from 37.5 µm to 47.5 µm, or in the range from 40.0 µm to 52.5 µm, or in the range from 40.0 µm to 50.0 µm, or in the range from 40.0 µm to 47.5 µm, or in the range from 42.5 µm to 50.0 µm. The thickness $r_4-r_3$ of the outer cladding region is in the range from 15.0 µm to 40.0 µm, or in the range from 17.5 µm to 37.5 µm, or in the range from 20.0 µm to 35.0 µm, or in the range from 22.5 µm to 32.5 µm.

Figure 6:
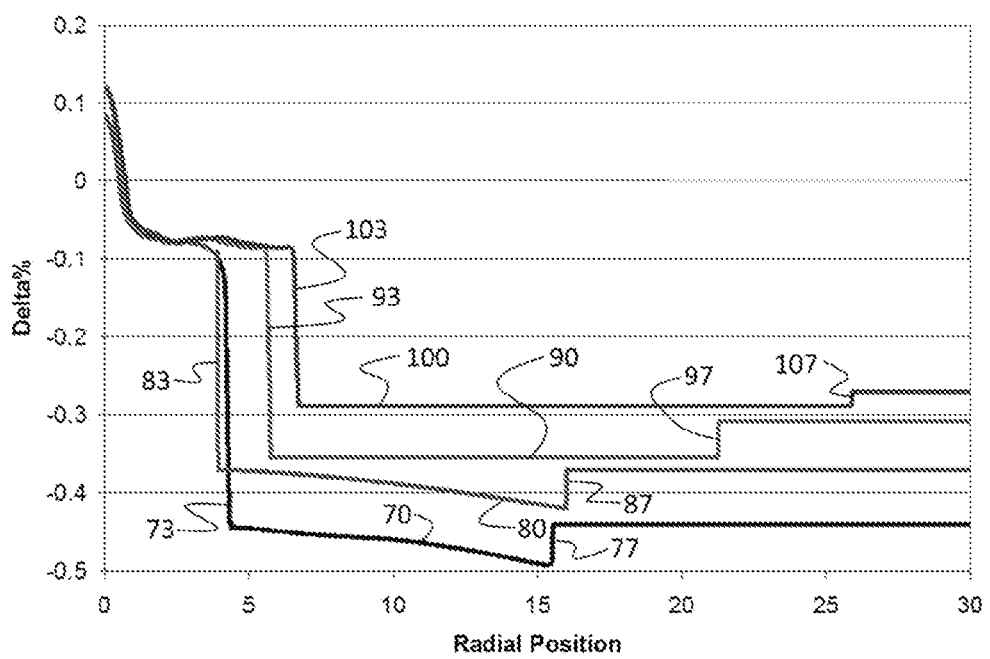
FIG. 6 depicts exemplary relative refractive index profiles of glass fibers.

FIG. 6 illustrates representative relative refractive index profiles of manufactured glass fibers. Relative refractive index profiles 70 and 80 include, in the direction of increasing radial position, a core region, an intermediate cladding region, and an outer cladding region. Relative refractive index profiles 90 and 100 include, in the direction of increasing radial position, a core region, an inner cladding region, an intermediate cladding region, and an outer cladding region. The width and depth of the intermediate cladding region varies. Relative refractive index profile 70 includes transition region 73 between a core region and a depressed index cladding region and transition region 77 between a depressed index region and an outer cladding region. Transition region 73 occurs at radius $r_1$ and transition region 77 occurs at radius $r_3$ for relative refractive index profile 70. Relative refractive index profile 80 includes transition region 83 between a core region and a depressed index cladding region and transition region 87 between a depressed index region and an outer cladding region. Transition region 83 occurs at radius $r_1$ and transition region 87 occurs at radius $r_3$ for relative refractive index profile 80. Relative refractive index profile 90 includes transition region 93 between an inner cladding region and an intermediate cladding region and transition region 97 between an intermediate cladding region and an outer cladding region. Transition region 93 occurs at radius $r_2$ and transition region 97 occurs at radius $r_3$ for relative refractive index profile 90. Relative refractive index profile 100 includes transition region 103 between an inner cladding region and an intermediate cladding region and transition region 107 between an intermediate cladding region and an outer cladding region. Transition region 103 occurs at radius $r_2$ and transition region 107 occurs at radius $r_3$ for relative refractive index profile 100.

The effective areas $A_{eff}$ associated with relative refractive index profiles 70, 80, 90, and 100 shown in FIG. 6 are 76 µm², 86 µm², 112 µm², and 150 µm², respectively, at a wavelength of 1550 nm.

In one embodiment, the core region is a segmented core region with an inner core region surrounded by and directly adjacent to an outer core region, which is surrounded by and directly adjacent to the inner cladding region (in embodiments with an inner cladding region) or an intermediate cladding region (in embodiments without an inner cladding region). The outer core region has the radius $r_1$ and the inner core region has an outer radius $r_a$ such that $r_a<r_1$. In one embodiment, each of the inner core region and outer core region has a relative refractive index profile described by an α-profile. In one embodiment, the inner core region has an α value in the range from 1.5 to 10, or in the range from 1.7 to 8.0, or in the range from 1.8 to 6.0, or in the range from 1.9 to 5.0, or in the range from 1.95 to 4.5, or in the range from 2.0 to 4.0, or in the range from 4.0 to 9.5, or in the range from 5.0 to 9.0, or in the range from 10 to 100, or in the range from 11 to 40, or in the range from 12 to 30. In another embodiment, the inner core region has a relative refractive index profile described by an α-profile and the outer core region has a relative refractive index profile described by a step-index profile. In another embodiment, the inner core region has a relative refractive index profile described by an α-profile and the outer core region has a relative refractive index profile described by a rounded step-index profile.

In one embodiment, the inner core region is alkali-doped silica and the outer core region is halide-doped silica. Halide-doped silica includes silica doped with one or more of Cl, F, and Br. In one embodiment, the inner core region is silica doped with $K_2O$ and the outer core region is doped with F or a combination of F and Cl.

In embodiments in which each of the inner core region and outer core region has a relative refractive index profile described by an α-profile, the radius $r_a$ is determined by minimizing the function $\chi^2$ given in Eq. (10):

$$\chi^2 = \sum_{i=1}^{a} [f(r_i) - g(r_a) - \Delta(r_i)]^2 + \sum_{j=a}^{b} [g(r_j) - \Delta(r_j)]^2 \qquad (10)$$

where $f(r_i)$ is an α-profile function for the inner core region, $g(r_j)$ is an α-profile function for the outer core region, $g(r_a)$ is the value of $g(r_j)$ at $r_j=r_a$, $\Delta(r_i)$ is the measured relative refractive index profile of the inner core region, $A(r_j)$ is the measured relative refractive index profile of the outer core region, the index "i" indexes radial positions $r_i$ in the inner core region, the index "j" indexes radial positions $r_j$ in the outer core region, $0<r_i<r_a$, $r_a\leq r_j\leq r_b$, the index "a" is the value of index "i" corresponding to $r_i=r_a$, the index "b" is the value of index "j" corresponding to $r_j=r_i$.

The effective area $A_{eff}$ of the optical fibers disclosed herein is greater than 70 µm², or greater than 80 µm², or greater than 90 µm², or greater than 100 µm², or greater than 120 µm², or in the range from 70 µm² to 160 µm², or in the range from 80 µm² to 120 µm², or in the range from 90 µm² to 110 µm² at a wavelength of 1550 nm.

The attenuation of the optical fibers disclosed herein is less than or equal to 0.180 dB/km, or less than or equal to 0.175 dB/km, or less than or equal to 0.170 dB/km, or less than or equal to 0.165 dB/km, or less than or equal to 0.160 dB/km at a wavelength of 1550 nm.

The mode field diameter of the optical fibers disclosed herein is in the range from 9.5 µm to 11.5 µm, or in the range from 9.75 µm to 11.25 µm, or in the range from 10.0 µm to 11.0 µm, at a wavelength of 1550 nm.

The cable cutoff wavelength $\lambda_{CC}$ of the optical fibers disclosed herein is less than 1550 nm, or less than 1530 nm, or less than 1500 nm, or less than 1450 nm, or less than 1400 nm, or less than 1350 nm.

Optical Fiber Coatings. The transmissivity of light through an optical fiber is highly dependent on the properties of the coatings applied to the glass fiber. The coatings typically include a primary coating and a secondary coating, where the secondary coating surrounds the primary coating and the primary coating contacts the glass fiber (which includes a central core region surrounded by a cladding region). The secondary coating is a harder material (higher Young's modulus) than the primary coating and is designed to protect the glass fiber from damage caused by abrasion or external forces that arise during processing, handling, and installation of the optical fiber. The primary coating is a softer material (lower Young's modulus) than the secondary coating and is designed to buffer or dissipates stresses that result from forces applied to the outer surface of the secondary coating. Dissipation of stresses within the primary coating attenuates the stress and minimizes the stress that reaches the glass fiber. The primary coating is especially important in dissipating stresses that arise due to the microbends that the optical fiber encounters when deployed in a cable. The microbending stresses transmitted to the glass fiber need to be minimized because microbending stresses create local perturbations in the refractive index profile of the glass fiber. The local refractive index perturbations lead to intensity losses for the light transmitted through the glass fiber. By dissipating stresses, the primary coating minimizes microbend-induced intensity losses The primary coating 16 preferably has a higher refractive index than the cladding region of the glass fiber in order to allow it to strip errant optical signals away from the core region. The primary coating should maintain adequate adhesion to the glass fiber during thermal and hydrolytic aging, yet be strippable from the glass fiber for splicing purposes.

Primary and secondary coatings are typically formed by applying a curable coating composition to the glass fiber as a viscous liquid and curing. The optical fiber may also include a tertiary coating (not shown) that surrounds and is directly adjacent to the secondary coating. The tertiary coating may include pigments, inks or other coloring agents to mark the optical fiber for identification purposes and typically has a Young's modulus similar to the Young's modulus of the secondary coating. The thickness of the tertiary coating is less than 10.0 μm, or less than 8.0 μm, or less than 6.0 μm, or less than 4.0 μm, or in the range from 1.0 μm to 10.0 μm, or in the range from 2.0 μm to 8.0 μm, in the range from 3.0 μm to 6.0 μm.

Primary Coating Compositions. The primary coating is a cured product of a curable primary coating composition. The curable primary coating compositions provide a primary coating for optical fibers that exhibits low Young's modulus, low pullout force, and strong cohesion. The curable primary coating compositions further enable formation of a primary coating that features clean strippability and high resistance to defect formation during the stripping operation. Low pullout force facilitates clean stripping of the primary coating with minimal residue and strong cohesion inhibits initiation and propagation of defects in the primary coating when it is subjected to stripping forces. Even for optical fibers with reduced primary coating thicknesses, the optical fibers are expected to have low loss and low microbend loss performance. The primary coatings exhibit these advantages even at reduced thickness.

The primary coating is a cured product of a radiation-curable primary coating composition that includes an oligomer, a monomer, a photoinitiator and, optionally, an additive. The following disclosure describes oligomers for the radiation-curable primary coating compositions, radiation-curable primary coating compositions containing at least one of the oligomers, cured products of the radiation-curable primary coating compositions that include at least one of the oligomers, glass fibers coated with a radiation-curable primary coating composition containing at least one of the oligomers, and glass fibers coated with the cured product of a radiation-curable primary coating composition containing at least one of the oligomers.

The oligomer preferably includes a polyether urethane diacrylate compound and a di-adduct compound. In one embodiment, the polyether urethane diacrylate compound has a linear molecular structure. In one embodiment, the oligomer is formed from a reaction between a diisocyanate compound, a polyol compound, and a hydroxy acrylate compound, where the reaction produces a polyether urethane diacrylate compound as a primary product (majority product) and a di-adduct compound as a byproduct (minority product). The reaction forms a urethane linkage upon reaction of an isocyanate group of the diisocyanate compound and an alcohol group of the polyol. The hydroxy acrylate compound reacts to quench residual isocyanate groups that are present in the composition formed from reaction of the diisocyanate compound and polyol compound. As used herein, the term "quench" refers to conversion of isocyanate groups through a chemical reaction with hydroxyl groups of the hydroxy acrylate compound. Quenching of residual isocyanate groups with a hydroxy acrylate compound converts terminal isocyanate groups to terminal acrylate groups.

A preferred diisocyanate compound is represented by formula (I):

$$O=C=N-R_1-N=C=O \qquad (I)$$

which includes two terminal isocyanate groups separated by a linkage group $R_1$. In one embodiment, the linkage group $R_1$ includes an alkylene group. The alkylene group of linkage group $R_1$ is linear (e.g. methylene or ethylene), branched (e.g. isopropylene), or cyclic (e.g. cyclohexylene, phenylene). The cyclic group is aromatic or non-aromatic. In some embodiments, the linkage group $R_1$ is 4,4'-methylene bis(cyclohexyl) group and the diisocyanate compound is 4,4'-methylene bis(cyclohexyl isocyanate). In some embodiments, the linkage group $R_1$ lacks an aromatic group, or lacks a phenylene group, or lacks an oxyphenylene group.

The polyol is represented by molecular formula (II):

$$H-O-(\!-R_2-O-\!)_x\!-H \qquad (II)$$

where $R_2$ includes an alkylene group, $-O-R_2-$ is a repeating alkoxylene group, and x is an integer. Preferably, x is greater than 20, or greater than 40, or greater than 50, or greater than 75, or greater than 100, or greater than 125, or greater than 150, or in the range from 20 to 500, or in the range from 20 to 300, or in the range from 30 to 250, or in the range from 40 to 200, or in the range from 60 to 180, or in the range from 70 to 160, or in the range from 80 to 140. $R_2$ is preferably a linear or branched alkylene group, such as methylene, ethylene, propylene (normal, iso or a combination thereof), or butylene (normal, iso, secondary, tertiary, or a combination thereof). The polyol may be a polyalkylene oxide, such as polyethylene oxide, or a polyalkylene glycol, such as polypropylene glycol. Polypropylene glycol is a preferred polyol. The molecular weight of the polyol is greater than 1000 g/mol, or greater than 2500 g/mol, or greater than 5000 g/mol, or greater than 7500 g/mol, or greater than 10000 g/mol, or in the range from 1000 g/mol to 20000 g/mol, or in the range from 2000 g/mol to 15000 g/mol, or in the range from 2500 g/mol to 12500 g/mol, or in the range from 2500 g/mol to 10000 g/mol, or in the range from 3000 g/mol to 7500 g/mol, or in the range from 3000 g/mol to 6000 g/mol, or in the range from 3500 g/mol to 5500 g/mol. In some embodiments, the polyol is polydisperse and includes molecules spanning a range of molecular weights such that the totality of molecules combines to provide the number average molecular weight specified hereinabove.

The unsaturation of the polyol is less than 0.25 meq/g, or less than 0.15 meq/g, or less than 0.10 meq/g, or less than 0.08 meq/g, or less than 0.06 meq/g, or less than 0.04 meq/g, or less than 0.02 meq/g, or less than 0.01 meq/g, or less than 0.005 meq/g, or in the range from 0.001 meq/g to 0.15 meq/g, or in the range from 0.005 meq/g to 0.10 meq/g, or in the range from 0.01 meq/g to 0.10 meq/g, or in the range from 0.01 meq/g to 0.05 meq/g, or in the range from 0.02 meq/g to 0.10 meq/g, or in the range from 0.02 meq/g to 0.05 meq/g. As used herein, unsaturation refers to the value determined by the standard method reported in ASTM D4671-16. In the method, the polyol is reacted with mercuric acetate and methanol in a methanolic solution to produce acetoxymercuricmethoxy compounds and acetic acid. The reaction of the polyol with mercuric acetate is equimolar and the amount of acetic acid released is determined by titration with alcoholic potassium hydroxide to provide the measure of unsaturation used herein. To prevent interference of excess mercuric acetate on the titration of acetic acid, sodium bromide is added to convert mercuric acetate to the bromide.

The reaction to form the oligomer further includes addition of a hydroxy acrylate compound to react with terminal isocyanate groups present in unreacted starting materials (e.g. the diisocyanate compound) or products formed in the reaction of the diisocyanate compound with the polyol (e.g. urethane compounds with terminal isocyanate groups). The hydroxy acrylate compound reacts with terminal isocyanate groups to provide terminal acrylate groups for one or more constituents of the oligomer. In some embodiments, the hydroxy acrylate compound is present in excess of the amount needed to fully convert terminal isocyanate groups to terminal acrylate groups. The oligomer includes a single polyether urethane acrylate compound or a combination of two or more polyether urethane acrylate compounds.

The hydroxy acrylate compound is represented by molecular formula (III):

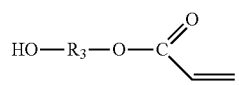

(III)

where $R_3$ includes an alkylene group. The alkylene group of $R_3$ is linear (e.g. methylene or ethylene), branched (e.g. isopropylene), or cyclic (e.g. phenylene). In some embodiments, the hydroxy acrylate compound includes substitution of the ethylenically unsaturated group of the acrylate group. Substituents of the ethylenically unsaturated group include alkyl groups. An example of a hydroxy acrylate compound with a substituted ethylenically unsaturated group is a hydroxy methacrylate compound. The discussion that follows describes hydroxy acrylate compounds. It should be understood, however, that the discussion applies to substituted hydroxy acrylate compounds and in particular to hydroxy methacrylate compounds.

In different embodiments, the hydroxy acrylate compound is a hydroxyalkyl acrylate, such as 2-hydroxyethyl acrylate. The hydroxy acrylate compound may include water at residual or higher levels. The presence of water in the hydroxy acrylate compound may facilitate reaction of isocyanate groups to reduce the concentration of unreacted isocyanate groups in the final reaction composition. In various embodiments, the water content of the hydroxy acrylate compound is at least 300 ppm, or at least 600 ppm, or at least 1000 ppm, or at least 1500 ppm, or at least 2000 ppm, or at least 2500 ppm.

In the foregoing exemplary molecular formulas (I), (II), and (III), the groups $R_1$, $R_2$, and $R_3$ independently are all the same, are all different, or include two groups that are the same and one group that is different.

The diisocyanate compound, hydroxy acrylate compound and polyol are combined simultaneously and reacted, or are combined sequentially (in any order) and reacted. In one embodiment, the oligomer is formed by reacting a diisocyanate compound with a hydroxy acrylate compound and reacting the resulting product composition with a polyol. In another embodiment, the oligomer is formed by reacting a diisocyanate compound with a polyol compound and reacting the resulting product composition with a hydroxy acrylate compound.

The oligomer is formed from a reaction of a diisocyanate compound, a hydroxy acrylate compound, and a polyol, where the molar ratio of the diisocyanate compound to the hydroxy acrylate compound to the polyol in the reaction process is n:m:p. n, m, and p are referred to herein as mole numbers or molar proportions of diisocyanate, hydroxy acrylate, and polyol; respectively. The mole numbers n, m and p are positive integer or positive non-integer numbers. In embodiments, when p is 2.0, n is in the range from 3.0 to 5.0, or in the range from 3.2 to 4.8, or in the range from 3.4 to 4.6, or in the range from 3.5 to 4.4, or in the range from 3.6 to 4.2, or in the range from 3.7 to 4.0; and m is in the range from 1.5 to 4.0, or in the range from 1.6 to 3.6, or in the range from 1.7 to 3.2, or in the range from 1.8 to 2.8, or in the range from 1.9 to 2.4. For values of p other than 2.0, the molar ratio n:m:p scales proportionally. For example, the molar ratio n:m:p=4.0:3.0:2.0 is equivalent to the molar ratio n:m:p=2.0:1.5:1.0.

The mole number m may be selected to provide an amount of the hydroxy acrylate compound to stoichiometrically react with unreacted isocyanate groups present in the product composition formed from the reaction of diisocyanate compound and polyol used to form the oligomer. The isocyanate groups may be present in unreacted diisocyanate compound (unreacted starting material) or in isocyanate-terminated urethane compounds formed in reactions of the diisocyanate compound with the polyol. Alternatively, the mole number m may be selected to provide an amount of the hydroxy acrylate compound in excess of the amount needed to stoichiometrically react with any unreacted isocyanate groups present in the product composition formed from reaction of the diisocyanate compound and the polyol. The hydroxy acrylate compound is added as a single aliquot or multiple aliquots. In one embodiment, an initial aliquot of hydroxy acrylate is included in the reaction mixture used to form the oligomer and the product composition formed can be tested for the presence of unreacted isocyanate groups (e.g. using FTIR spectroscopy to detect the presence of isocyanate groups). Additional aliquots of hydroxy acrylate compound may be added to the product composition to stoichiometrically react with unreacted isocyanate groups (using, for example, FTIR spectroscopy to monitor a decrease in a characteristic isocyanate frequency (e.g. at 2260 cm$^{-1}$ to 2270 cm$^{-1}$) as isocyanate groups are converted by the hydroxy acrylate compound). In alternate embodiments, aliquots of hydroxy acrylate compound in excess of the amount needed to stoichiometrically react with unreacted isocyanate groups are added. As described more fully below, for a given value of p, the ratio of the mole number m to the mole number n influences the relative proportions of polyether urethane diacrylate compound and di-adduct compound in the oligomer and differences in the relative proportions of polyether urethane diacrylate compound and di-adduct compound lead to differences in the tear strength and/or critical stress of coatings formed from the oligomer.

In one embodiment, the oligomer is formed from a reaction mixture that includes 4,4'-methylene bis(cyclohexyl isocyanate), 2-hydroxyethyl acrylate, and polypropylene glycol in the molar ratios n:m:p as specified above, where the polypropylene glycol has a number average molecular weight in the range from 2500 g/mol to 6500 g/mol, or in the range from 3000 g/mol to 6000 g/mol, or in the range from 3500 g/mol to 5500 g/mol.

The oligomer includes two components. The first component is a polyether urethane diacrylate compound having the molecular formula (IV):

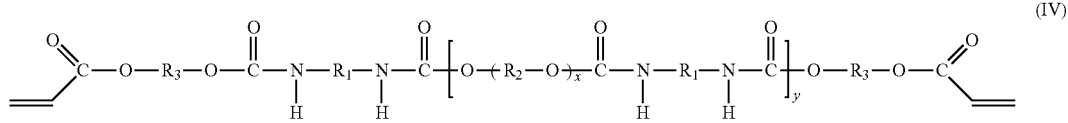

and the second component is a di-adduct compound having the molecular formula (V):

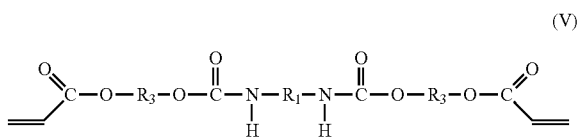

where the groups $R_1$, $R_2$, $R_3$, and the integer x are as described hereinabove, y is a positive integer, and it is understood that the group $R_1$ in molecular formulas (IV) and (V) is the same as group $R_1$ in molecular formula (I), the group $R_2$ in molecular formula (IV) is the same as group $R_2$ in molecular formula (II), and the group $R_3$ in molecular formulas (IV) and (V) is the same as group $R_3$ in molecular formula (III). The di-adduct compound corresponds to the compound formed by reaction of both terminal isocyanate groups of the diisocyanate compound of molecular formula (I) with the hydroxy acrylate compound of molecular formula (II) where the diisocyanate compound has undergone no reaction with the polyol of molecular formula (II).

The di-adduct compound is formed from a reaction of the diisocyanate compound with the hydroxy acrylate compound during the reaction used to form the oligomer. Alternatively, the di-adduct compound is formed independent of the reaction used to form the oligomer and is added to the product of the reaction used to form the polyether urethane diacrylate compound or to a purified form of the polyether urethane diacrylate compound. The hydroxy group of the hydroxy acrylate compound reacts with an isocyanate group of the diisocyanate compound to provide a terminal acrylate group. The reaction occurs at each isocyanate group of the diisocyanate compound to form the di-adduct compound. The di-adduct compound is present in the oligomer in an amount of at least 1.0 wt %, or at least 1.5 wt %, or at least 2.0 wt %, or at least 2.25 wt %, or at least 2.5 wt %, or at least 3.0 wt %, or at least 3.5 wt %, or at least 4.0 wt %, or at least 4.5 wt %, or at least 5.0 wt %, or at least 7.0 wt % or at least 9.0 wt %, or in the range from 1.0 wt % to 10.0 wt %, or in the range from 2.0 wt % to 9.0 wt %, or in the range from 2.5 wt % to 6.0 wt %, or in the range from 3.0 wt % to 8.0 wt %, or in the range from 3.0 wt % to 5.0 wt %, or in the range from 3.0 wt % to 5.5 wt %, or in the range from 3.5 wt % to 5.0 wt %, or in the range from 3.5 wt % to 7.0 wt %. It is noted that the concentration of di-adduct is expressed in terms of wt % of the oligomer and not in terms of wt % in the coating composition.

An illustrative reaction for synthesizing an oligomer in accordance with the present disclosure includes reaction of a diisocyanate compound (4,4'-methylene bis(cyclohexyl isocyanate, which is also referred to herein as H12MDI) and a polyol (polypropylene glycol with $M_n$~4000 g/mol, which is also referred to herein as PPG4000) to form a polyether urethane diisocyanate compound with formula (VI):

H12MDI~PPG4000~H12MDI~PPG4000~H12MDI    (VI)

where "~" denotes a urethane linkage formed by the reaction of a terminal isocyanate group of H12MDI with a terminal alcohol group of PPG4000; and ~H12MDI, ~H12MDI~, and ~PPG4000~ refer to residues of H12MDI and PPG4000 remaining after the reaction; and $M_n$ refers to number average molecular weight. The polyether urethane diisocyanate compound has a repeat unit of the type ~(H12MDI~PPG4000)~. The particular polyether urethane diisocyanate shown includes two PPG4000 units. The reaction may also provide products having one PPG4000 unit, or three or more PPG4000 units. The polyether urethane diisocyanate and any unreacted H12MDI include terminal isocyanate groups. In accordance with the present disclosure, a hydroxy acrylate compound (such as 2-hydroxyethyl acrylate, which is referred to herein as HEA) is included in the reaction to react with terminal isocyanate groups to convert them to terminal acrylate groups. The conversion of terminal isocyanate groups to terminal acrylate groups effects a quenching of the isocyanate group. The amount of HEA included in the reaction may be an amount estimated to react stoichiometrically with the expected concentration of unreacted isocyanate groups or an amount in excess of the expected stoichiometric amount. Reaction of HEA with the polyether urethane diisocyanate compound forms the polyether urethane acrylate compound with formula (VII):

HEA~H12MDI~PPG4000~H12MDI~PPG4000~H12MDI    (VII)

and/or the polyether urethane diacrylate compound with formula (VIII):

HEA~H12MDI~PPG4000~H12MDI~PPG4000~H12MDI~HEA (VIII)

and reaction of HEA with unreacted H12MDI forms the di-adduct compound with formula (IX):

HEA~H12MDI~HEA    (IX)

where, as above, ~ designates a urethane linkage and ~HEA designates the residue of HEA remaining after reaction to form the urethane linkage (consistent with formulas (IV) and (V)). The combination of a polyether urethane diacrylate compound and a di-adduct compound in the product composition constitutes an oligomer in accordance with the present disclosure. As described more fully hereinbelow, when one or more oligomers are used in coating compositions, coatings having improved tear strength and critical stress characteristics result. In particular, it is demonstrated that oligomers having a high proportion of di-adduct compound provide coatings with high tear strengths and/or high critical stress values.

Although depicted for the illustrative combination of H12MDI, HEA and PPG4000, the foregoing reaction may be generalized to an arbitrary combination of a diisocyanate compound, a hydroxy acrylate compound, and a polyol, where the hydroxy acrylate compound reacts with terminal isocyanate groups to form terminal acrylate groups and where urethane linkages form from reactions of isocyanate groups and alcohol groups of the polyol or hydroxy acrylate compound.

The oligomer includes a compound that is a polyether urethane diacrylate compound with formula (X):

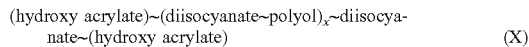

and a compound that is a di-adduct compound with formula (XI):

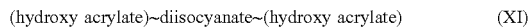

where the relative proportions of diisocyanate compound, hydroxy acrylate compound, and polyol used in the reaction to form the oligomer correspond to the mole numbers n, m, and p disclosed hereinabove.

Compounds represented by molecular formulas (I) and (II) above, for example, react to form a polyether urethane diisocyanate compound represented by molecular formula (XII):

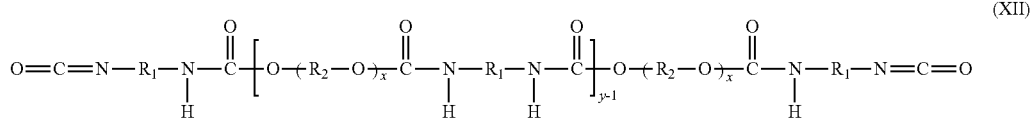

where y is the same as y in formula (IV) and is 1, or 2, or 3 or 4 or higher; and x is determined by the number of repeat units of the polyol (as described hereinabove).

Further reaction of the polyether urethane isocyanate of molecular formula (VI) with the hydroxy acrylate of molecular formula (III) provides the polyether urethane diacrylate compound represented by molecular formula (IV) referred to hereinabove and repeated below:

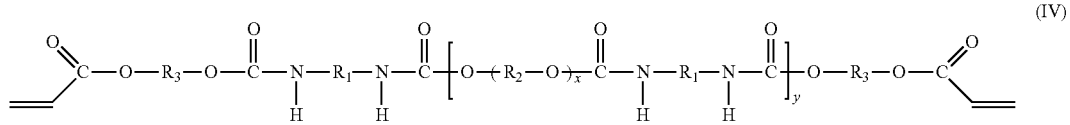

where y is 1, or 2, or 3, or 4 or higher; and x is determined by the number of repeat units of the polyol (as described hereinabove).

In an embodiment, the reaction between the diisocyanate compound, hydroxy acrylate compound, and polyol yields a series of polyether urethane diacrylate compounds that differ in y such that the average value of y over the distribution of compounds present in the final reaction mixture is a non-integer. In an embodiment, the average value of y in the polyether urethane diisocyanates and polyether urethane diacrylates of molecular formulas (VI) and (IV) corresponds to p or p−1 (where p is as defined hereinabove). In an embodiment, the average number of occurrences of the group $R_1$ in the polyether urethane diisocyanates and polyether urethane diacrylates of the molecular formulas (XII) and (IV) correspond to n (where n is as defined hereinabove).

The relative proportions of the polyether urethane diacrylate and di-adduct compounds produced in the reaction are controlled by varying the molar ratio of the mole numbers n, m, and p. By way of illustration, the case where p=2.0 is considered. In the theoretical limit of complete reaction, two equivalents p of polyol would react with three equivalents n of a diisocyanate to form a compound having molecular formula (VI) in which y=2. The compound includes two terminal isocyanate groups, which can be quenched with subsequent addition of two equivalents m of a hydroxy acrylate compound in the theoretical limit to form the corresponding polyether urethane diacrylate compound (IV) with y=2. A theoretical molar ratio n:m:p=3.0:2.0:2.0 is defined for this situation.

In the foregoing exemplary theoretical limit, a reaction of diisocyanate, hydroxy acrylate, and polyol in the theoretical molar ratio n:m:p=3.0:2.0:2.0 provides a polyether urethane diacrylate compound having molecular formula (IV) in which y=2 without forming a di-adduct compound. Variations in the mole numbers n, m, and p provide control over the relative proportions of polyether urethane diacrylate and di-adduct formed in the reaction. Increasing the mole number n relative to the mole number m or the mole number p, for example, may increase the amount of di-adduct compound formed in the reaction. Reaction of the diisocyanate compound, the hydroxy acrylate compound, and polyol compound in molar ratios n:m:p, where n is in the range from 3.0 to 5.0, m is in the range within ±15% of 2n−4 or within ±10% of 2n−4 or within ±5% of 2n−4, and p is 2.0, for example, produce amounts of the di-adduct compound in the oligomer sufficient to achieve the preferred primary coating properties. By way of example, the embodiment in which n=4.0, m is within ±15% of 2n−4, and p=2.0 means that n=4.0, m is within ±15% of 4, and p=2.0, which means that that n=4.0, m is in the range from 3.4 to 4.6, and p=2.0.

Variations in the relative proportions of di-adduct and polyether urethane diacrylate are obtained through changes in the mole numbers n, m, and p and through such variations, it is possible to precisely control the Young's modulus, in situ modulus, tear strength, critical stress, tensile toughness, and other mechanical properties of coatings formed from coating compositions that include the oligomer. In one embodiment, control over properties is achievable by varying the number of units of polyol in the polyether urethane diacrylate compound (e.g. p=2.0 vs. p=3.0 vs. p=4.0). In another embodiment, control of tear strength, tensile toughness, and other mechanical properties is achieved by varying the proportions polyether urethane diacrylate compound and di-adduct compound. For a polyether urethane compound with a given number of polyol units, oligomers having variable proportions of di-adduct compound can be prepared. The variability in proportion of di-adduct compound can be finely controlled to provide oligomers based on a polyether urethane diacrylate compound with a fixed number of polyol units that provide coatings that offer precise or targeted values of tear strength, critical stress, tensile toughness, or other mechanical properties.

Improved fiber primary coatings result when utilizing a primary coating composition that incorporates an oligomer that includes a polyether urethane acrylate compound represented by molecular formula (IV) and a di-adduct compound represented by molecular formula (V), where concentration of the di-adduct compound in the oligomer is at least 1.0 wt %, or at least 1.5 wt %, or at least 2.0 wt %, or at least 2.25 wt %, or at least 2.5 wt %, or at least 3.0 wt %, or at least 3.5 wt %, or at least 4.0 wt %, or at least 4.5 wt %, or at least 5.0 wt %, or at least 7.0 wt % or at least 9.0 wt %, or in the range from 1.0 wt % to 10.0 wt %, or in the range from 2.0 wt % to 9.0 wt %, or in the range from 3.0 wt % to 8.0 wt %, or in the range from 3.5 wt % to 7.0 wt % or in the range from 2.5 wt % to 6.0 wt %, or in the range from 3.0 wt % to 5.5 wt %, or in the range from 3.5 wt % to 5.0 wt %. It is noted that the concentration of di-adduct is expressed in terms of wt % of the oligomer and not in terms of wt % in the coating composition. The concentration of the di-adduct compound is increased in one embodiment by varying the molar ratio n:m:p of diisocyanate:hydroxy acrylate:polyol. In one aspect, molar ratios n:m:p that are rich in diisocyanate relative to polyol promote the formation of the di-adduct compound.

In the exemplary stoichiometric ratio n:m:p=3:2:2 described hereinabove, the reaction proceeds with p equivalents of polyol, n=p+1 equivalents of diisocyanate, and two equivalents of hydroxy acrylate. If the mole number n exceeds p+1, the diisocyanate compound is present in excess relative to the amount of polyol compound needed to form the polyether urethane acrylate of molecular formula (IV). The presence of excess diisocyanate shifts the distribution of reaction products toward enhanced formation of the di-adduct compound.

To promote formation of the di-adduct compound from excess diisocyanate compound, the amount of hydroxy acrylate can also be increased. For each equivalent of diisocyanate above the stoichiometric mole number n=p+1, two equivalents of hydroxy acrylate are needed to form the di-adduct compound. In the case of arbitrary mole number p (polyol), the stoichiometric mole numbers n (diisocyanate) and m (hydroxy acrylate) are p+1 and 2, respectively. As the mole number n is increased above the stoichiometric value, the equivalents of hydroxy acrylate needed for complete reaction of excess diisocyanate to form the di-adduct compound may be expressed as m=2+2[n−(p+1)], where the leading term "2" represents the equivalents of hydroxy acrylate needed to terminate the polyether urethane acrylate compound (compound having molecular formula (V)) and the term 2[n−(p+1)] represents the equivalents of hydroxy acrylate needed to convert the excess starting diisocyanate to the di-adduct compound. If the actual value of the mole number m is less than this number of equivalents, the available hydroxy acrylate reacts with isocyanate groups present on the oligomer or free diisocyanate molecules to form terminal acrylate groups. The relative kinetics of the two reaction pathways dictates the relative amounts of polyether urethane diacrylate and di-adduct compounds formed and the deficit in hydroxy acrylate relative to the amount required to quench all unreacted isocyanate groups may be controlled to further influence the relative proportions of polyether urethane diacrylate and di-adduct formed in the reaction.

In some embodiments, the reaction includes heating the reaction composition formed from the diisocyanate compound, hydroxy acrylate compound, and polyol. The heating facilitates conversion of terminal isocyanate groups to terminal acrylate groups through a reaction of the hydroxy acrylate compound with terminal isocyanate groups. In different embodiments, the hydroxy acrylate compound is present in excess in the initial reaction mixture and/or is otherwise available or added in unreacted form to effect conversion of terminal isocyanate groups to terminal acrylate groups. The heating occurs at a temperature above 40° C. for at least 12 hours, or at a temperature above 40° C. for at least 18 hours, or at a temperature above 40° C. for at least 24 hours, or at a temperature above 50° C. for at least 12 hours, or at a temperature above 50° C. for at least 18 hours, or at a temperature above 50° C. for at least 24 hours, or at a temperature above 60° C. for at least 12 hours, or at a temperature above 60° C. for at least 18 hours, or at a temperature above 60° C. for at least 24 hours.

In an embodiment, conversion of terminal isocyanate groups on the polyether urethane diacrylate compound or starting diisocyanate compound (unreacted initial amount or amount present in excess) to terminal acrylate groups is facilitated by the addition of a supplemental amount of hydroxy acrylate compound to the reaction mixture. As indicated hereinabove, the amount of hydroxy acrylate compound needed to quench (neutralize) terminal isocyanate groups may deviate from the theoretical number of equivalents due, for example, to incomplete reaction or a desire to control the relative proportions of polyether urethane diacrylate compound and di-adduct compound. As described hereinabove, once the reaction has proceeded to completion or other endpoint, it is preferable to quench (neutralize) residual isocyanate groups to provide a stabilized reaction product. In an embodiment, supplemental hydroxy acrylate is added to accomplish this objective.

In an embodiment, the amount of supplemental hydroxy acrylate compound is in addition to the amount included in the initial reaction process. The presence of terminal isocyanate groups at any stage of the reaction is monitored, for example, by FTIR spectroscopy (e.g. using a characteristic isocyanate stretching mode near 2265 cm') and supplemental hydroxy acrylate compound is added as needed until the intensity of the characteristic stretching mode of isocyanate groups is negligible or below a pre-determined threshold. In an embodiment, supplemental hydroxy acrylate compound is added beyond the amount needed to fully convert terminal isocyanate groups to terminal acrylate groups. In different embodiments, supplemental hydroxy acrylate compound is included in the initial reaction mixture (as an amount above the theoretical amount expected from the molar amounts of diisocyanate and polyol), added as the reaction progresses, and/or added after reaction of the diisocyanate and polyol compounds has occurred to completion or pre-determined extent.

Amounts of hydroxy acrylate compound above the amount needed to fully convert isocyanate groups are referred to herein as excess amounts of hydroxy acrylate compound. When added, the excess amount of hydroxy acrylate compound is at least 20% of the amount of supplemental hydroxy acrylate compound needed to fully convert terminal isocyanate groups to terminal acrylate groups, or at least 40% of the amount of supplemental hydroxy acrylate compound needed to fully convert terminal isocyanate groups to terminal acrylate groups, or at least 60% of the amount of supplemental hydroxy acrylate compound needed to fully convert terminal isocyanate groups to terminal acrylate groups, or at least 90% of the amount of supplemental hydroxy acrylate compound needed to fully convert terminal isocyanate groups to terminal acrylate groups.

In an embodiment, the amount of supplemental hydroxy acrylate compound may be sufficient to completely or nearly completely quench residual isocyanate groups present in the oligomer formed in the reaction. Quenching of isocyanate groups is desirable because isocyanate groups are relatively unstable and often undergo reaction over time. Such reaction alters the characteristics of the reaction composition or oligomer and may lead to inconsistencies in coatings formed therefrom. Reaction compositions and products formed from the starting diisocyanate and polyol compounds that are free of residual isocyanate groups are expected to have greater stability and predictability of characteristics.

The oligomer of the primary coating composition includes a polyether urethane diacrylate compound and di-adduct compound as described hereinabove. In some embodiments, the oligomer includes two or more polyether urethane diacrylate compounds and/or two or more di-adduct compounds. The oligomer content of the primary coating composition includes the combined amounts of the one or more polyether urethane diacrylate compound(s) and one or more di-adduct compound(s) and is greater than 20 wt %, or greater than 30 wt %, or greater than 40 wt %, or in the range from 20 wt % to 80 wt %, or in the range from 30 wt % to 70 wt %, or in the range from 40 wt % to 60 wt %, where the concentration of di-adduct compound within the oligomer content is as described above.

The curable primary coating composition further includes one or more monomers. The one or more monomers is/are selected to be compatible with the oligomer, to control the viscosity of the primary coating composition to facilitate processing, and/or to influence the physical or chemical properties of the coating formed as the cured product of the primary coating composition. The monomers include radiation-curable monomers such as ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched alkylene group. Examples of alkoxylene groups include ethoxylene (—O—$CH_2$—$CH_2$—), n-propoxylene (—O—$CH_2$—$CH_2$—$CH_2$—), isopropoxylene (—O—$CH_2$—$CH(CH_3)$—, or —O—CH($CH_3$)—$CH_2$—), etc. As used herein, the degree of alkoxylation refers to the number of alkoxylene groups in the monomer. In one embodiment, the alkoxylene groups are bonded consecutively in the monomer.

In some embodiments, the primary coating composition includes an alkoxylated monomer of the form $R_4$—$R_5$—O—$(CH(CH_3)CH_2$—$O)_q$—$C(O)CH$=$CH_2$, where $R_4$ and $R_5$ are aliphatic, aromatic, or a mixture of both, and q=1 to 10, or $R_4$—O—$(CH(CH_3)CH_2$—$O)_q$—$C(O)CH$=$CH_2$, where C(O) is a carbonyl group, $R_1$ is aliphatic or aromatic, and q=1 to 10.

Representative examples of monomers include ethylenically unsaturated monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

In some embodiments, the monomer component of the primary coating composition includes a multifunctional (meth)acrylate. Multifunctional ethylenically unsaturated monomers include multifunctional acrylate monomers and multifunctional methacrylate monomers. Multifunctional acrylates are acrylates having two or more polymerizable acrylate moieties per molecule, or three or more polymerizable acrylate moieties per molecule. Examples of multifunctional (meth)acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tripropyleneglycol diacrylate, propoxylated hexanediol diacrylate, tetrapropyleneglycol diacrylate, pentapropyleneglycol diacrylate, methacrylate analogs of the foregoing, and combinations thereof.

In some embodiments, the primary coating composition includes an N-vinyl amide monomer such as an N-vinyl lactam, or N-vinyl pyrrolidinone, or N-vinyl caprolactam, where the N-vinyl amide monomer is present in the coating composition at a concentration greater than 1.0 wt %, or greater than 2.0 wt %, or greater than 3.0 wt %, or in the range from 1.0 wt % to 15.0 wt %, or in the range from 2.0 wt % to 10.0 wt %, or in the range from 3.0 wt % to 8.0 wt %.

In an embodiment, the primary coating composition includes one or more monofunctional acrylate or methacrylate monomers in an amount from 15 wt % to 90 wt %, or from 30 wt % to 75 wt %, or from 40 wt % to 65 wt %. In another embodiment, the primary coating composition may include one or more monofunctional aliphatic epoxy acrylate or methacrylate monomers in an amount from 5 wt % to 40 wt %, or from 10 wt % to 30 wt %.

In an embodiment, the monomer component of the primary coating composition includes a hydroxyfunctional monomer. A hydroxyfunctional monomer is a monomer that has a pendant hydroxy moiety in addition to other reactive functionality such as (meth)acrylate. Examples of hydroxyfunctional monomers including pendant hydroxyl groups include caprolactone acrylate (available from Dow Chemical as TONE M-100); poly(alkylene glycol) mono (meth)acrylates, such as poly(ethylene glycol) monoacrylate, poly(propylene glycol) monoacrylate, and poly(tetramethylene glycol) monoacrylate (each available from Monomer, Polymer & Dajac Labs); 2-hydroxyethyl (meth) acrylate, 3-hydroxypropyl (meth)acrylate, and 4-hydroxybutyl (meth)acrylate (each available from Aldrich).

In an embodiment, the hydroxyfunctional monomer is present in an amount sufficient to improve adhesion of the primary coating to the optical fiber. The hydroxyfunctional monomer is present in the coating composition in an amount between about 0.1 wt % and about 25 wt %, or in an amount between about 5 wt % and about 8 wt %. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the coating. Hydroxyfunctional monomers are described in more detail in U.S. Pat. No. 6,563,996, the disclosure of which is hereby incorporated by reference in its entirety.

In different embodiments, the total monomer content of the primary coating composition is between about 15 wt % and about 90 wt %, or between about 30 wt % and about 75 wt %, or between about 40 wt % and about 65 wt %.

In addition to a curable monomer and a curable oligomer, the curable primary coating composition also includes a polymerization initiator. The polymerization initiator facilitates initiation of the polymerization process associated with the curing of the coating composition to form the coating. Polymerization initiators include thermal initiators, chemical initiators, electron beam initiators, and photoinitiators. Photoinitiators include ketonic photoinitiators and/or phosphine oxide photoinitiators. When used in the curing of the coating composition, the photoinitiator is present in an amount sufficient to enable rapid radiation curing.

Representative photoinitiators include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); and combinations thereof.

The coating composition includes a single photoinitiator or a combination of two or more photoinitiators. The total photoinitiator content of the coating composition is up to about 10 wt %, or between about 0.5 wt % and about 6 wt %.

The curable primary coating composition optionally includes one or more additives. Additives include an adhesion promoter, a strength additive, an antioxidant, a catalyst, a stabilizer, an optical brightener, a property-enhancing additive, an amine synergist, a wax, a lubricant, and/or a slip agent. Some additives operate to control the polymerization process, thereby affecting the physical properties (e.g., modulus, glass transition temperature) of the polymerization product formed from the coating composition. Other additives affect the integrity of the cured product of the primary coating composition (e.g., protect against de-polymerization or oxidative degradation).

An adhesion promoter is a compound that facilitates adhesion of the primary coating and/or primary composition to glass (e.g. the cladding portion of a glass fiber). Suitable adhesion promoters include alkoxysilanes, mercapto-functional silanes, organotitanates, and zirconates. Representative adhesion promoters include mercaptoalkyl silanes or mercaptoalkoxy silanes such as 3-mercaptopropyl-trialkoxysilane (e.g., 3-mercaptopropyl-trimethoxysilane, available from Gelest (Tullytown, Pa.)); bis(trialkoxysilyl-ethyl)benzene; acryloxypropyltrialkoxysilane (e.g., (3-acryloxypropyl)-trimethoxysilane, available from Gelest), methacryloxypropyltrialkoxysilane, vinyltrialkoxysilane, bis (trialkoxysilylethyl)hexane, allyltrialkoxysilane, styrylethyltrialkoxysilane, and bis(trimethoxysilylethyl) benzene (available from United Chemical Technologies (Bristol, Pa.)); see U.S. Pat. No. 6,316,516, the disclosure of which is hereby incorporated by reference in its entirety herein.

The adhesion promoter is present in the primary coating composition in an amount between 0.02 wt % and 10.0 wt %, or between 0.05 wt % and 4.0 wt %, or between 0.1 wt % and 4.0 wt %, or between 0.1 wt % and 3.0 wt %, or between 0.1 wt % and 2.0 wt %, or between 0.1 wt % and 1.0 wt %, or between 0.5 wt % and 4.0 wt %, or between 0.5 wt % and 3.0 wt %, or between 0.5 wt % and 2.0 wt %, or between 0.5 wt % and 1.0 wt %.

A representative antioxidant is thiodiethylene bis[3-(3,5-di-tert-butyl)-4-hydroxy-phenyl) propionate] (e.g., IRGANOX 1035, available from BASF). In some aspects, an antioxidant is present in the coating composition in an amount greater than 0.25 wt %, or greater than 0.50 wt %, or greater than 0.75 wt %, or greater than 1.0 wt %, or an amount in the range from 0.25 wt % to 3.0 wt %, or an amount in the range from 0.50 wt % to 2.0 wt %, or an amount in the range from 0.75 wt % to 1.5 wt %.

Representative optical brighteners include TINOPAL OB (available from BASF); Blankophor KLA (available from Bayer); bisbenzoxazole compounds; phenylcoumarin compounds; and bis(styryl)biphenyl compounds. In an embodiment, the optical brightener is present in the coating composition at a concentration of 0.005 wt % to 0.3 wt %.

Representative amine synergists include triethanolamine; 1,4-diazabicyclo[2.2.2]octane (DABCO), triethylamine, and methyldiethanolamine. In an embodiment, an amine synergist is present at a concentration of 0.02 wt % to 0.5 wt %.

Primary Coating—Properties. Relevant properties of the primary coating include radius, thickness, Young's modulus, and in situ modulus.

The radius $r_5$ of the primary coating is less than or equal to 85.0 µm, or less than or equal to 80.0 µm, or less than or equal to 75.0 µm, or less than or equal to 70.0 µm, or in the range from 57.5 µm to 92.5 µm, or in the range from 60.0 µm to 90.0 µm, or in the range from 62.5 µm to 87.5 µm, or in the range from 65.0 µm to 85.0 µm, or in the range from 67.5 µm to 82.5 µm.

To facilitate decreases in the diameter of the optical fiber, it is preferable to minimize the thickness $r_5-r_4$ of the primary coating. The thickness $r_5$–$r_4$ of the primary coating is in the range from 20.0 µm to 45.0 µm, or in the range from 20.0 µm to 42.5 µm, or in the range from 20.0 µm to 40.0 µm, or in the range from 20.0 µm to 37.5 µm, or in the range from 20.0 µm to 35.0 µm, or in the range from 22.5 µm to 45.0 µm, or in the range from 22.5 µm to 42.5 µm, or in the range from 22.5 µm to 40.0 µm, or in the range from 22.5 µm to 37.5 µm, or in the range from 22.5 µm to 35.0 µm, or in the range from 25.0 µm to 45.0 µm, or in the range from 25.0 µm to 42.5 µm, or in the range from 25.0 µm to 40.0 µm, or in the range from 25.0 µm to 37.5 µm, or in the range from 25.0 µm to 35.0 µm.

To facilitate effective buffering of stress and protection of the glass fiber, it is preferable for the primary coating to have a low Young's modulus and/or a low in situ modulus. The Young's modulus of the primary coating is less than or equal to 0.7 MPa, or less than or equal to 0.6 MPa, or less than or equal to 0.5 MPa, or less than or equal to 0.4 MPa, or less than or equal to 0.3 MPa, or in the range from 0.2 MPa to 0.7 MPa, or in the range from 0.3 MPa to 0.6 MPa. The in situ modulus of the primary coating is less than or equal to 0.40 MPa, or less than or equal to 0.35 MPa, or less than or equal to 0.30 MPa, or less than or equal to 0.25 MPa, or less than or equal to 0.20 MPa, or less than or equal to 0.15 MPa, or less than or equal to 0.10 MPa, or in the range from 0.05 MPa to 0.40 MPa, or in the range from 0.05 MPa to 0.30 MPa, or in the range from 0.05 MPa to 0.25 MPa, or in the range from 0.10 MPa to 0.25 MPa.

Secondary Coating—Compositions. The secondary coating is a cured product of a curable secondary coating composition that includes a monomer, a photoinitiator, an optional oligomer, and an optional additive. The present disclosure describes optional oligomers for the radiation-curable secondary coating compositions, radiation-curable secondary coating compositions, cured products of the radiation-curable secondary coating compositions, optical fibers coated with a radiation-curable secondary coating composition, and optical fibers coated with the cured product of a radiation-curable secondary coating composition.

The secondary coating is formed as the cured product of a radiation-curable secondary coating composition that includes a monomer component with one or more monomers. The monomers preferably include ethylenically unsaturated compounds. The one or more monomers may be present in an amount of 50 wt % or greater, or in an amount from about 60 wt % to about 99 wt %, or in an amount from about 75 wt % to about 99 wt %, or in an amount from about 80 wt % to about 99 wt % or in an amount from about 85 wt % to about 99 wt %. In one embodiment, the secondary coating is the radiation-cured product of a secondary coating composition that contains urethane acrylate monomers.

The monomers include functional groups that are polymerizable groups and/or groups that facilitate or enable crosslinking. The monomers are monofunctional monomers or multifunctional monomers. In combinations of two or more monomers, the constituent monomers are monofunctional monomers, multifunctional monomers, or a combination of monofunctional monomers and multifunctional monomers. In one embodiment, the monomer component of the curable secondary coating composition includes ethylenically unsaturated monomers. Suitable functional groups for ethylenically unsaturated monomers include, without limitation, (meth)acrylates, acrylamides, N-vinyl amides, styrene and substituted styrene, vinyl ethers, vinyl esters, acid esters, and combinations thereof.

In one embodiment, the monomer component of the curable secondary coating composition includes ethylenically unsaturated monomers. The monomers include functional groups that are polymerizable groups and/or groups that facilitate or enable crosslinking. The monomers are monofunctional monomers or multifunctional monomers. In combinations of two or more monomers, the constituent monomers are monofunctional monomers, multifunctional monomers, or a combination of monofunctional monomers and multifunctional monomers. Suitable functional groups for ethylenically unsaturated monomers include, without limitation, (meth)acrylates, acrylamides, N-vinyl amides, styrene and substituted styrene, vinyl ethers, vinyl esters, acid esters, and combinations thereof.

Exemplary monofunctional ethylenically unsaturated monomers for the curable secondary coating composition include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated (4) nonylphenol acrylate (e.g., Photomer 4066, IGM Resins); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is an alkyl group with 7 or more carbons.

Representative radiation-curable ethylenically unsaturated monomers included alkoxylated monomers with one or more acrylate or methacrylate groups. An alkoxylated monomer is one that includes one or more alkoxylene groups, where an alkoxylene group has the form —O—R— and R is a linear or branched hydrocarbon. Examples of alkoxylene groups include ethoxylene (—O—$CH_2$—$CH_2$—), n-propoxylene (—O—$CH_2$—$CH_2$—$CH_2$—), isopropoxylene (—O—$CH_2$—$CH(CH_3)$—), etc. As used herein, the degree of alkoxylation refers to the number of alkoxylene groups in the monomer. In one embodiment, the alkoxylene groups are bonded consecutively in the monomer.

As used herein, degree of alkoxylation refers to the number of alkoxylene groups divided by the number of acrylate and methacrylate groups in a molecule of the monomer. For monofunctional alkoxylated monomers, the degree of alkoxylation corresponds to the number of alkoxylene groups in a molecule of the monomer. In a preferred embodiment, the alkoxylene groups of a monofunctional alkoxylated monomer are bonded consecutively. For a difunctional alkoxylated monomer, the degree of alkoxylation corresponds to one half of the number of alkoxylene groups in a molecule of the monomer. In a preferred embodiment, the alkoxylene groups in a difunctional alkoxylated monomer are bonded consecutively in each of two groups where the two groups are separated by a chemical linkage and each group includes half or approximately half of the number of alkoxylene groups in the molecule. For a trifunctional alkoxylated monomer, the degree of alkoxylation corresponds to one third of the number of alkoxylene groups in a molecule of the monomer. In a preferred embodiment, the alkoxylene groups in a trifunctional alkoxylated monomer are bonded consecutively in three groups, where the three groups are separated by chemical linkages and each group includes a third or approximately a third of the number of alkoxylene groups in the molecule.

Representative multifunctional ethylenically unsaturated monomers for the curable secondary coating composition include, without limitation, alkoxylated bisphenol-A diacrylates, such as ethoxylated bisphenol-A diacrylate, and alkoxylated trimethylolpropane triacrylates, such as ethoxylated trimethylolpropane triacrylate, with the degree of alkoxylation being 2 or greater, or 4 or greater, or 6 or greater, or less than 16 or less than 12, or less than 8, or less than 5, or in the range from 2 to 16, or in the range from 2 to 12, or in the range from 2 to 8, or in the range from 2 to 4, or in the range from 3 to 12, or in the range from 3 to 8, or in the range from 3 to 5, or in the range from 4 to 12, or in the range from 4 to 10, or in the range from 4 to 8.

Multifunctional ethylenically unsaturated monomers for the curable secondary coating composition include, without limitation, alkoxylated bisphenol A diacrylates, such as ethoxylated bisphenol A diacrylate, with the degree of alkoxylation being 2 or greater. The monomer component of the secondary coating composition may include ethoxylated bisphenol A diacrylate with a degree of ethoxylation ranging from 2 to about 30 (e.g. SR349, SR601, and SR602 available from Sartomer Company, Inc. West Chester, Pa. and Photomer 4025 and Photomer 4028, available from IGM Resins), or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater; for example, ranging from 3 to about 30 (e.g., Photomer 4149, IGM Resins, and SR499, Sartomer Company, Inc.); propoxylated-trimethylolpropane triacrylate with the degree of propoxylation being 3 or greater; for example, ranging from 3 to 30 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 3 or greater (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from about 2 to 30; epoxy acrylates formed by adding acrylate to bisphenol A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

Multifunctional ethylenically unsaturated monomers of the curable secondary coating composition include ethoxylated bisphenol-A diacrylate with a degree of ethoxylation ranging from 2 to 16 (e.g. SR349, SR601, and SR602 available from Sartomer Company, Inc. West Chester, Pa. and Photomer 4028, available from IGM Resins), or propoxylated bisphenol-A diacrylate with the degree of propoxylation being 2 or greater; for example, ranging from 2 to 16; methylolpropane polyacrylates with and without alkoxylation such as alkoxylated trimethylolpropane triacrylate or ethoxylated trimethylolpropane triacrylate with the degree of alkoxylation or ethoxylation being 2 or greater; for example, ranging from 2 to 16 or from 3 to 10 (e.g., Photomer 4149, IGM Resins, and SR499, Sartomer Company, Inc.); propoxylated-trimethylolpropane triacrylate with the degree of propoxylation being 2 or greater; for example, ranging from 2 to 16 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 2 or greater; for example, ranging from 2 to 16 (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from 2 to 16; epoxy acrylates formed by adding acrylate to bisphenol-A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

In some embodiments, the curable secondary coating composition includes a multifunctional monomer with three or more curable functional groups in an amount greater than 2.0 wt %, or greater than 5.0 wt %, or greater than 7.5 wt %, or greater than 10 wt %, or greater than 15 wt %, or greater than 20 wt %, or in the range from 2.0 wt % to 25 wt %, or in the range from 5.0 wt % to 20 wt %, or in the range from 8.0 wt % to 15 wt %. In a preferred embodiment, each of the three or more curable functional groups is an acrylate group.

In some embodiments, the curable secondary coating composition includes a trifunctional monomer in an amount greater than 2.0 wt %, or greater than 5.0 wt %, or greater than 7.5 wt %, or greater than 10 wt %, or greater than 15 wt %, or greater than 20 wt %, or in the range from 2.0 wt % to 25 wt %, or in the range from 5.0 wt % to 20 wt %, or in the range from 8.0 wt % to 15 wt %. In a preferred embodiment, the trifunctional monomer is a triacrylate monomer.

In some embodiments, the curable secondary coating composition includes a difunctional monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a trifunctional monomer in an amount in the range from 2.0 wt % to 25 wt %, or in the range from 5.0 wt % to 20 wt %, or in the range from 8.0 wt % to 15 wt %. In a preferred embodiment, the difunctional monomer is a diacrylate monomer and the trifunctional monomer is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In some embodiments, the curable secondary coating composition lacks a monofunctional monomer and includes a difunctional monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a trifunctional monomer in an amount in the range from 2.0 wt % to 25 wt %, or in the range from 5.0 wt % to 20 wt %, or in the range from 8.0 wt % to 15 wt %. In a preferred embodiment, the difunctional monomer is a diacrylate monomer and the trifunctional monomer is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In some embodiments, the curable secondary coating composition includes two or more difunctional monomers in a combined amount greater than 70 wt %, or greater than 75 wt %, or greater than 80 wt %, or greater than 85 wt %, or in the range from 70 wt % to 95 wt %, or in the range from 75 wt % to 90 wt %, and further includes a trifunctional monomer in an amount in the range from 2.0 wt % to 25 wt %, or in the range from 5.0 wt % to 20 wt %, or in the range from 8.0 wt % to 15 wt %. In a preferred embodiment, the difunctional monomer is a diacrylate monomer and the trifunctional monomer is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In some embodiments, the curable secondary coating composition lacks a monofunctional monomer and includes two or more difunctional monomers in a combined amount greater than 70 wt %, or greater than 75 wt %, or greater than 80 wt %, or greater than 85 wt %, or in the range from 70 wt % to 95 wt %, or in the range from 75 wt % to 90 wt %, and further includes a trifunctional monomer in an amount in the range from 2.0 wt % to 25 wt %, or in the range from 5.0 wt % to 20 wt %, or in the range from 8.0 wt % to 15 wt %. In a preferred embodiment, the difunctional monomer is a diacrylate monomer and the trifunctional monomer is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In some embodiments, the curable secondary coating composition includes two or more difunctional monomers in a combined amount greater than 70 wt %, or greater than 75 wt %, or greater than 80 wt %, or greater than 85 wt %, or in the range from 70 wt % to 95 wt %, or in the range from 75 wt % to 90 wt %, and further includes two or more trifunctional monomers in a combined amount in the range from 2.0 wt % to 25 wt %, or in the range from 5.0 wt % to 20 wt %, or in the range from 8.0 wt % to 15 wt %. In a preferred embodiment, each of the two or more difunctional monomers is a diacrylate monomer and each of the two or more trifunctional monomers is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In some embodiments, the curable secondary coating composition lacks a monofunctional monomer and includes two or more difunctional monomers in a combined amount greater than 70 wt %, or greater than 75 wt %, or greater than 80 wt %, or greater than 85 wt %, or in the range from 70 wt % to 95 wt %, or in the range from 75 wt % to 90 wt %, and further includes two or more trifunctional monomers in a combined amount in the range from 2.0 wt % to 25 wt %, or in the range from 5.0 wt % to 20 wt %, or in the range from 8.0 wt % to 15 wt %. In a preferred embodiment, the each of the difunctional monomers is a diacrylate monomer and each of the trifunctional monomers is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

A preferred difunctional monomer is an alkoxylated bisphenol-A diacrylate. Alkoxylated bisphenol-A diacrylate has the general formula (XIII):

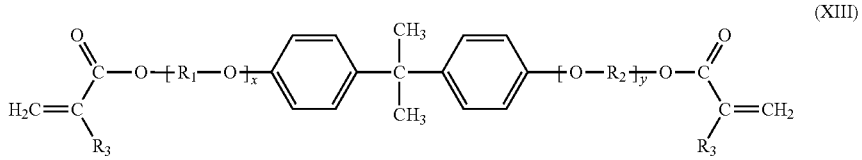
(XIII)

where $R_1$ and $R_2$ are alkylene groups, $R_1$—O and $R_2$—O are alkoxylene groups, and $R_3$ is H. Any two of the groups $R_1$, $R_2$, and $R_3$ are the same or different. In one embodiment, the groups $R_1$ and $R_2$ are the same. The number of carbons in each of the groups $R_1$ and $R_2$ is in the range from 1 to 8, or in the range from 2 to 6, or in the range from 2 to 4. The degree of alkoxylation is ½(x+y). The values of x and y are the same or different. In one embodiment, x and y are the same.

A preferred trifunctional monomer is an alkoxylated trimethylolpropane triacrylate. Alkoxylated trimethylolpropane triacrylate has the general formula (XIV):

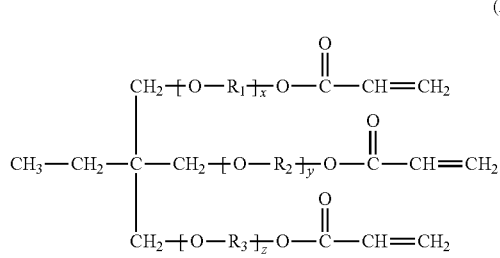
(XIV)

where $R_1$ and $R_2$ are alkylene groups, O—$R_1$, O—$R_2$, and O—$R_3$ are alkoxylene groups. Any two of the groups $R_1$, $R_2$, and $R_3$ are the same or different. In one embodiment, the groups $R_1$, $R_2$, and $R_3$ are the same. The number of carbons in the each of the groups $R_1$, $R_2$, and $R_3$ is in the range from 1 to 8, or in the range from 2 to 6, or in the range from 2 to 4. The degree of alkoxylation is ⅓(x+y+z). The values of any two of x, y and z are the same or different. In one embodiment, x, y, and z are the same.

Another preferred trifunctional monomer is a tris[(acryloyloxy)alkyl] isocyanurate. Tris[(acryloyloxy)alkyl] isocyanurates are also referred to as tris[n-hydroxyalkyl) isocyanurate triacrylates. A representative tris[(acryloyloxy)alkyl] isocyanurate is tris[2-hydroxyethyl) isocyanurate triacrylate, which has the general formula (XV):

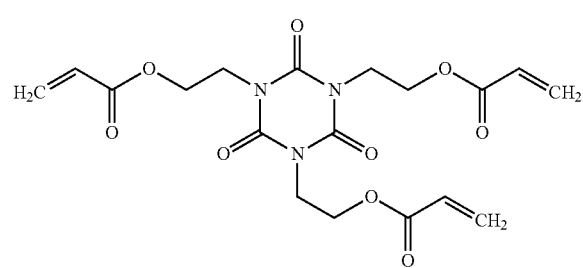
(XV)

In formula (III), an ethylene linkage (—$CH_2$—$CH_2$—) bonds each acryloyloxy group to a nitrogen of the isocyanurate ring. In other embodiments of tris[(acryloyloxy)alkyl] isocyanurates, alkylene linkages other than ethylene bond the acryloyloxy groups to nitrogen atoms of the isocyanurate ring. The alkylene linkages for any two of the three alkylene linkages are the same or different. In one embodiment, the three alkylene linkages are the same. The number of carbons in each of the alkylene linkages is in the range from 1 to 8, or in the range from 2 to 6, or in the range from 2 to 4.

In one embodiment, the curable secondary composition includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an alkoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an ethoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an alkoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an ethoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary coating includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris[(acryloyloxy)alkyl] isocyanurate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris[(acryloyloxy)alkyl] isocyanurate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes tris(2-hydroxyethyl) isocyanurate triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris(2-hydroxyethyl) isocyanurate triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an alkoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an ethoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an alkoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an ethoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris[(acryloyloxy)alkyl] isocyanurate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris[(acryloyloxy)alkyl] isocyanurate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes tris(2-hydroxyethyl) isocyanurate triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris(2-hydroxyethyl) isocyanurate triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

The optional oligomer present in the radiation-curable secondary coating composition is preferably a compound with urethane linkages. In one aspect, the optional oligomer is a reaction product of a polyol compound, a diisocyanate compound, and a hydroxy-functional acrylate compound. Reaction of the polyol compound with the diisocyanate compound provides a urethane linkage and the hydroxy-functional acrylate compound reacts with isocyanate groups to provide terminal acrylate groups. If present, the total oligomer content in the radiation-curable secondary coating composition is less than 3.0 wt %, or less than 2.0 wt %, or less than 1.0 wt %, or in the range from 0 wt % to 3.0 wt %, or in the range from 0.1 wt % to 3.0 wt %, or in the range from 0.2 wt % to 2.0 wt %, or in the range from 0.3 wt % to 1.0 wt %. In one embodiment, the radiation-curable secondary coating composition is devoid of oligomers.

One class of optional oligomers is ethylenically unsaturated oligomers. When included, suitable oligomers may be monofunctional oligomers, multifunctional oligomers, or a combination of a monofunctional oligomer and a multifunctional oligomer. If present, the oligomer component may include aliphatic and aromatic urethane (meth)acrylate oligomers, urea (meth)acrylate oligomers, polyester and polyether (meth)acrylate oligomers, acrylated acrylic oligomers, polybutadiene (meth)acrylate oligomers, polycarbonate (meth)acrylate oligomers, and melamine (meth)acrylate oligomers or combinations thereof. The curable secondary coating composition may be free of urethane groups, urethane acrylate compounds, urethane oligomers, or urethane acrylate oligomers.

The optional oligomeric component of the curable secondary coating composition may include a difunctional oligomer. A difunctional oligomer has a structure according to formula (XVI) below:

$$F_1-R_8-[\text{urethane}-R_9-\text{urethane}]_m-R_8-F_1 \quad (XVI)$$

where $F_1$ may independently be a reactive functional group such as acrylate, methacrylate, acrylamide, N-vinyl amide, styrene, vinyl ether, vinyl ester, or other functional group known in the art; $R_8$ may include, independently, $-(CH_2)_{2-12}-O-$, $-((CH_2)_{2-4}-O)_n-$, $-(CH_2)_{2-12}O-((CH_2)_{2-4}-O)_n-$, $-(CH_2)_{2-12}-O-(CO-(CH_2)_{2-5}-O)_n-$, or $-(CH_2)_{2-12}-O(CO(CH_2)_{2-5}-NH)_n-$ where n is a whole number from 1 to 30, including, for example, from 1 to 10; $R_9$ may be a polyether, polyester, polycarbonate, polyamide, polyurethane, polyurea, or combination thereof; and m is a whole number from 1 to 10, including, for example, from 1 to 5. In the structure of formula (I), the urethane moiety may be the residue formed from the reaction of a diisocyanate with $R_9$ and/or $R_8$. The term "independently" is used herein to indicate that each F may differ from another $F_1$ and the same is true for each $R_8$.

The optional oligomer component of the curable coating composition may include a multifunctional oligomer. The multifunctional oligomer may have a structure according to formula (XVII), formula (XVIIII), or formula (XIX) set forth below:

$$\text{multiurethane-}(F_2-R_8-F_2)_x \quad (XVII)$$

$$\text{polyol-}[(\text{urethane-}R_9-\text{urethane})_m-R_8-F_2]_x \quad (XVIII)$$

$$\text{multiurethane-}(R_8-F_2)_x \quad (XIX)$$

where $F_2$ may independently represent from 1 to 3 functional groups such as acrylate, methacrylate, acrylamide, N-vinyl amide, styrene, vinyl ether, vinyl ester, or other functional groups known in the art; $R_8$ can include $-(CH_2)_{2-12}-O-$, —$((CH_2)_{2-4}$—O$)_n$—, —$(CH_2)_{2-12}$O—$((CH_2)_{2-4}$—O$)_n$—, —$(CH_2)_{2-12}$—O—(CO—$(CH_2)_{2-5}$—O$)_n$—, or —$(CH_2)_{2-12}$—O—(CO—$(CH_2)_{2-5}$—NH$)_n$— where n is a whole number from 1 to 10, including, for example, from 1 to 5; $R_9$ may be polyether, polyester, polycarbonate, polyamide, polyurethane, polyurea or combinations thereof; x is a whole number from 1 to 10, including, for example, from 2 to 5; and m is a whole number from 1 to 10, including, for example, from 1 to 5. In the structure of formula (XVII) of (XIX), the multiurethane group may be the residue formed from reaction of a multiisocyanate with $R_9$. Similarly, the urethane group in the structure of formula (XVIII) may be the reaction product formed following bonding of a diisocyanate to $R_9$ and/or $R_8$.

Urethane oligomers may be prepared by reacting an aliphatic or aromatic diisocyanate with a dihydric polyether or polyester, most typically a polyoxyalkylene glycol such as a polyethylene glycol. Moisture-resistant oligomers may be synthesized in an analogous manner, except that polar polyethers or polyester glycols are avoided in favor of predominantly saturated and predominantly nonpolar aliphatic diols. These diols may include alkane or alkylene diols of from about 2-250 carbon atoms that may be substantially free of ether or ester groups.

Polyurea elements may be incorporated in oligomers prepared by these methods, for example, by substituting diamines or polyamines for diols or polyols in the course of synthesis.

The curable secondary coating composition also includes a photoinitiator and optionally includes additives such as anti-oxidant(s), optical brightener(s), amine synergist(s), tackifier(s), catalyst(s), a carrier or surfactant, and a stabilizer as described above in connection with the curable primary coating composition.

The curable secondary coating composition includes a single photoinitiator or a combination of two or more photoinitiators. The total photoinitiator content of the curable secondary coating composition is up to about 10 wt %, or between about 0.5 wt % and about 6 wt %.

A representative antioxidant is thiodiethylene bis[3-(3,5-di-tert-butyl)-4-hydroxy-phenyl) propionate] (e.g., IRGANOX 1035, available from BASF). In some aspects, an antioxidant is present in the curable secondary coating composition in an amount greater than 0.25 wt %, or greater than 0.50 wt %, or greater than 0.75 wt %, or greater than 1.0 wt %, or an amount in the range from 0.25 wt % to 3.0 wt %, or an amount in the range from 0.50 wt % to 2.0 wt %, or an amount in the range from 0.75 wt % to 1.5 wt %.

Representative optical brighteners include TINOPAL OB (available from BASF); Blankophor KLA (available from Bayer); bisbenzoxazole compounds; phenylcoumarin compounds; and bis(styryl)biphenyl compounds. In an embodiment, the optical brightener is present in the curable secondary coating composition at a concentration of 0.005 wt % to 0.3 wt %.

Representative amine synergists include triethanolamine; 1,4-diazabicyclo[2.2.2]octane (DABCO), triethylamine, and methyldiethanolamine. In an embodiment, an amine synergist is present at a concentration of 0.02 wt % to 0.5 wt %.

Secondary Coating—Properties. Relevant properties of the secondary coating include radius, thickness, Young's modulus, tensile strength, yield strength, elongation at yield, and puncture resistance The radius $r_6$ of the secondary coating is less than or equal to 100.0 µm, or less than or equal to 95.0 µm, or less than or equal to 90.0 µm, or less than or equal to 85.0 µm, or less than or equal to 80.0 µm, or in the range from 77.5 µm to 100.0 µm, or in the range from 77.5 µm to 97.5 µm, or in the range from 77.5 µm to 95.0 µm, or in the range from 77.5 µm to 92.5 µm, or in the range from 77.5 µm to 90.0 µm, or in the range from 80.0 µm to 100.0 µm, or in the range from 80.0 µm to 97.5 µm, or in the range from 80.0 µm to 95.0 µm, or in the range from 80.0 µm to 92.5 µm, or in the range from 80.0 µm to 90.0 µm, or in the range from 82.5 µm to 100.0 µm, or in the range from 82.5 µm to 97.5 µm, or in the range from 82.5 µm to 95.0 µm, or in the range from 82.5 µm to 92.5 µm, or in the range from 82.5 µm to 90.0 µm.

To facilitate decreases in the diameter of the optical fiber, it is preferable to minimize the thickness $r_6-r_5$ of the secondary coating. The thickness $r_6-r_5$ of the secondary coating is in the range from 15.0 µm to 32.5 µm, or in the range from 17.5 µm to 32.5 µm, or in the range from 20.0 µm to 32.5 µm, or in the range from 22.5 µm to 32.5 µm, or in the range from 25.0 µm to 32.5 µm, or in the range from 27.5 µm to 32.5 µm, or in the range from 15.0 µm to 30.0 µm, or in the range from 17.5 µm to 30.0 µm, or in the range from 20.0 µm to 30.0 µm, or in the range from 22.5 µm to 30.0 µm, or in the range from 25.0 µm to 30.0 µm, or in the range from 15.0 µm to 27.5 µm, or in the range from 17.5 µm to 27.5 µm, or in the range from 20.0 µm to 27.5 µm, or in the range from 15.0 µm to 25.0 µm.

To facilitate puncture resistance and high protective function, it is preferable for the secondary coating to have a high Young's modulus. The Young's modulus of the secondary coating is greater than or equal to 1600 MPa, or greater than or equal to 1800 MPa, or greater than or equal to 2000 MPa, or greater than or equal to 2200 MPa, or in the range from 1600 MPa to 2800 MPa, or in the range from 1800 MPa to 2600 MPa.

Fiber Draw Process. In a continuous optical fiber manufacturing process, a glass fiber is drawn from a heated preform and sized to a target diameter (typically 125 µm). In some embodiments, the glass fiber diameter is 125 microns. In some other embodiments, the fiber glass diameter is less than 110 microns. In still other embodiments, the fiber glass dimeter is less than 100 microns. The glass fiber is then cooled and directed to a coating system that applies a liquid primary coating composition to the glass fiber. Two process options are viable after application of the liquid primary coating composition to the glass fiber. In one process option (wet-on-dry process), the liquid primary coating composition is cured to form a solidified primary coating, the liquid secondary coating composition is applied to the cured primary coating, and the liquid secondary coating composition is cured to form a solidified secondary coating. In a second process option (wet-on-wet process), the liquid secondary coating composition is applied to the liquid primary coating composition, and both liquid coating compositions are cured simultaneously to provide solidified primary and secondary coatings. After the fiber exits the coating system, the fiber is collected and stored at room temperature. Collection of the fiber typically entails winding the fiber on a spool and storing the spool.

In some processes, the coating system further applies a tertiary coating composition to the secondary coating and cures the tertiary coating composition to form a solidified tertiary coating. Typically, the tertiary coating is an ink layer used to mark the fiber for identification purposes and has a composition that includes a pigment and is otherwise similar to the secondary coating. The tertiary coating is applied to the secondary coating and cured. The secondary coating has typically been cured at the time of application of the tertiary coating. The primary, secondary, and tertiary coating compositions can be applied and cured in a common continuous manufacturing process. Alternatively, the primary and secondary coating compositions are applied and cured in a common continuous manufacturing process, the coated fiber is collected, and the tertiary coating composition is applied and cured in a separate offline process to form the tertiary coating.

The wavelength of curing radiation is infrared, visible, or ultraviolet (UV). Representative wavelengths include wavelengths in the range from 250 nm to 1000 nm, or in the range from 250 nm to 700 nm, or in the range from 250 nm to 450 nm, or in the range from 275 nm to 425 nm, or in the range from 300 nm to 400 nm, or in the range from 320 nm to 390 nm, or in the range from 330 nm to 380 nm, or in the range from 340 nm to 370 nm. Curing can be accomplished with light sources that include a lamp source (e.g. Hg lamp), an LED source (e.g. a UVLED, visible LED, or infrared LED), or a laser source.

Each of the primary, secondary, and tertiary compositions are curable with any of the wavelengths and any of the light sources referred to above. The same wavelength or source can be used to cure each of the primary, secondary, and tertiary compositions, or different wavelengths and/or different sources can be used to cure the primary, secondary, and tertiary compositions. Curing of the primary, secondary, and tertiary compositions can be accomplished with a single wavelength or a combination of two or more wavelengths.

To improve process efficiency, it is desirable to increase the draw speed of the fiber along the process pathway extending from the preform to the collection point. As the draw speed increases, however, the cure speed of coating compositions must increase. The coating compositions disclosed herein are compatible with fiber draw processes that operate at a draw speed greater than 35 m/s, or greater than 40 m/s, or greater than 45 m/s, or greater than 50 m/s, or greater than 55 m/s, or greater than 60 m/s, or greater than 65 m/s, or greater than 70 m/s.

The present disclosure extends to optical fibers coated with the cured product of the coating compositions. The optical fiber includes a glass waveguide with a higher index glass core region surrounded by a lower index glass cladding region. A coating formed as a cured product of the present coating compositions surrounds and is in direct contact with the glass cladding. The cured product of the present coating compositions functions as a primary coating, secondary coating, or tertiary coating of the fiber.

Examples—Primary Coatings

The following examples illustrate preparation of a representative primary coatings. Measurements of selected properties of the representative primary coatings are also described.

Primary Coating—Oligomer. The representative primary coating compositions included an oligomer. For purposes of illustration, preparation of exemplary oligomers from H12MDI (4,4'-methylene bis(cyclohexyl isocyanate), PPG4000 (polypropylene glycol with $M_n$~4000 g/mol) and HEA (2-hydroxyethyl acrylate) in accordance with the reaction scheme hereinabove is described. All reagents were used as supplied by the manufacturer and were not subjected to further purification. H12MDI was obtained from ALDRICH. PPG4000 was obtained from COVESTRO and was certified to have an unsaturation of 0.004 meq/g as determined by the method described in the standard ASTM D4671-16. HEA was obtained from KOWA.

The relative amounts of the reactants and reaction conditions were varied to obtain a series of six oligomers. Oligomers with different initial molar ratios of the constituents were prepared with molar ratios of the reactants satisfying H12MDI:HEA:PPG4000=n:m:p, where n was in the range from 3.0 to 4.0, m was in the range from 1.5n to 3 to 2.5n to 5, and p=2. In the reactions used to form the oligomers materials, dibutyltin dilaurate was used as a catalyst (at a level of 160 ppm based on the mass of the initial reaction mixture) and 2,6-di-tert-butyl-4-methylphenol (BHT) was used as an inhibitor (at a level of 400 ppm based on the mass of the initial reaction mixture).

The amounts of the reactants used to prepare each of the six oligomers are summarized in Table 1 below. The six oligomers are identified by separate Sample numbers 1-6. Corresponding sample numbers will be used herein to refer to coating compositions and cured films formed from coating compositions that individually contain each of the six oligomers. The corresponding mole numbers used in the preparation of each of the six samples are listed in Table 2 below. The mole numbers are normalized to set the mole number p of PPG4000 to 2.0.

TABLE 1

Reactants and Amounts for Exemplary Oligomer Samples 1-6

| Sample | H12MDI (g) | HEA (g) | PPG4000 (g) |
|---|---|---|---|
| 1 | 22 | 6.5 | 221.5 |
| 2 | 26.1 | 10.6 | 213.3 |
| 3 | 26.1 | 10.6 | 213.3 |
| 4 | 27.8 | 12.3 | 209.9 |
| 5 | 27.8 | 12.3 | 209.9 |
| 6 | 22 | 6.5 | 221.5 |

TABLE 2

Mole Numbers for Oligomer Samples 1-6

| Sample | H12MDI Mole Number (n) | HEA Mole Number (m) | PPG4000 Mole Number (p) | Di-adduct (wt %) |
|---|---|---|---|---|
| 1 | 3.0 | 2.0 | 2.0 | 1.3 |
| 2 | 3.7 | 3.4 | 2.0 | 3.7 |
| 3 | 3.7 | 3.4 | 2.0 | 3.7 |
| 4 | 4.0 | 4.0 | 2.0 | 5.0 |
| 5 | 4.0 | 4.0 | 2.0 | 5.0 |
| 6 | 3.0 | 2.0 | 2.0 | 1.3 |

The oligomers were prepared by mixing 4,4'-methylene bis(cyclohexyl isocyanate), dibutyltin dilaurate and 2,6-di-tert-butyl-4 methylphenol at room temperature in a 500 mL flask. The 500 mL flask was equipped with a thermometer, a $CaCl_2$ drying tube, and a stirrer. While continuously stirring the contents of the flask, PPG4000 was added over a time period of 30-40 minutes using an addition funnel. The internal temperature of the reaction mixture was monitored as the PPG4000 was added and the introduction of PPG4000 was controlled to prevent excess heating (arising from the exothermic nature of the reaction). After the PPG4000 was added, the reaction mixture was heated in an oil bath at about 70° C. to 75° C. for about 1 to 1½ hours. At various intervals, samples of the reaction mixture were retrieved for analysis by infrared spectroscopy (FTIR) to monitor the progress of the reaction by determining the concentration of unreacted isocyanate groups. The concentration of unreacted isocyanate groups was assessed based on the intensity of a characteristic isocyanate stretching mode near 2265 $cm^{-1}$. The flask was removed from the oil bath and its contents were allowed to cool to below 65° C. Addition of supplemental HEA was conducted to insure complete quenching of isocyanate groups. The supplemental HEA was added dropwise over 2-5 minutes using an addition funnel. After addition of the supplemental HEA, the flask was returned to the oil bath and its contents were again heated to about 70° C. to 75° C. for about 1 to 1½ hours. FTIR analysis was conducted on the reaction mixture to assess the presence of isocyanate groups and the process was repeated until enough supplemental HEA was added to fully react any unreacted isocyanate groups. The reaction was deemed complete when no appreciable isocyanate stretching intensity was detected in the FTIR measurement. The HEA amounts listed in Table 1 include the initial amount of HEA in the composition and any amount of supplemental HEA needed to quench unreacted isocyanate groups.

The concentration (wt %) of di-adduct compound in each oligomer was determined by gel permeation chromatography (GPC). A Waters Alliance 2690 GPC instrument was used to determine the di-adduct concentration. The mobile phase was THF. The instrument included a series of three Polymer Labs columns. Each column had a length of 300 mm and an inside diameter of 7.5 mm. Two of the columns (columns 1 and 2) were sold under Part No. PL1110-6504 by Agilent Technologies and were packed with PLgel Mixed D stationary phase (polystyrene divinyl benzene copolymer, average particle size=5 µm, specified molecular weight range=200 g/mol to 400,000 g/mol). The third column (column 3) was sold under Part No. PL1110-6520 by Agilent Technologies and was packed with PLgel 100A stationary phase (polystyrene divinyl benzene copolymer, average particle size=5 µm, specified molecular weight range=up to 4,000 g/mol). The columns were calibrated with polystyrene standards ranging from 162 g/mol to 6,980,000 g/mol using EasiCal PS-1 & 2 polymer calibrant kits (Agilent Technologies Part Nos. PL2010-505 and PL2010-0601). The GPC instrument was operated under the following conditions: flow rate=1.0 mL/min, column temperature=40° C., injection volume=100 µL, and run time=35 min (isocratic conditions). The detector was a Waters Alliance 2410 differential refractometer operated at 40° C. and sensitivity level 4. The samples were injected twice along with a THF+0.05% toluene blank.

The amount (wt %) of di-adduct in the oligomers was quantified using the preceding GPC system and technique. A calibration curve was obtained using standard solutions containing known amounts of the di-adduct compound (HEA~H12MDI~HEA) in THF. Standard solutions with di-adduct concentrations of 115.2 µg/g, 462.6 µg/g, 825.1 µg/g, and 4180 µg/g were prepared. (As used herein, the dimension "µg/g" refers to µg of di-adduct per gram of total solution (di-adduct+THF)). Two 100 µL aliquots of each di-adduct standard solution were injected into the column to obtain the calibration curve. The retention time of the di-adduct was approximately 23 min and the area of the GPC peak of the di-adduct was measured and correlated with di-adduct concentration. A linear correlation of peak area as a function of di-adduct concentration was obtained (correlation coefficient ($R^2$)=0.999564).

The di-adduct concentration in the oligomers was determined using the calibration. Samples were prepared by diluting ~0.10 g of oligomeric material in THF to obtain a ~1.5 g test solution. The test solution was run through the GPC instrument and the area of the peak associated with the di-adduct compound was determined. The di-adduct concentration in units of µg/g was obtained from the peak area and the calibration curve, and was converted to wt % by multiplying by the weight (g) of the test solution and dividing by the weight of the sample of oligomeric material before dilution with THF. The wt % of di-adduct compound present in each of the six oligomers prepared in this example are reported in Table 2.

Through variation in the relative mole ratios of H12MDI, HEA, and PPG4000, the illustrative oligomers include a polyether urethane compound of the type shown in molecular formula (IV) hereinabove and an enhanced concentration of di-adduct compound of the type shown in molecular formula (V) hereinabove.

Primary Coating—Compositions. Oligomers corresponding to Samples 1-6 were separately combined with other components to form a series of six representative primary coating compositions. The amount of each component in the coating composition is listed in Table 3 below. The entry in Table 3 for the oligomer includes the combined amount of polyether urethane acrylate compound and di-adduct compound present in the oligomer. A separate coating composition was made for each of the six exemplary oligomers corresponding to Samples 1-6, where the amount of di-adduct compound in the oligomeric material corresponded to the amount listed in Table 2.

TABLE 3

| Coating Composition | |
|---|---|
| Component | Amount |
| Oligomeric Material | 49.10 wt % |
| Sartomer SR504 | 45.66 wt % |
| V-CAP/RC | 1.96 wt % |
| TPO | 1.47 wt % |
| Irganox 1035 | 0.98 wt % |
| adhesion promoter | 0.79 wt % |
| Tetrathiol | 0.03 wt % |

Sartomer SR504 is ethoxylated (4) nonylphenol acrylate (available from Sartomer). V-CAP/RC is N-vinylcaprolactam (available from ISP Technologies). TPO is 2,4,6-trimethylbenzoyl)diphenyl phosphine oxide (available from BASF under the trade name Lucirin and functions as a photoinitiator). Irganox 1035 is thiodiethylene bis[3-(3,5-di-tert-butyl)-4-hydroxy-phenyl) propionate] (available from BASF) and functions as an antioxidant. The adhesion promoters were 3-acryloxypropyl trimethoxysilane (available from Gelest) and 3-mercaptopropyl trimethoxysilane (available from Aldrich). 3-acryloxypropyl trimethoxysilane was used for Samples 1, 3, and 5. 3-mercaptopropyl trimethoxysilane was used for Samples 2, 4, and 6. Tetrathiol is a catalyst quencher.

The coating compositions of Table 3 were each formulated using a high-speed mixer in an appropriate container heated to 60° C., with a heating band or heating mantle. In each case, the components were weighed into the container using a balance and allowed to mix until the solid components were thoroughly dissolved and the mixture appeared homogeneous. The oligomer and monomers (SR504, NVC) of each composition were blended together for at least 10 minutes at 55° C. to 60° C. The photoinitiator, antioxidant, and catalyst quencher were then added, and blending was continued for one hour while maintaining a temperature of 55° C. to 60° C. Finally, the adhesion promoter was added, and blending was continued for 30 minutes at 55° C. to 60° C. to form the coating compositions.

Primary Coating—Properties—Tensile Properties. Tensile properties (Young's modulus, tensile strength at yield, and elongation at yield) were measured on films formed by curing the six coating compositions. Separate films were formed from each coating composition. Wet films of the coating composition were cast on silicone release paper with the aid of a draw-down box having a gap thickness of about 0.005". The wet films were cured with a UV dose of 1.2 J/cm² (measured over a wavelength range of 225 to 424 nm by a Light Bug model IL490 from International Light) by a Fusion Systems UV curing apparatus with a 600 W/in D-bulb (50% Power and approximately 12 ft/min belt speed) to yield cured coatings in film form. Cured film thickness was between about 0.0030" and 0.0035".

The films were aged (23° C., 50% relative humidity) for at least 16 hours prior to testing. Film samples were cut to dimensions of 12.5 cm×13 mm using a cutting template and a scalpel. Young's modulus, tensile strength at yield, and elongation at yield were measured at room temperature (approximately 20° C.) on the film samples using a MTS Sintech tensile test instrument following procedures set forth in ASTM Standard D882-97. Young's modulus is defined as the steepest slope of the beginning of the stress-strain curve. Films were tested at an elongation rate of 2.5 cm/min with the initial gauge length of 5.1 cm. The results are shown in Table 4.

TABLE 4

Young's Modulus, Tensile Strength, and Elongation of Film Samples

| Sample | Young's Modulus (MPa) | Tensile Strength (MPa) | Elongation (%) |
|---|---|---|---|
| 1 | 0.72 | 0.51 | 137.9 |
| 2 | 0.57 | 0.44 | 173 |
| 3 | 1.0 | 0.86 | 132.8 |
| 4 | 0.71 | 0.45 | 122.3 |
| 5 | 0.72 | 0.56 | 157.4 |
| 6 | 0.33 | 0.33 | 311.9 |

Primary Coating—Properties—In Situ Modulus. In situ modulus measurements of primary coating composition Samples 2, 3, and 5 were completed. In situ modulus measurements require forming the primary coatings on a glass fiber having a diameter of 125 µm. Each of Samples 2, 3, and 5 was separately applied as a primary coating composition to a glass fiber as the glass fiber was being drawn. The fiber draw speed was 50 m/s. The primary coating compositions were cured using a stack of five LED sources. Each LED source was operated at 395 nm and had an intensity of 12 W/cm². After application and curing of the primary coating compositions, a secondary coating composition was applied to each of the cured primary coatings and cured using UV sources to form a secondary coating layer. The thickness of the primary coating was 32.5 µm and the thickness of the secondary coating was 26.0 µm.

The in situ modulus was measured using the following procedure. A six-inch sample of fiber was obtained and a one-inch section from the center of the fiber was window stripped and wiped with isopropyl alcohol. The window-stripped fiber was mounted on a sample holder/alignment stage equipped with 10 mm×5 mm rectangular aluminum tabs that were used to affix the fiber. Two tabs were oriented horizontally and positioned so that the short 5 mm sides were facing each other and separated by a 5 mm gap. The window-stripped fiber was laid horizontally on the sample holder across the tabs and over the gap separating the tabs. The coated end of one side of the window-stripped region of the fiber was positioned on one tab and extended halfway into the 5 mm gap between the tabs. The one-inch window-stripped region extended over the remaining half of the gap and across the opposing tab. After alignment, the sample was moved and a small dot of glue was applied to the half of each tab closest to the 5 mm gap. The fiber was then returned to position and the alignment stage was raised until the glue just touched the fiber. The coated end was then pulled away from the gap and through the glue such that the majority of the 5 mm gap between the tabs was occupied by the window-stripped region of the fiber. The portion of the window-stripped region remaining on the opposing tab was in contact with the glue. The very tip of the coated end was left to extend beyond the tab and into the gap between the tabs. This portion of the coated end was not embedded in the glue and was the object of the in situ modulus measurement. The glue was allowed to dry with the fiber sample in this configuration to affix the fiber to the tabs. After drying, the length of fiber fixed to each of the tabs was trimmed to 5 mm. The coated length embedded in glue, the non-embedded coated length (the portion extending into the gap between the tabs), and the primary diameter were measured.

The in situ modulus measurements were performed on a Rheometrics DMTA IV dynamic mechanical testing apparatus at a constant strain of 9e-6 1/s for a time of forty-five minutes at room temperature (21° C.). The gauge length was 15 mm. Force and the change in length were recorded and used to calculate the in situ modulus of the primary coating. The tab-mounted fiber samples were prepared by removing any epoxy from the tabs that would interfere with the 15 mm clamping length of the testing apparatus to insure that there was no contact of the clamps with the fiber and that the sample was secured squarely to the clamps. The instrument force was zeroed out. The tab to which the non-coated end of the fiber was affixed was then mounted to the lower clamp (measurement probe) of the testing apparatus and the tab to which the coated end of the fiber was affixed was mounted to the upper (fixed) clamp of the testing apparatus. The test was then executed and the sample was removed once the analysis was completed.

The in situ modulus of primary coating Samples 2, 3, and 5 are listed in Table 5.

TABLE 5

In Situ Modulus of Selected Primary Coatings

| Sample | In-Situ Modulus (MPa) |
|---|---|
| 2 | 0.27 |
| 3 | 0.33 |
| 5 | 0.3 |

Examples—Secondary Coatings

The following examples illustrate preparation of a representative secondary coatings. Measurements of selected properties of the representative secondary coatings are also described.

Secondary Coating Compositions. Representative curable secondary coating compositions are listed in Table 6.

TABLE 6

Secondary Coating Compositions

| | Composition | | | |
|---|---|---|---|---|
| Component | KA | KB | KC | KD |
| SR601 (wt %) | 72.0 | 30.0 | 30.0 | 30.0 |
| SR602 (wt %) | | 37.0 | 37.0 | 37.0 |

TABLE 6-continued

Secondary Coating Compositions

| Component | Composition | | | |
|---|---|---|---|---|
|  | KA | KB | KC | KD |
| SR349 (wt %) |  | 30.0 | 15.0 |  |
| SR399 (wt %) |  |  | 15.0 |  |
| SR499 (wt %) |  |  |  | 30.0 |
| CD9038 (wt %) | 10.0 |  |  |  |
| Photomer 3016 (wt %) | 15.0 |  |  |  |
| TPO (wt %) | 1.5 |  |  |  |
| Irgacure 184 (wt %) | 1.5 |  |  |  |
| Irgacure 1850 (wt %) |  | 3.0 | 3.0 | 3.0 |
| Irganox 1035 (pph) | 0.5 |  |  |  |
| DC-190 (pph) | 1.0 |  |  |  |

SR601 is ethoxylated (4) bisphenol A diacrylate (a monomer). SR602 is ethoxylated (10) bisphenol A diacrylate (a monomer). SR349 is ethoxylated (2) bisphenol A diacrylate (a monomer). SR399 is dipentaerythritol pentaacrylate. SR499 is ethoxylated (6) trimethylolpropane triacrylate. CD9038 is ethoxylated (30) bisphenol A diacrylate (a monomer). Photomer 3016 is bisphenol A epoxy diacrylate (a monomer). TPO is a photoinitiator. Irgacure 184 is 1-hydroxycyclohexylphenyl ketone (a photoinitiator). Irgacure 1850 is bis(2,6-dimethoxybenzoyl)-2,4,4-trimethylpentylphosphine oxide (a photoinitiator). Irganox 1035 is thiodiethylene bis(3,5-di-tert-butyl)-4-hydroxyhydrocinnamate (an antioxidant). DC190 is silicone-ethylene oxide/propylene oxide copolymer (a slip agent). The concentration unit "pph" refers to an amount relative to a base composition that includes all monomers, oligomers, and photoinitiators. For example, for secondary coating composition KA, a concentration of 1.0 pph for DC-190 corresponds to 1 g DC-190 per 100 g combined of SR601, CD9038, Photomer 3016, TPO, and Irgacure 184.

A comparative curable secondary coating composition (A) and three representative curable secondary coating compositions (SB, SC, and SD) are listed in Table 7.

TABLE 7

Secondary Coating Compositions

| Component | Composition | | | |
|---|---|---|---|---|
|  | A | SB | SC | SD |
| PE210 (wt %) | 15.0 | 15.0 | 15.0 | 15.0 |
| M240 (wt %) | 72.0 | 72.0 | 72.0 | 62.0 |
| M2300 (wt %) | 10.0 | — | — | — |
| M3130 (wt %) | — | 10.0 | — | — |
| M370 (wt %) | — | — | 10.0 | 10.0 |
| TPO (wt %) | 1.5 | 1.5 | 1.5 | 1.5 |
| Irgacure 184 (wt %) | 1.5 | 1.5 | 1.5 | 1.5 |
| Irganox 1035 (pph) | 0.5 | 0.5 | 0.5 | 0.5 |
| DC-190 (pph) | 1.0 | 1.0 | 1.0 | 1.0 |

PE210 is bisphenol-A epoxy diacrylate (available from Miwon Specialty Chemical, Korea), M240 is ethoxylated (4) bisphenol-A diacrylate (available from Miwon Specialty Chemical, Korea), M2300 is ethoxylated (30) bisphenol-A diacrylate (available from Miwon Specialty Chemical, Korea), M3130 is ethoxylated (3) trimethylolpropane triacrylate (available from Miwon Specialty Chemical, Korea), TPO (a photoinitiator) is (2,4,6-trimethylbenzoyl)diphenyl phosphine oxide (available from BASF), Irgacure 184 (a photoinitiator) is 1-hydroxycyclohexylphenyl ketone (available from BASF), Irganox 1035 (an antioxidant) is benzenepropanoic acid, 3,5-bis(1,1-dimethylethyl)-4-hydroxythiodi-2,1-ethanediyl ester (available from BASF). DC190 (a slip agent) is silicone-ethylene oxide/propylene oxide copolymer (available from Dow Chemical). The concentration unit "pph" refers to an amount relative to a base composition that includes all monomers and photoinitiators. For example, for secondary coating composition A, a concentration of 1.0 pph for DC-190 corresponds to 1 g DC-190 per 100 g combined of PE210, M240, M2300, TPO, and Irgacure 184.

Secondary Coating—Properties. The Young's modulus, tensile strength at break, and elongation at break of secondary coatings made from representative secondary compositions A, KA, KB, KC, KD, SB, SC and SD were measured.

Secondary Coating—Properties—Measurement Techniques. Properties of secondary coatings were determined using the measurement techniques described below:

Tensile Properties. The curable secondary coating compositions were cured and configured in the form of cured rod samples for measurement of Young's modulus, tensile strength at yield, yield strength, and elongation at yield. The cured rods were prepared by injecting the curable secondary composition into Teflon® tubing having an inner diameter of about 0.025". The rod samples were cured using a Fusion D bulb at a dose of about 2.4 J/cm$^2$ (measured over a wavelength range of 225-424 nm by a Light Bug model IL390 from International Light). After curing, the Teflon® tubing was stripped away to provide a cured rod sample of the secondary coating composition. The cured rods were allowed to condition for 18-24 hours at 23° C. and 50% relative humidity before testing. Young's modulus, tensile strength at break, yield strength, and elongation at yield were measured using a Sintech MTS Tensile Tester on defect-free rod samples with a gauge length of 51 mm, and a test speed of 250 mm/min. Tensile properties were measured according to ASTM Standard D882-97. The properties were determined as an average of at least five samples, with defective samples being excluded from the average.

Puncture Resistance of Secondary Coating. Puncture resistance measurements were made on samples that included a glass fiber, a primary coating, and a secondary coating. The glass fiber had a diameter of 125 μm. The primary coating was formed from the reference primary coating composition listed in Table 8 below. Samples with various secondary coatings were prepared as described below. The thicknesses of the primary coating and secondary coating were adjusted to vary the cross-sectional area of the secondary coating as described below. The ratio of the thickness of the secondary coating to the thickness of the primary coating was maintained at about 0.8 for all samples.

The puncture resistance was measured using the technique described in the article entitled "Quantifying the Puncture Resistance of Optical Fiber Coatings", by G. Scott Glaesemann and Donald A. Clark, published in the Proceedings of the 52$^{nd}$ International Wire & Cable Symposium, pp. 237-245 (2003). A summary of the method is provided here. The method is an indentation method. A 4-centimeter length of optical fiber was placed on a 3 mm-thick glass slide. One end of the optical fiber was attached to a device that permitted rotation of the optical fiber in a controlled fashion. The optical fiber was examined in transmission under 100× magnification and rotated until the secondary coating thickness was equivalent on both sides of the glass fiber in a direction parallel to the glass slide. In this position, the thickness of the secondary coating was equal on both sides of the optical fiber in a direction parallel to the glass slide. The thickness of the secondary coating in the directions normal to the glass slide and above or below the glass fiber differed from the thickness of the secondary coating in the direction parallel to the glass slide. One of the thicknesses in the direction normal to the glass slide was greater and the other of the thicknesses in the direction normal to the glass slide was less than the thickness in the direction parallel to the glass slide. This position of the optical fiber was fixed by taping the optical fiber to the glass slide at both ends and is the position of the optical fiber used for the indentation test.

Indentation was carried out using a universal testing machine (Instron model 5500R or equivalent). An inverted microscope was placed beneath the crosshead of the testing machine. The objective of the microscope was positioned directly beneath a 75° diamond wedge indenter that was installed in the testing machine. The glass slide with taped fiber was placed on the microscope stage and positioned directly beneath the indenter such that the width of the indenter wedge was orthogonal to the direction of the optical fiber. With the optical fiber in place, the diamond wedge was lowered until it contacted the surface of the secondary coating. The diamond wedge was then driven into the secondary coating at a rate of 0.1 mm/min and the load on the secondary coating was measured. The load on the secondary coating increased as the diamond wedge was driven deeper into the secondary coating until puncture occurred, at which point a precipitous decrease in load was observed. The indentation load at which puncture was observed was recorded and is reported herein as grams of force. The experiment was repeated with the optical fiber in the same orientation to obtain ten measurement points, which were averaged to determine a puncture resistance for the orientation. A second set of ten measurement points was taken by rotating the orientation of the optical fiber by 180°.

Microbending. In the wire-mesh-covered drum test, the attenuation of light at wavelength of 1550 nm through a coated fiber having a length of 750 m was determined at room temperature. The microbend induced attenuation was determined by the difference between a zero-tension deployment and a high-tension deployment on the wire-mesh-covered drum. Separate measurements were made for two winding configurations. In the first configuration, the fiber was wound in a zero-tension configuration on an aluminum drum having a smooth surface and a diameter of approximately 400 mm. The zero-tension winding configuration provided a stress-free reference attenuation for light passing through the fiber. After sufficient dwell time, an initial attenuation measurement was performed. In the second winding configuration, the fiber sample was wound to an aluminum drum that was wrapped with fine wire mesh. For this deployment, the barrel surface of the aluminum drum was covered with wire mesh and the fiber was wrapped around the wire mesh. The mesh was wrapped tightly around the barrel without stretching and was kept intact without holes, dips, tearing, or damage. The wire-mesh material used in the measurements was made from corrosion-resistant type 304 stainless steel woven wire cloth and had the following characteristics: mesh per linear inch: 165×165, wire diameter: 0.0019", width opening: 0.0041", and open area %: 44.0. A 750 m length of coated fiber was wound at 1 m/s on the wire-mesh-covered drum at 0.050 cm take-up pitch while applying 80 (+/−1) grams of tension. The ends of the fiber were taped to maintain tension and there were no fiber crossovers. The points of contact of the wound fiber with the mesh impart stress to the fiber and the attenuation of light through the wound fiber is a measure of stress-induced (microbending) losses of the fiber. The wire-mesh-covered drum measurement was performed after a dwell time of 1-hour. The increase in fiber attenuation (in dB/km) in the measurement performed in the second configuration (wire-mesh-covered drum) relative to the first configuration (smooth drum) was determined for each wavelength. The average of three trials was determined at each wavelength and is reported as the wire-mesh-covered drum microbend loss.

Reference Primary Coating. In measurements of in situ glass transition temperature ($T_g$), and puncture resistance, the measurement samples included a primary coating between the glass fiber and a secondary coating. The primary coating composition had the formulation given in Table 8 and is typical of commercially available primary coating compositions.

TABLE 8

Reference Primary Coating Composition

| Component | Amount |
| --- | --- |
| Oligomeric Material | 50.0 wt % |
| SR504 | 46.5 wt % |
| NVC | 2.0 wt % |
| TPO | 1.5 wt % |
| Irganox 1035 | 1.0 pph |
| 3-Acryloxypropyl trimethoxysilane | 0.8 pph |
| Pentaerythritol tetrakis(3-mercapto propionate) | 0.032 pph | where the oligomeric material was prepared as described above from H12MDI, HEA, and PPG4000 using a molar ratio n:m:p=3.5:3.0:2.0, SR504 is ethoxylated (4) nonylphenol acrylate (available from Sartomer), NVC is N-vinylcaprolactam (available from Aldrich), TPO (a photoinitiator) is (2,4,6-trimethylbenzoyl)-diphenyl phosphine oxide (available from BASF), Irganox 1035 (an antioxidant) is benzenepropanoic acid, 3,5-bis(1,1-dimethylethyl)-4-hydroxythiodi-2,1-ethanediyl ester (available from BASF), 3-acryloxypropyl trimethoxysilane is an adhesion promoter (available from Gelest), and pentaerythritol tetrakis(3-mercaptopropionate) (also known as tetrathiol, available from Aldrich) is a chain transfer agent. The concentration unit "pph" refers to an amount relative to a base composition that includes all monomers, oligomers, and photoinitiators. For example, a concentration of 1.0 pph for Irganox 1035 corresponds to 1 g Irganox 1035 per 100 g combined of oligomeric material, SR504, NVC, and TPO.

Secondary Coatings—Properties—Tensile Properties. The results of tensile property measurements prepared from the representative curable secondary compositions are shown in Table 9.

TABLE 9

Tensile Properties of Secondary Coatings

| Composition | Tensile Strength (MPa) | Elongation at yield (%) | Yield Strength (MPa) | Young's Modulus (MPa) |
| --- | --- | --- | --- | --- |
| KA | 54.3 | 39.0 | | 1528 |
| KB | 63.1 | 24.1 | | 1703 |
| KC | 45.7 | 28.4 | | 1242 |
| KD | 61.8 | 32.5 | | 1837 |
| A | 86.09 | 4.60 | 48.21 | 2049 |
| SB | 75.56 | 4.53 | 61.23 | 2532 |
| SC | 82.02 | 4.76 | 66.37 | 2653 |
| SD | 86.08 | 4.87 | 70.05 | 2776 |

The results show that secondary coatings prepared from compositions SB, SC, and SD exhibited higher Young's modulus, and higher yield strength than the secondary coating prepared from comparative composition A. The higher values represent improvements that make secondary coatings prepared for the representative curable coating compositions disclosed herein better suited for small diameter optical fibers. More specifically, the higher values enable use of thinner secondary coatings on optical fibers without sacrificing performance. Thinner secondary coatings reduce the overall diameter of the optical fiber and provide higher fiber counts in cables of a given cross-sectional area.

The Young's modulus of secondary coatings prepared as cured products from the representative curable secondary coating compositions disclosed herein is greater than 1600 MPa, or greater than 1900 MPa, or greater than 2200 MPa, or greater than 2500 MPa, or in the range from 1600 MPa to 2800 MPa, or in the range from 1900 MPa to 2500 MPa.

The yield strength of secondary coatings prepared as cured products from the representative curable secondary coating compositions disclosed herein is greater than 55 MPa, or greater than 60 MPa, or greater than 65 MPa, or greater than 70 MPa, or in the range from 55 MPa to 75 MPa, or in the range from 60 MPa to 70 MPa.

Figure 7:
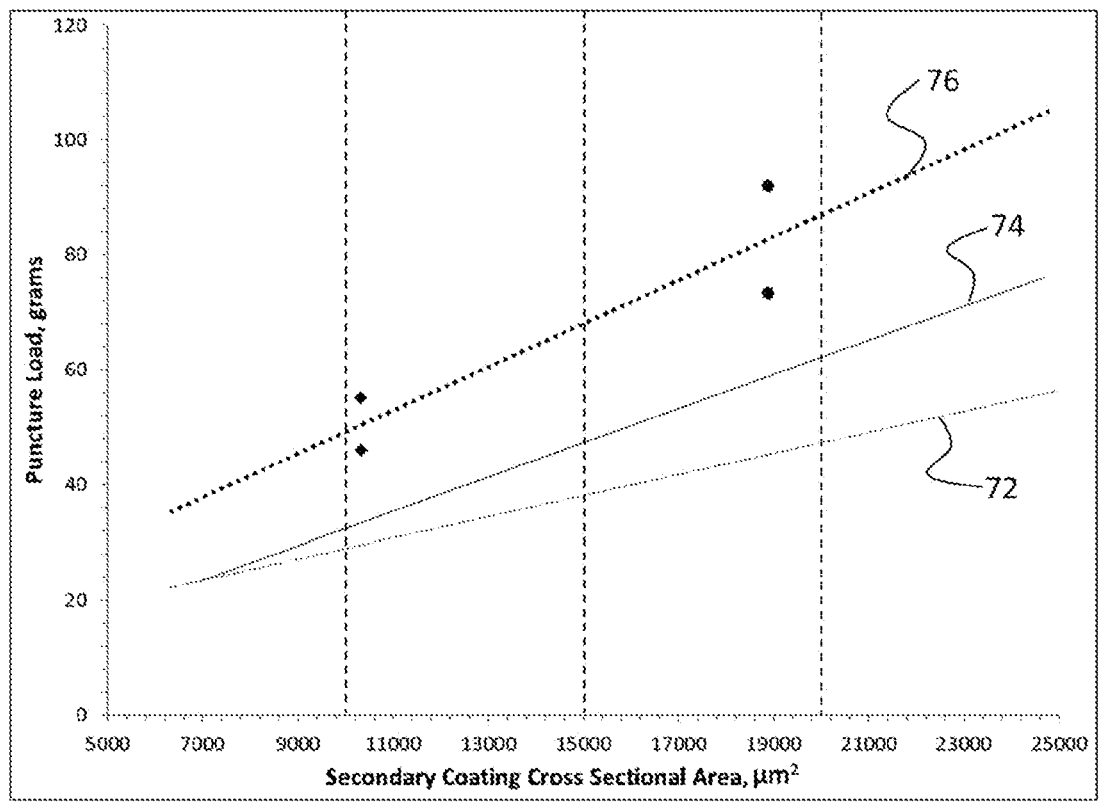
FIG. 7 shows the dependence of puncture load on cross-sectional area for three secondary coatings.

Secondary Coatings—Properties—Puncture Resistance. The puncture resistance of secondary coatings made from comparative curable secondary coating composition A, a commercial curable secondary coating composition (CPC6e) from a commercial vendor (DSM Desotech) having a proprietary composition, and curable secondary coating composition SD was determined according to the method described above. Several fiber samples with each of the three secondary coatings were prepared. Each fiber sample included a glass fiber with a diameter of 125 μm, a primary coating formed from the reference primary coating composition listed in Table 8, and one of the three secondary coatings. Samples with various secondary coatings were prepared. The thicknesses of the primary coating and secondary coating were adjusted to vary the cross-sectional area of the secondary coating as shown in FIG. 7. The ratio of the thickness of the secondary coating to the thickness of the primary coating was maintained at about 0.8 for all samples.

Fiber samples with a range of thicknesses were prepared for each of the secondary coatings to determine the dependence of puncture load on the thickness of the secondary coating. One strategy for achieving higher fiber count in cables is to reduce the thickness of the secondary coating. As the thickness of the secondary coating is decreased, however, its performance diminishes and its protective function is compromised. Puncture resistance is a measure of the protective function of a secondary coating. A secondary coating with a high puncture resistance withstands greater impact without failing and provides better protection for the glass fiber.

The puncture load as a function of cross-sectional area for the three coatings is shown in FIG. 7. Cross-sectional area is selected as a parameter for reporting puncture load because an approximately linear correlation of puncture load with cross-sectional area of the secondary coating was observed. Traces 72, 74, and 76 shows the approximate linear dependence of puncture load on cross-sectional area for the comparative secondary coatings obtained by curing the comparative CPC6e secondary coating composition, the comparative curable secondary coating composition A, and curable secondary coating composition SD; respectively. The vertical dashed lines are provided as guides to the eye at cross-sectional areas of 10000 $\mu m^2$, 15000 $\mu m^2$, and 20000 $\mu m^2$ as indicated.

The CPC6e secondary coating depicted in Trace 72 corresponds to a conventional secondary coating known in the art. The comparative secondary coating A depicted in Trace 74 shows an improvement in puncture load for high cross-sectional areas. The improvement, however, diminishes as the cross-sectional area decreases. This indicates that a secondary coating obtained as a cured product from comparative curable secondary coating composition A is unlikely to be suitable for low diameter, high fiber count applications. Trace 76, in contrast, shows a significant increase in puncture load for the secondary coating obtained as a cured product from curable secondary coating composition SD. At a cross-sectional area of 7000 $\mu m^2$, for example, the puncture load of the secondary coating obtained from curable secondary coating composition SD is 50% or more greater than the puncture load of either of the other two secondary coatings.

The puncture load of secondary coatings formed as cured products of the curable secondary coating compositions disclosed herein at a cross-sectional area of 10000 $\mu m^2$ is greater than 36 g, or greater than 40 g, or greater than 44 g, or greater than 48 g, or in the range from 36 g to 52 g, or in the range from 40 g to 48 g. The puncture load of secondary coatings formed as cured products of the curable secondary coating compositions disclosed herein at a cross-sectional area of 15000 $\mu m^2$ is greater than 56 g, or greater than 60 g, or greater than 64 g, or greater than 68 g, or in the range from 56 g to 72 g, or in the range from 60 g to 68 g. The puncture load of secondary coatings formed as cured products of the curable secondary coating compositions disclosed herein at a cross-sectional area of 20000 $\mu m^2$ is greater than 68 g, or greater than 72 g, or greater than 76 g, or greater than 80 g, or in the range from 68 g to 92 g, or in the range from 72 g to 88 g. Embodiments include secondary coatings having any combination of the foregoing puncture loads.

As used herein, normalized puncture load refers to the ratio of puncture load to cross-sectional area. The puncture load of secondary coatings formed as cured products of the curable secondary coating compositions disclosed herein have a normalized puncture load greater than $3.0\times10^{-3}$ g/$\mu m^2$, or greater than $3.5\times10^{-3}$ g/$\mu m^2$, or greater than $4.0\times10^{-3}$ g/$\mu m^2$, or greater than $4.5\times10^{-3}$ g/$\mu m^2$, or greater than $5.0\times10^{-3}$ g/$\mu m^2$, or in the range from $3.2\times10^{-3}$ g/$\mu m^2$ to $5.6\times10^{-3}$ g/$\mu m^2$, or in the range from $3.5\times10^{-3}$ g/$\mu m^2$ to $5.2\times10^{-3}$ g/$\mu m^2$, or in the range from $4.0\times10^{-3}$ g/$\mu m^2$ to $4.8\times10^{-3}$ g/$\mu m^2$.

Examples—Relative Refractive Index Profile

Figure 8A:
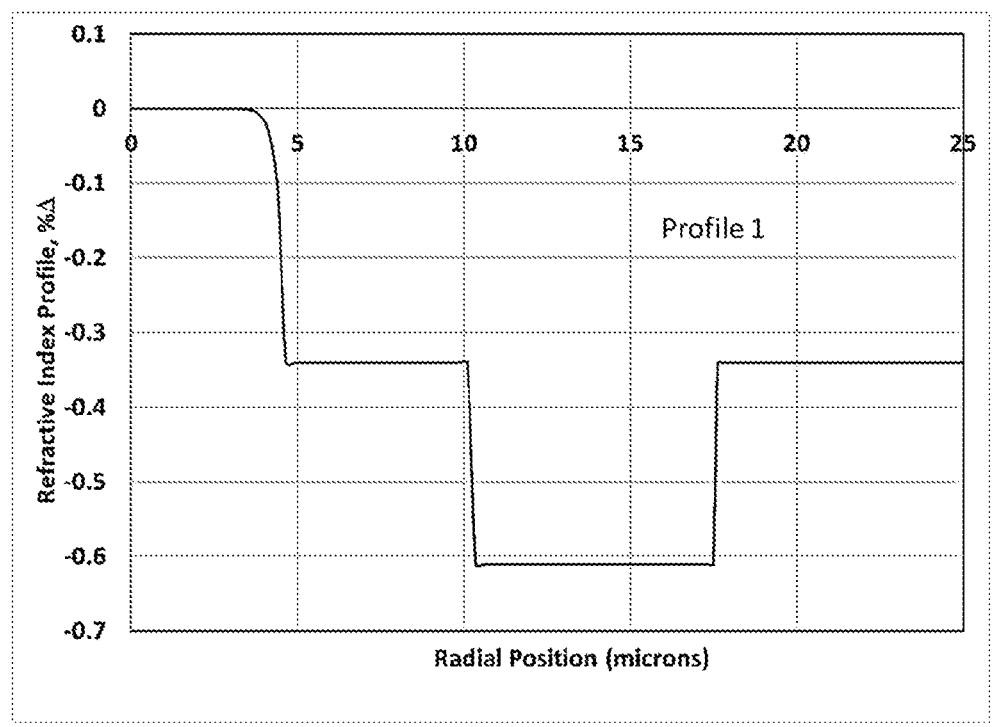
FIGS. 8A and 8B depict exemplary relative refractive index profiles of glass fibers.
Figure 8B:
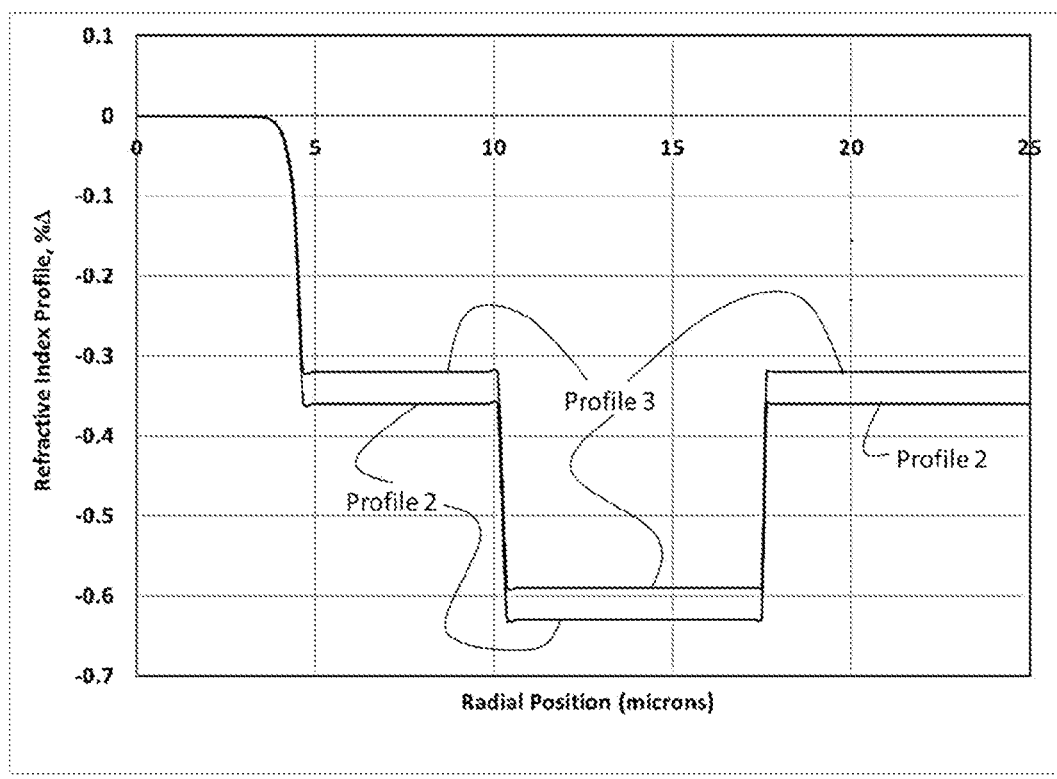

The following examples illustrate representative relative refractive index profiles and optical properties of optical fibers having low macrobend loss. The relative refractive index profiles are shown in FIGS. 8A and 8B. Profile 1, Profile 2, and Profile 3 are shown. Each profile includes, in order of increasing radial position beginning at the centerline (r=0), a core region, an inner cladding region, an intermediate cladding region, and an outer cladding region. The outer cladding region extends to a radius $r_4$=40.0 μm (not shown). The core region of each of the three profiles is silica glass doped with alkali. The inner cladding region, intermediate cladding region, and outer cladding region of each of the three profiles is silica glass doped with fluorine.

The fluorine doping concentration is highest in the intermediate cladding region and lower in the inner cladding region and outer cladding region.

Macrobending. The macrobend loss at 1550 nm of optical fibers with each of the three profiles was calculated for mandrels of a various diameters. Macrobend loss is denoted by "BLDM," where "DM" is the diameter in mm of the mandrel used to assess macrobending performance. The diameter DM is also referred to herein as "macrobend diameter". The macrobending performance as discussed herein is gauged by characterizing the induced attenuation increase in a mandrel wrap test unless otherwise noted. The mandrel wrap test is specified in TIA-455-62: FOTP-62 IEC-60793-1-47 Optical Fibres—Part 1-47: Measurement Methods and Test Procedures—Macrobending Loss, by Telecommunications Industry Association (TIA). In the mandrel wrap test, the optical fiber is wrapped one or more times around a smooth cylindrical mandrel of diameter DM, and the increase in attenuation at a specified wavelength due to the bending is determined. Attenuation in the mandrel wrap test is expressed in units of dB/turn, where one turn refers to one revolution of the optical fiber about the mandrel. Bend loss values for mandrel diameters of 15 mm, 20 mm and 30 mm, i.e., for $BL_{15}$, $BL_{20}$ and $BL_{30}$, are provided below.

Bend loss and selected optical properties of each of the three profiles are summarized in Table 10. In Table 10, "MFD" refers to mode field diameter, $\lambda_0$ refers to the zero dispersion wavelength, $\lambda_{CC}$ refers to the cable cutoff wavelength, and $V_{Trench}$ refers to trench volume.

TABLE 10

Properties of Optical Fibers

|  | Profile 1 | Profile 2 | Profile 3 |
| --- | --- | --- | --- |
| MFD at 1310 nm (μm) | 9.22 | 9.07 | 9.39 |
| MFD at 1550 nm (μm) | 10.27 | 10.08 | 10.48 |
| MFD at 1625 nm (μm) | 10.61 | 10.41 | 10.83 |
| $\lambda_0$ (nm) | 1319 | 1319 | 1320 |
| $\lambda_{CC}$ (nm) | 1315 | 1419 | 1339 |
| $V_{Trench}$ (% Δμm²) | 54.5 | 55 | 55 |
| $BL_{15}$ (dB/turn) | 0.04 | 0.0137 | 0.042 |
| $BL_{20}$ (dB/turn) | 0.009 | 0.0003 | 0.009 |
| $BL_{30}$ (dB/turn) | 0.001 | 0.0002 | 0.001 |

The macrobend loss of the optical fiber at a wavelength of 1550 nm, when wrapped around a mandrel having a diameter of 30 mm, is less than 0.010 dB/turn, or less than 0.005 dB/turn, or less than 0.002 dB/turn, or less than 0.001 dB/turn, or less than 0.00005 dB/turn. The macrobend loss of the optical fiber at a wavelength of 1550 nm, when wrapped around a mandrel having a diameter of 20 mm, is less than 0.100 dB/turn, or less than 0.050 dB/turn, or less than 0.010 dB/turn, or less than 0.005 dB/turn, or less than 0.001 dB/turn, or less than 0.0005 dB/turn. The macrobend loss of the optical fiber at a wavelength of 1550 nm, when wrapped around a mandrel having a diameter of 15 mm, is less than 0.500 dB/turn, or less than 0.100 dB/turn, or less than 0.050 dB/turn, or less than 0.040 dB/turn, or less than 0.030 dB/turn, or less than 0.020 dB/turn, or less than 0.015 dB/turn.

The wire-mesh-covered drum microbending loss at 1550 nm is less than 1.0 dB/km, or less than 0.75 dB/km, or less than 0.50 dB/km, or less than 0.25 dB/km, or less than 0.10 dB/km, or less than 0.05 dB/km, or less than 0.03 dB/km, or in the range from 0.01 dB/km to 1.0 dB/km, or in the range from 0.02 dB/km to 0.50 dB/km, or in the range from 0.03 dB/km to 0.25 dB/km, or in the range from 0.04 dB/km to 0.15 dB/km.

Examples—Reduced Radius Optical Fibers

The following examples illustrate optical fibers with reduced radius that exhibit high mechanical reliability and low microbend loss. Conventional optical fibers include a glass fiber with radius $r_4$=62.5 μm, a primary coating with a thickness $r_5$–$r_4$=32.5 μm, and a secondary coating with a thickness $r_6$–$r_5$=26 μm. The radius $r_6$ of a conventional optical fiber is 121 μm (diameter $2r_6$=242 μm). The exemplary optical fibers disclosed in the examples that follow have a radius $r_6$ less than or equal to 100 μm. The reduced radius of the exemplary optical fibers is achieved by reducing one or more of the radius $r_4$ of the glass fiber, the thickness $r_5$–$r_4$ of the primary coating, or the thickness $r_6$–$r_5$ of the secondary coating relative to a conventional optical fiber.

Table 11 summarizes selected properties of a series of comparative optical fibers (labeled CE1, CE2, CE3, CE4, and CE5) and Table 12 summarizes selected properties of a series of exemplary optical fibers in accordance with the present disclosure (labeled Ex. 1, Ex. 2, Ex. 3, Ex. 4, Ex. 5, and Ex. 6). Tables 11 and 12 list the glass fiber radius $r_4$, the in situ modulus of the primary coating ($E_p$), the radius $r_5$ of the primary coating, the thickness $r_5$–$r_4$ of the primary coating, the spring constant $\chi_p$ of a primary coating, the Young's modulus of the secondary coating ($E_s$), the radius $r_6$ of the secondary coating, the thickness $r_6$–$r_5$ of the secondary coating, the cross-sectional area of the secondary coating ($A_s$), and the ratio of the thickness $r_5$–$r_4$ of the primary coating to the thickness $r_6$–$r_5$ of the secondary coating ($R_{ps}$).

TABLE 11

Comparative Optical Fiber Samples

|  | CE1 | CE2 | CE3 | CE4 | CE5 |
| --- | --- | --- | --- | --- | --- |
| $r_4$ (μm) | 62.5 | 62.5 | 62.5 | 62.5 | 40.25 |
| $E_p$ (MPa) | 0.20 | 0.25 | 0.40 | 0.20 | 0.40 |
| $r_5$ (μm) | 95 | 95 | 95 | 80 | 80 |
| $r_5$–$r_4$ (μm) | 32.5 | 32.5 | 32.5 | 17.5 | 39.75 |
| $\chi_p$ (MPa) | 0.77 | 0.96 | 1.54 | 1.43 | 0.81 |
| $E_s$ (MPa) | 1948 | 1882 | 1200 | 1948 | 1200 |
| $r_6$ (μm) | 121 | 121 | 121 | 100 | 100 |
| $r_6$–$r_5$ (μm) | 26 | 26 | 26 | 20 | 20 |
| $A_x$ (μm²) | 17643 | 17643 | 17643 | 11310 | 11310 |
| $R_{ps}$ | 1.25 | 1.25 | 1.25 | 0.88 | 1.99 |

Comparative optical fibers CE1, CE2, and CE3 have a glass fiber radius $r_4$, a thickness $r_5$–$r_4$ of the primary coating, and a thickness $r_6$–$r_5$ of the secondary coating consistent with conventional optical fibers. The radius $r_6$ of comparative optical fibers CE1, CE2, and CE3 defines the current standard for fiber density in cables. To increase fiber density in cables, optical fibers with lower values of $r_6$ are desired. Such reduced radius fibers must, however, provide high mechanical reliability while maintaining low macrobend and microbend loss.

Comparative optical fiber CE4 is a reduced radius variation of comparative optical fiber CE1. The mechanical properties ($E_p$, $E_s$, and $\chi_p$) of the coatings of comparative optical fiber CE4 are the same as for comparative optical fiber CE1. Comparative optical fiber CE4 is a reduced radius optical fiber obtained by reducing the thickness $r_5$–$r_4$ of the primary coating to and the thickness $r_6$–$r_5$ of the secondary coating relative to comparative optical fiber CE1. Although the overall radius of the optical fiber is reduced, the spring constant $\chi_p$ of the primary coating of comparative optical fiber CE4 is too high (too stiff) to adequately protect the glass fiber from external force applied to the exterior of the optical fiber. The high spring constant $\chi_p$ of the primary coating leads to strong coupling the secondary coating to the glass fiber and weak dampening of force by the primary coating. Microbending losses are accordingly high.

Comparative optical fiber CE5 is a reduced radius variation of comparative optical fiber CE3. The mechanical properties ($E_p$, $E_s$, and $\chi_p$) of the coatings of comparative optical fiber CE5 are the same as for comparative optical fiber CE3. Comparative optical fiber CE5 is a reduced radius optical fiber obtained by reducing the radius $r_4$ of the glass fiber and the thickness $r_6-r_5$ of the secondary coating relative to comparative optical fiber CE3. The thickness $r_5-r_4$ of the primary coating is increased in comparative optical fiber CE5 relative to comparative optical fiber CE3 to reduce the spring constant $\chi_p$ of the primary coating. Although the overall radius of the optical fiber is reduced and the spring constant $\chi_p$ of the primary coating is reduced, the Young's modulus of comparative fiber CE5 is too low to provide high puncture resistance and too low to adequately attenuate transmission of external forces to the primary coating. As a result, mechanical reliability is poor and microbending losses are high.

TABLE 12

Exemplary Optical Fiber Samples

| | Ex. 1 | Ex. 2 | Ex. 3 | Ex. 4 | Ex. 5 | Ex. 6 |
|---|---|---|---|---|---|---|
| $r_4$ (μm) | 40.25 | 40.25 | 40.25 | 40.25 | 40.25 | 40.25 |
| $E_p$ (MPa) | 0.20 | 0.25 | 0.20 | 0.20 | 0.20 | 0.25 |
| $r_5$ (μm) | 80 | 80 | 75 | 71 | 70 | 70 |
| $r_5 - r_4$ (μm) | 39.75 | 39.75 | 34.75 | 30.75 | 29.75 | 29.75 |
| $\chi_p$ (MPa) | 0.41 | 0.51 | 0.46 | 0.52 | 0.54 | 0.68 |
| $E_s$ (MPa) | 1948 | 1882 | 1948 | 1948 | 1948 | 1882 |
| $r_6$ (μm) | 100 | 100 | 100 | 100 | 90 | 90 |
| $r_6 - r_5$ (μm) | 20 | 20 | 25 | 29 | 20 | 20 |
| $A_x$ (μm$^2$) | 11310 | 11310 | 13744 | 15579 | 10053 | 10053 |
| $R_{ps}$ | 1.99 | 1.99 | 1.39 | 1.06 | 1.49 | 1.49 |

The exemplary optical fibers are configured to possess a reduced radius $r_6$ relative to conventional optical fibers, while still achieving both low microbend loss and high mechanical reliability. In particular, the spring constant $\chi_p$ of the primary coating is reduced relative to the comparative optical fibers and low microbending loss are achieved as a result. The increased Young's modulus $E_s$ of the secondary coating resists transmission of force through the secondary coating and reduces the force that enters the primary coating. A synergistic relationship between the Young's modulus of the secondary coating and the spring constant $\chi_p$ of the primary coating leads to both low microbending loss and high puncture resistance in a reduced radius optical fiber.

In preferred embodiments, the spring constant $\chi_p$ of the primary coating is less than 1.0 MPa, or less than 0.80 MPa, or less than 0.70 MPa, or less than 0.60 MPa, or less than 0.50 MPa, or less than 0.40 MPa, or in the range from 0.30 MPa to 0.90 MPa, or in the range from 0.30 MPa to 0.80 MPa, or in the range from 0.30 MPa to 0.70 MPa, or in the range from 0.30 MPa to 0.60 MPa, or in the range from 0.40 MPa to 0.90 MPa, or in the range from 0.40 MPa to 0.80 MPa, or in the range from 0.40 MPa to 0.70 MPa, or in the range from 0.40 MPa to 0.60 MPa.

In other preferred embodiments, the spring constant $\chi_p$ of the primary coating is less than 1.0 MPa and the Young's modulus $E_s$ of the secondary coating is greater than 1600 MPa, the spring constant $\chi_p$ of the primary coating is less than 0.80 MPa and the Young's modulus $E_s$ of the secondary coating is greater than 1700 MPa, the spring constant $\chi_p$ of the primary coating is less than 0.70 MPa and the Young's modulus $E_s$ of the secondary coating is greater than 1800 MPa, the spring constant $\chi_p$ of the primary coating is less than 0.60 MPa and the Young's modulus $E_s$ of the secondary coating is greater than 1900 MPa, the spring constant $\chi_p$ of the primary coating is less than 0.50 MPa and the Young's modulus $E_s$ of the secondary coating is greater than 2000 MPa, the spring constant $\chi_p$ of the primary coating is in the range from 0.30 MPa to 1.0 MPa and the Young's modulus $E_s$ of the secondary coating is in the range from 1600 MPa to 2800 MPa, the spring constant $\chi_p$ of the primary coating is in the range from 0.30 MPa to 0.80 MPa and the Young's modulus $E_s$ of the secondary coating is in the range from 1700 MPa to 2800 MPa, the spring constant $\chi_p$ of the primary coating is in the range from 0.30 MPa to 0.70 MPa and the Young's modulus $E_s$ of the secondary coating is in the range from 1800 MPa to 2800 MPa, the spring constant $\chi_p$ of the primary coating is in the range from 0.30 MPa to 0.60 MPa and the Young's modulus $E_s$ of the secondary coating is in the range from 1900 MPa to 2800 MPa, the spring constant $\chi_p$ of the primary coating is in the range from 0.40 MPa to 1.0 MPa and the Young's modulus $E_s$ of the secondary coating is in the range from 1600 MPa to 2800 MPa, the spring constant $\chi_p$ of the primary coating is in the range from 0.40 MPa to 0.80 MPa and the Young's modulus $E_s$ of the secondary coating is in the range from 1700 MPa to 2800 MPa, the spring constant $\chi_p$ of the primary coating is in the range from 0.40 MPa to 0.70 MPa and the Young's modulus $E_s$ of the secondary coating is in the range from 1800 MPa to 2800 MPa, the spring constant $\chi_p$ of the primary coating is in the range from 0.40 MPa to 0.60 MPa and the Young's modulus $E_s$ of the secondary coating is in the range from 1900 MPa to 2800 MPa.

The ratio $R_{ps}$ of the thickness $r_5-r_4$ of the primary coating to the thickness $r_6-r_5$ of the secondary coating is in the range from 0.80 to 2.20, or in the range from 0.85 to 1.85, or in the range from 0.90 to 1.50, or in the range from 0.95 to 1.30.

Examples—Reduced Radius Optical Fibers

Figure 9:
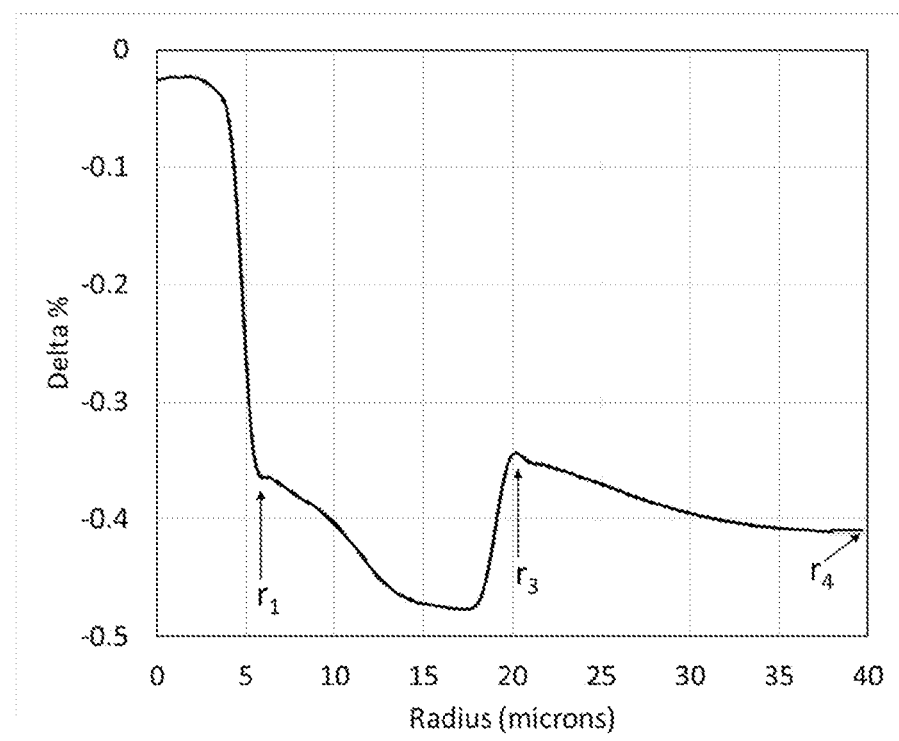
FIG. 9 shows an exemplary relative refractive index profile of a glass fiber.

Further illustrative examples of reduced radius optical fibers are summarized in FIG. 9 and in Tables 13 and 14. Each of the reduced radius optical fibers has a relative refractive index profile with an intermediate cladding region surrounding and directly adjacent to the core region and an outer cladding region surrounding and directly adjacent to the intermediate cladding region. Table 13 summarizes selected properties of a series of comparative optical fibers (labeled C1, C2, and C3) and two exemplary optical fibers in accordance with the present disclosure (labeled Ex. 7 and Ex. 8). Table 13 lists the radius $r_1$ and the average relative refractive index $\Delta_1$ of the core region, the radius $r_3$, relative refractive index $\Delta_3$, and trench volume $V_{Trench}$ (=$V_3$) of the intermediate cladding region, the radius $r_4$ and relative refractive index $\Delta_4$ of the outer cladding region, the radius $r_5$ of the primary coating, the thickness $r_5-r_4$ of the primary coating, the radius $r_6$ of the secondary coating, the thickness $r_6-r_5$ of the secondary coating, the cross-sectional area of the secondary coating (As), and the ratio of the thickness $r_5-r_4$ of the primary coating to the thickness $r_6-r_5$ of the secondary coating ($R_{ps}$). The same primary coating with the same composition and the same modulus, and the same secondary coating with the same composition and same modulus, were used for the optical fibers listed in Tables 13 and 14.

TABLE 13

Exemplary Optical Fiber Samples - Profiles

|  | C1 | C2 | C3 | Ex. 7 | Ex. 8 |
|---|---|---|---|---|---|
| $r_1$ (μm) | 6.11 | 5.92 | 6.11 | 5.92 | 5.74 |
| $\Delta_1$ (%) | −0.028 | −0.026 | −0.025 | −0.026 | −0.026 |
| $r_3$ (μm) | 19.64 | 18.77 | 19.01 | 19.15 | 19.24 |
| $\Delta_3$ (%) | −0.420 | −0.411 | −0.423 | −0.425 | −0.431 |
| $V_{Trench}$ (% $\Delta\mu m^2$) | −1.77 | 26.22 | 20.44 | 21.63 | 17.89 |
| $r_4$ (μm) | 40.25 | 40.25 | 40.25 | 40.25 | 40.25 |
| $\Delta_4$ (%) | −0.434 | −0.333 | −0.367 | −0.367 | −0.388 |
| $r_5$ (μm) | 62.5 | 62.5 | 62.5 | 80.0 | 80.0 |
| $r_5$-$r_4$ (μm) | 22.25 | 22.25 | 22.25 | 39.75 | 39.75 |
| $r_6$ (μm) | 80.0 | 80.0 | 80.0 | 100.0 | 100.0 |
| $r_6$-$r_5$ (μm) | 17.5 | 17.5 | 17.5 | 20.0 | 20.0 |
| $A_x$ (μm$^2$) | 31337 | 31337 | 31337 | 45239 | 45239 |
| $R_{ps}$ | 1.27 | 1.27 | 1.27 | 1.99 | 1.99 |

Table 14 shows selected performance attributes of comparative optical fibers C1, C2, and C3, and exemplary optical fibers Ex. 7 and Ex. 8. Attributes listed in Table 14 are the cable cutoff wavelength $\lambda_{CC}$, mode field diameter (MFD) at 1550 nm, effective area $A_{eff}$ at 1550 nm, and attenuation at 1550 nm and 1625 nm.

TABLE 14

Exemplary Optical Fiber Samples

|  | C1 | C2 | C3 | Ex. 7 | Ex. 8 |
|---|---|---|---|---|---|
| $\lambda_{CC}$ (nm) | 1525 | ≤1134 | ≤1233 | 1235 | 1430 |
| MFD at 1550 nm (μm) |  | 10.69 | 10.64 | 10.73 | 10.72 |
| $A_{eff}$ at 1550 nm (μm$^2$) |  | 89.8 | 88.9 | 90.4 | 90.3 |
| Attenuation at 1550 nm (dB/km) |  | 0.556 | 0.269 | 0.198 | 0.188 |
| Attenuation at 1625 nm (dB/km) |  | 1.444 | 0.442 | 0.256 | 0.206 |

The results shown in Table 14 show a clear improvement (reduction) in attenuation at both 1550 nm and 1625 nm for the two exemplary fibers. The reduction in attenuation reflects a reduction in microbending loss. The reduced attenuation is attributable primarily to proper selection of the thickness of the primary coating and trench volume. The thickness of the primary coatings of comparative examples C1, C2, and C3 is too low to provide adequate resistance to microbending forces. Comparative example C1 lacks a trench. Instead, the average relative refractive index $\Delta_3$ of the intermediate cladding region is greater than the average relative refractive index $\Delta_4$ of the outer cladding region. This leads to a reporting of a negative value of $V_{Trench}$ listed for comparative example C1, which in effect has an inverted trench and a relative refractive index profile expected to exhibit high microbending losses. Comparative examples C2 and C3 have the same thickness of primary coating and differ primarily with respect to trench volume. The trench volume of comparative sample C2 is higher than the trench volume of comparative example C3 and higher attenuation is observed. Exemplary sample Ex. 7 and comparative example C3 have similar trench volumes, but the thicker primary coating of exemplary sample Ex. 7 leads to lower microbending loss and lower attenuation. Exemplary sample Ex. 8 has the same thickness of primary coating as exemplary sample Ex. 7 and exhibits lower microbending loss and lower attenuation. While not wishing to be bound by theory, it is believed that the improvement in performance of exemplary sample Ex. 8 is due to a smaller trench volume. It is noted that for a given thickness of secondary coating, the cross-sectional area of the secondary coating also increases as the thickness of the primary coating increases. A higher cross-sectional area for the secondary coating improves puncture resistance of the secondary coating and hence improves mechanical reliability of the optical fiber.

These examples indicate that microbending losses and attenuation in reduced radius optical fibers depend on the thickness of the primary coating and the trench volume of the intermediate cladding region. In various embodiments, the thickness of the primary coating is in the range from 25.0 μm to 40.0 μm and the trench volume $V_{Trench}$ of the intermediate cladding region is in the range from 10% $\Delta\mu m^2$ to 30% $\Delta\mu m^2$.

Examples—Attenuation

Figure 10:
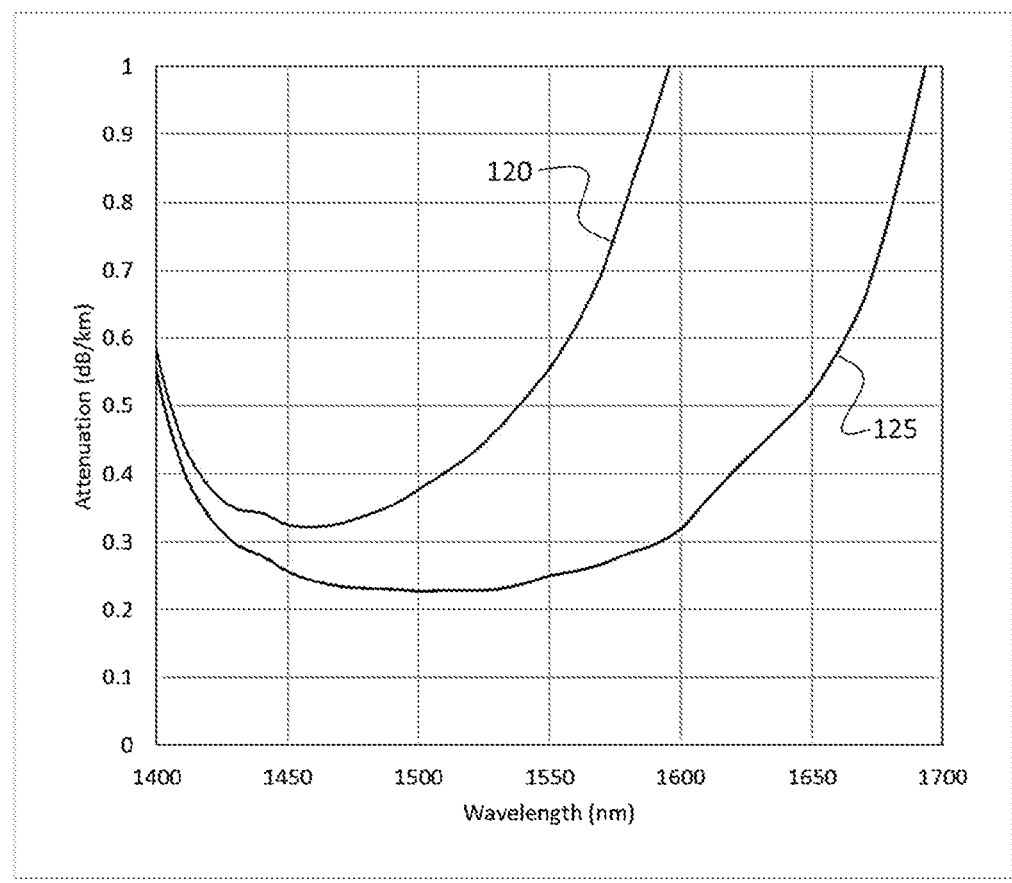
FIG. 10 shows a plot of attenuation as a function of wavelength for two optical fibers.

Modeled Results. FIG. 10 shows results of a model used to determine attenuation as a function of wavelength in two optical fibers. Attenuation is expressed in units of dB/km and represents intensity loss in the transmission of an optical signal through an optical fiber. Microbending loss is a significant contribution to attenuation. The attenuation results shown as Traces 120 and 125 are based on a common glass fiber having a radius $r_4$=40.25 μm, and on primary and secondary coatings having the same composition and same in situ modulus $E_p$=0.2 MPa and Young's modulus $E_s$=1948 MPa. Traces 120 and 125 differ in the thickness of the primary and secondary coatings. In Trace 120, the primary coating has a radius $r_5$=62.5 μm and a thickness $r_5$-$r_{4=22.25}$ μm, and the secondary coating has a radius $r_{6=80.0}$ μm and a thickness $r_6$-$r_5$=17.5 μm. In Trace 125, the primary coating has a radius $r_5$=80.0 μm and a thickness $r_5$-$r_{4=39.75}$ μm, and the secondary coating has a radius $r_{6=100.0}$ μm and a thickness $r_6$-$r_5$=20.0 μm. The results show that the contribution of microbending to the attenuation loss are significantly reduced when the thickness of the primary coating is increased. Results of the model indicate that a thickness $r_5$-$r_4$ of at least 20.0 μm is needed to provide tolerable microbending losses at wavelengths near 1550 nm.

Examples—Load on Glass Fiber

Modeled Results. The experimental examples and principles disclosed herein indicate that by varying the mole numbers n, m, and p, it is possible to control the relative amount of di-adduct compound in the oligomer as well as the properties of cured films formed from the primary coating compositions over a wide range, including the ranges specified herein for Young's modulus and in situ modulus of the primary coating. Similarly, variations in the type and concentration of different monomers in the secondary composition leads to variations in the Young's modulus over the range disclosed herein. Curing dose is another parameter that can be used to vary modulus of primary and secondary coatings formed from the curable compositions disclosed herein.

To examine the effect of the thickness and modulus of the primary and secondary coatings on transmission of a radial force to a glass fiber, a series of modeled examples was considered. In the model, a radial external load P was applied to the surface of the secondary coating of an optical fiber and the resulting load at the surface of the glass fiber was calculated. The glass fiber was modeled with a Young's modulus of 73.1 GPa (consistent with silica glass) and a diameter of 125 µm. The Poisson ratios $v_p$ and $v_s$ of the primary and secondary coatings were fixed at 0.48 and 0.33, respectively. A comparative sample C4 and eleven samples M1-M11 in accordance with the present disclosure were considered. The comparative sample included primary and secondary coatings with thicknesses and moduli consistent with optical fibers known in the art. Samples M1-M11 are examples with reduced thicknesses of the primary and/or secondary coatings. Parameters describing the configurations of the primary and secondary coatings are summarized in Table 15, where $E_p$ is the in situ modulus of the primary coating, $r_5$ is radius of the primary coating, $r_5-r_4$ is the thickness of the primary coating, $E_s$ is the Young's modulus of the secondary coating, $r_6$ is the radius of the secondary coating, and $r_6-r_5$ is the thickness of the secondary coating.

TABLE 15

Coating Properties of Modeled Optical Fibers

| | Primary Coating | | | Secondary Coating | | |
|---|---|---|---|---|---|---|
| Sample | $E_p$ (MPa) | $r_5$ (µm) | $r_5 - r_4$ (µm) | $E_s$ (MPa) | $r_6$ (µm) | $r_6 - r_5$ (µm) |
| C4 | 0.16 | 95 | 32.5 | 2000 | 121 | 26 |
| M1 | 0.18 | 81 | 23.5 | 1900 | 100 | 19 |
| M2 | 0.16 | 78.5 | 21 | 2000 | 95 | 16.5 |
| M3 | 0.14 | 75.5 | 18 | 2000 | 90 | 14.5 |
| M4 | 0.11 | 73 | 15.5 | 2000 | 85 | 12 |
| M5 | 0.20 | 80 | 25 | 1900 | 100 | 20 |
| M6 | 0.19 | 77 | 22 | 2000 | 95 | 18 |
| M7 | 0.16 | 74.5 | 19.5 | 2000 | 90 | 15.5 |
| M8 | 0.13 | 71.5 | 16.5 | 2000 | 85 | 13.5 |
| M9 | 0.22 | 79 | 26.5 | 1900 | 100 | 21 |
| M10 | 0.20 | 76 | 23.5 | 2000 | 95 | 19 |
| M11 | 0.18 | 73.5 | 21 | 2000 | 90 | 16.5 |

Table 16 summarizes the load P1 at the outer surface of the glass fiber as a fraction of load P applied to the surface of the secondary coating. The ratio P1/P is referred to herein as the load transfer parameter and corresponds to the fraction of external load P transmitted through the primary and secondary coatings to the surface of the glass fiber. The load P is a radial load and the load transfer parameter P1/P was calculated from a model based on Eqs. (11)-(13):

$$\frac{P_1}{P} = \frac{4(1-v_p)(1-v_s)}{\{A+B\}} \quad (11)$$

where $$A = \left(\frac{E_s(1+v_p)(1-2v_p)(1-(r_4/r_5)^2)(1-(r_5/r_6)^2)}{E_p(1+v_s)}\right) \quad (12)$$

and $$B = ((1 - 2v_p(r_4/r_5)^2 + (r_4/r_5)^2)(1 - 2v_s(r_5/r_6)^2 + (r_5/r_6)^2)) \quad (13)$$

In Eqs. (11)-(13), $v_p$ and $v_s$ are the Poisson's ratios of the primary and secondary coatings, $r_4$ is the radius of the glass fiber, $r_5$ is the radius of the primary coating, $r_6$ is the radius of the secondary coating, $E_p$ is the in situ modulus of the primary coating, and $E_s$ is the Young's modulus of the secondary coating. The scaled load transfer parameter P1/P (scaled) in Table 16 corresponds to the ratio P1/P for each sample relative to comparative sample C4.

TABLE 16

Load Transfer Parameter (P1/P) at Surface of Glass Fiber

| Sample | P1/P | P1/P (scaled) |
|---|---|---|
| C4 | 0.00445 | 1.00 |
| M1 | 0.00430 | 0.97 |
| M2 | 0.00421 | 0.95 |
| M3 | 0.00436 | 0.98 |
| M4 | 0.00428 | 0.96 |
| M5 | 0.00429 | 0.97 |
| M6 | 0.00437 | 0.99 |
| M7 | 0.00432 | 0.97 |
| M8 | 0.00422 | 0.95 |
| M9 | 0.00427 | 0.96 |
| M10 | 0.00411 | 0.93 |
| M11 | 0.00427 | 0.96 |

The modeled examples show that despite smaller coating thicknesses, optical fibers having primary and secondary coatings as described herein exhibit a reduction in the force experienced by a glass fiber relative to a comparative optical fiber having conventional primary and secondary coatings with conventional thicknesses. The resulting reduction in overall size of the optical fibers described herein enables higher fiber count in cables of a given size (or smaller cable diameters for a given fiber count) without increasing the risk of damage to the glass fiber caused by external forces.

The scaled load transfer parameter P1/P (scaled) of the secondary coating is less than 0.99, or less than 0.97, or less than 0.95. The load transfer parameter P1/P of the secondary coating is less than 0.00440, or less than 0.00436, or less than 0.00432, or less than 0.00428, or less than 0.00424, or less than 0.00420, or less than 0.00416, or less than 0.00412, or in the range from 0.00400 to 0.00440, or in the range from 0.00408 to 0.00436, or in the range from 0.00412 to 0.00432, or in the range from 0.00416 to 0.00428, or in the range from 0.00420 to 0.00424.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber comprising:
 a core region, the core region comprising silica glass doped with an alkali metal oxide, the core region having a radius $r_1$ in the range from 3.0 µm to 10.0 µm and a relative refractive index profile $\Delta_1$ having a maximum relative refractive index $\Delta_{1max}$ in the range from −0.15% to 0.30%;
 a cladding region surrounding and directly adjacent to the core region, the cladding region having a radius $r_4$ in the range from 37.5 µm to 52.5 µm;
 a primary coating surrounding and directly adjacent to the cladding region, the primary coating having a radius $r_5$, a spring constant $\chi_p$, an in situ modulus in the range from 0.05 MPa to 0.30 MPa and a thickness $r_5$–$r_4$ in the range from 20.0 μm to 40.0 μm; and a secondary coating surrounding and directly adjacent to the primary coating, the secondary coating having a radius $r_6$ less than or equal to 100.0 μm, a Young's modulus greater than 1600 MPa and a thickness $r_6$–$r_5$ in the range from 15.0 μm to 30.0 μm.

2. The optical fiber of claim 1, wherein $\Delta_{1max}$ is in the range from −0.05% to 0.15%.

3. The optical fiber of claim 1, wherein the core comprises an inner core region and an outer core region, the inner core region having a radius $r_a$ in the range from 0.25 μm to 3.0 μm and the outer core region having the radius $r_1$.

4. The optical fiber of claim 1, wherein the cladding comprises an intermediate cladding region and an outer cladding region surrounding and directly adjacent to the intermediate cladding region; the intermediate cladding region having a radius $r_3$ in the range from 10.0 μm to 30.0 μm, a relative refractive index $\Delta_3$ in the range from −0.30% to −0.90%; the outer cladding having the radius $r_4$ and a relative refractive index $\Delta_4$ in the range from −0.60% to 0.0%.

5. The optical fiber of claim 4, wherein the intermediate cladding region has a thickness in the range from 5.0 μm to 20.0 μm.

6. The optical fiber of claim 4, wherein the intermediate cladding region is directly adjacent to the core region.

7. The optical fiber of claim 6, wherein the intermediate cladding region has a trench volume $V_{Trench}$ in the range from 10.0% $\Delta\mu m^2$ to 40.0% $\Delta\mu m^2$.

8. The optical fiber of claim 4, wherein the cladding region further comprises an inner cladding region, the inner cladding region surrounding and directly adjacent to the core region, the inner cladding region having a radius $r_2$ in the range from 6.0 μm to 18.0 μm and a relative refractive index $\Delta_2$ less than the relative refractive index $\Delta_{1max}$ and greater than the relative refractive index $\Delta_3$, the intermediate cladding region surrounding and directly adjacent to the inner cladding region.

9. The optical fiber of claim 8, wherein the relative refractive index $\Delta_2$ is in the range from −0.45% to −0.15% and wherein the inner cladding region has a thickness $r_2$–$r_1$ in the range from 3.0 μm to 9.0 μm.

10. The optical fiber of claim 8, wherein the intermediate cladding region has a trench volume $V_{Trench}$ in the range from 20% $\Delta\mu m^2$ to 70% $\Delta\mu m^2$.

11. The optical fiber of claim 4, wherein the relative refractive index $\Delta_4$ is in the range from −0.45% to −0.15%.

12. The optical fiber of claim 1, wherein the radius $r_4$ is in the range from 37.5 μm to 47.5 μm.

13. The optical fiber of claim 1, wherein the radius $r_5$ is less than or equal to 85.0 μm.

14. The optical fiber of claim 1, wherein the thickness $r_5$–$r_4$ is in the range from 25.0 μm to 37.5 μm.

15. The optical fiber of claim 1, wherein the spring constant $\chi_p$ is less than 0.50 MPa and the Young's modulus is greater than 2000 MPa.

16. The optical fiber of claim 1, wherein the primary coating is a cured product of a coating composition comprising:

a radiation-curable monomer;

an adhesion promoter, the adhesion promoter comprising an alkoxysilane compound or a mercapto-functional silane compound; and an oligomer, the oligomer comprising:

a polyether urethane acrylate compound having the molecular formula:

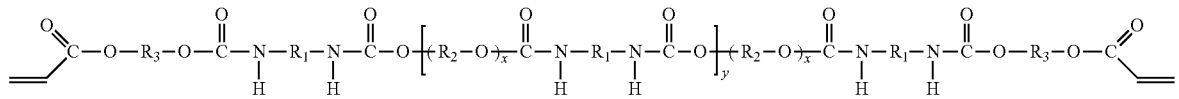

wherein $R_1$, $R_2$ and $R_3$ are independently selected from linear alkylene groups, branched alkylene groups, or cyclic alkylene groups;

y is 1, 2, 3, or 4; and x is between 40 and 100; and a di-adduct compound having the molecular formula:

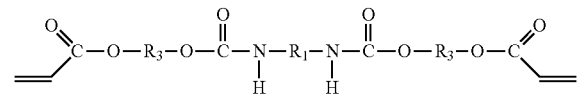

wherein the di-adduct compound is present in an amount of at least 1.0 wt % in the oligomer.

17. The optical fiber of claim 1, wherein the radius $r_6$ is less than or equal to 90.0 μm.

18. The optical fiber of claim 1, wherein the Young's modulus is greater than 2000 MPa.

19. The optical fiber of claim 1, wherein the thickness $r_6$–$r_5$ is in the range from 15.0 μm to 25.0 μm.

20. The optical fiber of claim 1, wherein the secondary coating is the cured product of a composition comprising:

an alkoxylated bisphenol-A diacrylate monomer in an amount greater than 55 wt %, the alkoxylated bisphenol-A diacrylate monomer having a degree of alkoxylation in the range from 2 to 16; and a triacrylate monomer in an amount in the range from 2.0 wt % to 25 wt %, the triacrylate monomer comprising an alkoxylated trimethylolpropane triacrylate monomer having a degree of alkoxylation in the range from 2 to 16 or a tris[(acryloyloxy)alkyl] isocyanurate monomer.

21. The optical fiber of claim 20, wherein the alkoxylated trimethylolpropane triacrylate monomer is an ethoxylated trimethylolpropane triacrylate monomer.

22. The optical fiber of claim 20, wherein the tris[(acryloyloxy)alkyl] isocyanurate monomer is a tris(2-hydroxyethyl) isocyanurate triacrylate monomer.

23. The optical fiber of claim 1, wherein the optical fiber has an effective area at 1550 nm greater than 100 $\mu m^2$.

24. The optical fiber of claim 1, wherein the optical fiber has a macrobending loss at a wavelength of 1550 nm, when wrapped around a mandrel having a diameter of 15 mm, less than 0.5 dB/turn.

25. The optical fiber of claim 1, wherein the optical fiber has a wire-mesh-covered drum microbending loss at a wavelength of 1550 nm less than 0.5 dB/km.

26. The optical fiber of claim 1, wherein the optical fiber has a wire-mesh-covered drum microbending loss at a wavelength of 1550 nm less than 0.03 dB/km.

27. The optical fiber of claim 1, wherein the secondary coating has a normalized puncture load greater than $4.5 \times 10^{-3}$ g/μm$^2$.

* * * * *